United States Patent
Pretsch et al.

(10) Patent No.: US 9,670,330 B2
(45) Date of Patent: Jun. 6, 2017

(54) METHOD AND DYE MIXTURES FOR MARKING SHAPE MEMORY POLYMERS, AND SHAPE MEMORY POLYMER ARTICLES WITH SWITCHABLE READABILITY

(71) Applicant: BAM Bundesanstalt fuer Materialforschung und—pruefung, Berlin (DE)

(72) Inventors: Thorsten Pretsch, Berlin (DE); Melanie Ecker, Berlin (DE); Markus Schildhauer, Berlin (DE)

(73) Assignee: BAM Bundesanstalt fuer Materialforschung und—pruefung, Berlin (DE)

( * ) Notice: Subject to any disclaimer, the term of this patent is extended or adjusted under 35 U.S.C. 154(b) by 98 days.

(21) Appl. No.: 14/354,921

(22) PCT Filed: Oct. 26, 2012

(86) PCT No.: PCT/EP2012/071238
§ 371 (c)(1),
(2) Date: Aug. 28, 2014

(87) PCT Pub. No.: WO2013/060831
PCT Pub. Date: May 2, 2013

(65) Prior Publication Data
US 2015/0119238 A1    Apr. 30, 2015

(30) Foreign Application Priority Data

Oct. 28, 2011 (DE) .......... 10 2011 054 925
Mar. 23, 2012 (DE) .......... 10 2012 102 546

(Continued)

(51) Int. Cl.
*B29C 59/18* (2006.01)
*B42D 25/324* (2014.01)
(Continued)

(52) U.S. Cl.
CPC .......... *C08J 7/065* (2013.01); *B29C 43/021* (2013.01); *B29C 59/18* (2013.01); *B29D 7/01* (2013.01);
(Continued)

(58) Field of Classification Search
CPC .......... Y10T 428/24802; B29C 59/18; B29C 2791/001; B42D 25/324; B42D 25/425;
(Continued)

(56) References Cited

U.S. PATENT DOCUMENTS

| 2,260,543 | A  | 10/1941 | Smith    |
| 3,695,822 | A  | 10/1972 | Akamatsu |
| 2007/0259598 | A1 | 11/2007 | Ribi  |

FOREIGN PATENT DOCUMENTS

| DE | 101273   | 1/1889  |
| DE | 2018189  | 10/1970 |

(Continued)

*Primary Examiner* — Bruce H Hess
(74) *Attorney, Agent, or Firm* — Dicke, Billig & Czaja, PLLC

(57) ABSTRACT

A method for marking an item including a shape memory polymer (SMP) having a visual readable and/or machine readable graphic element on the surface of the item. The method includes pretreating the surface of the item; coloring the surface of the item with a dye solution containing an organic dye and an organic solvent; cleaning and drying the surface of the item; and engraving by at least partially ablating the surface of the item. The dyeing process is suitable for coloring the surface of a shape memory polymer (SMP), wherein the information is engraved in a form of a code or other label on the colored surface. The coloring (Continued)

A

B causes an increased contrast and thus facilitates machine readability of marking and coding without affecting the other properties of the SMP.

29 Claims, 30 Drawing Sheets

(30) Foreign Application Priority Data

Jul. 9, 2012 (DE) .................. 10 2012 106 150
Oct. 1, 2012 (DE) .................. 10 2012 109 303

(51) Int. Cl.

| | |
|---|---|
| *G09F 3/02* | (2006.01) |
| *C08J 7/02* | (2006.01) |
| *C08J 7/06* | (2006.01) |
| *B42D 25/415* | (2014.01) |
| *G06K 19/00* | (2006.01) |
| *G07D 7/00* | (2016.01) |
| *G09F 3/00* | (2006.01) |
| *B42D 25/41* | (2014.01) |
| *B42D 25/425* | (2014.01) |
| *B42D 25/43* | (2014.01) |
| *B42D 25/29* | (2014.01) |
| *B29C 43/02* | (2006.01) |
| *B29D 7/01* | (2006.01) |
| *B29D 99/00* | (2010.01) |
| *C09B 67/44* | (2006.01) |
| *C09D 5/26* | (2006.01) |
| *G06K 19/02* | (2006.01) |
| *G07C 9/00* | (2006.01) |
| *B29K 33/00* | (2006.01) |
| *B29L 31/00* | (2006.01) |

(52) U.S. Cl.
CPC ......... *B29D 99/0007* (2013.01); *B42D 25/29* (2014.10); *B42D 25/41* (2014.10); *B42D 25/415* (2014.10); *B42D 25/425* (2014.10); *B42D 25/43* (2014.10); *C08J 7/02* (2013.01); *C09B 67/0083* (2013.01); *C09D 5/26* (2013.01); *G06K 19/00* (2013.01); *G06K 19/025* (2013.01); *G07C 9/00007* (2013.01); *G07D 7/0006* (2013.01); *G09F 3/0291* (2013.01); *G09F 3/0294* (2013.01); *B29C 2043/023* (2013.01); *B29K 2033/12* (2013.01); *B29L 2031/744* (2013.01); *B42D 25/324* (2014.10); *B42D 2033/20* (2013.01); *B42D 2033/30* (2013.01); *B42D 2035/14* (2013.01); *B42D 2035/34* (2013.01); *G09F 2003/028* (2013.01); *G09F 2003/0213* (2013.01); *G09F 2003/0277* (2013.01); *G09F 2003/0285* (2013.01); *Y10T 428/24802* (2015.01); *Y10T 428/24893* (2015.01); *Y10T 428/24909* (2015.01)

(58) Field of Classification Search
CPC B42D 25/43; B42D 2033/30; B42D 2035/34; G09F 3/0294; C08J 7/02; G03F 3/0294; G07D 7/006; G07D 7/00006
USPC ...................................... 428/195.1
See application file for complete search history.

(56) References Cited

FOREIGN PATENT DOCUMENTS

| | | |
|---|---|---|
| DE | 10 2009 053 808 | 6/2011 |
| EP | 2 050 866 | 4/2009 |
| GB | 2 414 963 | 12/2005 |
| JP | 4266975 | 9/1992 |
| JP | 08333517 | 12/1996 |
| WO | 2008/014167 | 1/2008 |
| WO | 2011/060970 | 5/2011 |

A

B

|  | Poly(ester urethane) blue | epoxy-based polymer (Veriflex E2, tempered) black |
| --- | --- | --- |
| untreated |  |  |
| temporarily fixed shape 100% stretching |  |  |
| shape after activation of shape memory effect |  |  |

A

B

C

A

B

A

B

C

D

A

B

| 89h | blue | black |
|---|---|---|
| 60°C drying cabinet |  |  |
| 23°C UVA 38 W/m² 50 % atmospheric humidity |  |  |
| 60°C UVA 38 W/m² 16 % atmospheric humidity |  |  |

QR-Code

T = 23 °C  T > 43 °C  T = 23 °C

Data Matrix Code

T = 23 °C

T > 43 °C

METHOD AND DYE MIXTURES FOR MARKING SHAPE MEMORY POLYMERS, AND SHAPE MEMORY POLYMER ARTICLES WITH SWITCHABLE READABILITY

CROSS REFERENCE TO RELATED APPLICATION

This Utility Patent Application claims priority under 35 U.S.C. §371 to International Application Serial No. PCT/EP2012/071238, filed Oct. 26, 2012, which claims the benefit of German Patent Application No. DE 10 2011 054 925.0, filed Oct. 28, 2011, German Patent Application No. DE 10 2012 102 546.0, filed Mar. 23, 2012, German Patent Application No. DE 10 2012 106 150.5, filed Jul. 9, 2012 and German Patent Application No. DE10 2012 109 303.2, filed Oct. 1, 2012; all of which are incorporated herein by reference.

BACKGROUND

The invention is related to the field of dyeing polymers, particularly the field of dyeing shape memory polymers (SMP), shape memory polymer surfaces and shape memory polymer films, and the use thereof for purposes of information coding and as a security feature.

Polymers can be coloured with dyes in a number of different ways. Commonly used methods include the mass dyeing, in which for example a pigment or dye is mixed with the polymer and the polymer is melted to enable the dye to infiltrate the polymer matrix. In other processes, the polymer is coloured by diffusing the dyes from a solution or dispersion, such as when dispersion dyes, for example basic dyes, acid dyes, metal complex dyes or reactive dyes are used to colour polymer fibres of polyester, polyacrylic nitrile, polyurethane, cellulose or polyamide, for example.

When reactive dyes are used, a covalent bond is formed between the dye and the polymer, which enables particularly good colour fastness to be achieved. For this, the dyes used, or their chromophores, must be sufficiently stable under the polymerisation conditions. A typical process for dyeing textiles is discontinuous dyeing (exhaust dyeing process), in which the fabric is passed through a dye bath containing dyes that have been dissolved or dispersed in water. In continuous dyeing (pad dyeing) the entire fabric is impregnated uniformly and coloured with dye evenly.

According to the intended use of a polymer, however, it may be desirable to mark a polymer item only on the surface or only on one side. In this regard, the previously known solutions for dyeing only the surface or one side of polymer items are only partly satisfactory, and still require considerable technical investment. Furthermore, it is difficult to adjust parameters such as the penetration depth of the dye into the respective polymer with conventional dyeing methods. It is therefore technically very challenging, if not impossible, to colour layers close to the surface in a targetted manner.

One option for surface marking or generally marking polymer item that is extremely adaptable in terms of application aspects consists in the use of an ablating laser beam. The surface can also be removed from polymer items selectively using mechanically abrasive processes and/or chemically by etching with acids or bases. The use of this form of marking offers particular advantages for shape memory polymers, particularly for labels or security marks of such, or for products made entirely of SMP. Since a mark applied to the SMP surface by means of non-dyeing laser engraving or the representation of information can be rendered temporarily invisible or hidden by appropriate programming of the SMP, security features can be introduced into the SMP that can help to increase security against counterfeiting of items, for example. Applications therefor are described for example in DE 10 2009 053 808.

The term shape memory polymer (SMP) is generally used to describe plastics that after being reshaped, are apparently able to "remember" their previous external shape, and effectively have a memory of their shape. In order to restore the former shape, the SMP must be exposed to a stimulus. This stimulus kann may be the application of heat, for example, by which the SMP in question is heated either directly or indirectly.

The SMP may be heated directly from the outside by hot air, IR radiation, for example by exposure to the sunlight or the airstream of a hot air blower, or by direct contact with a heat storage medium, such as a preheated fluid. Heat may be applied by immersing in warm water, for example.

According to other embodiments, the heat is supplied indirectly by an auxiliary material or filler material that is permanently embedded in the SMP material and heats the SMP matrix by interacting with an external electromagnetic field. Such auxiliary or filler materials may have a graphene structure, for example, such as exists in graphite, carbon nanotubes, graphene flakes or expanded graphite. Other particles with a nanoscale dimension can also be used as auxiliary materials and fillers. For example, magnetic nanoparticles, ferromagnetic particles, particularly NiZn particles, iron oxide particles and magnetite particles may be considered. Nanoclays may also be used as fillers. The nanoclays may be formed on bases of silicon nitride, silicon carbide, silica, zirconia and/or alumina, for example.

Other possible fillers are oligomeric silsesquioxanes, graphite particles, graphenes, carbon nanotubes, synthetic fibres, particularly carbon fibres, glass fibres or Kevlar fibres, and metal particles as well. Of course, combinations of these fillers may also be used. The fillers are suitable for adjusting the mechanical, electrical, magnetic and/or optical properties of an SMP and adapting it to its respective intended purpose.

One advantage of the auxiliary materials or fillers added to the SMP is that their size and material properties enable to them to absorb the energy of irradiated electromagnetic fields, convert it to heat and deliver it to the surrounding matrix of the shape memory polymer. In this way, an article made from SMP can be heated efficiently and change its shape rapidly without physical contact.

In particular, after marking on one side with graphic elements such as logos, glyphs, letters, numbers, symbols, QR codes, Data Matrix codes or barcodes, the contrast between the engraved and unengraved areas on articles made from polymers with shape memory is unsatisfactory, so that for example the automatic readout of codes with a reading device (scanner) is difficult, subject to errors or entirely impossible. However, it is precisely the easy readability of such representations combined with the shape memory properties of the polymers that can provide a preferred option for marking objects in a way that cannot be forged.

For these and other reasons, there is a need for the present invention.

BRIEF DESCRIPTION OF THE DRAWINGS

The accompanying drawings illustrate embodiments and are designed to be reviewed together with the description to explain the principles of the invention.

DETAILED DESCRIPTION

Figure 1:
FIG. 1 shows schematically the sequence of steps of dyeing and engraving.
Figure 1:
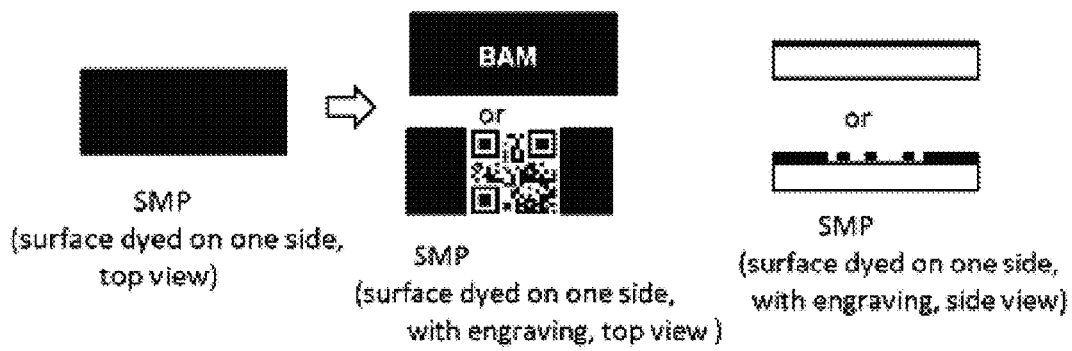

One or more embodiments provide a dyeing process for shape memory polymers that satisfies a number of specific requirements. These requirements include for example:

Resistance to smearing after undergoing the dyeing process: Upon wiping with a damp, lint-free cloth, it is revealed that the dye has penetrated the upper layers of the polymer, that is to say it cannot be wiped away or removed mechanically be scratching or rubbing;

Resistance during a laser cutting process (30 W $CO_2$ laser);

Resistance during a laser engraving process (30 W $CO_2$ laser), particularly in areas adjacent to the areas undergoing laser engraving;

Resistance to wiping with a damp, lint-free cloth after undergoing the laser engraving process (smear resistance);

Resistance to heat treatment, for example at T=60° C.;
Resistance to hydrolysis;
Resistance to UVA radiation, for example with an irradiance of 38 W/m² at a temperature of 23° C. and atmospheric humidity of 50%;
Stability under conditions of thermomechanical loading when the SMP is programmed, for example by stretching cubic poly(ester urethane) samples having a width of 2 mm by an expansion factor of 100% above the switching temperature and fixing the imposed shape by cooling.

The essential requirement for a dye that is to be applied to the surface of items made from shape memory polymers, which also includes the volumes that are not dyed, and a corresponding dyeing process, is that the macroscopic functionality of the shape memory polymers must not be limited by the dyeing process.

In this context, the macroscopic functionality of the polymer is understood to be its ability to retain its particular properties as an SMP in the programmed state so that they can be recalled at any time, and to be thermomechanically programmable.

Against this background, a method for marking polymer articles according to claim 1 and a dyeing process according to claim 7 are provided. At the same time, an item according to claim 24 is obtained on the basis of a dye solution according to claim 15 using a dye according to claim 22. Additionally, a method for dyeing a surface of a shape memory polymer according to claim 33 or claim 40 is provided. Additionally, a method for producing a graphical element according to claim 43 is provided. Moreover, a method for communicating information according to claim 45 and a method for proving the authenticity of an item according to claim 49 are provided. Further embodiments, modifications and improvements will become apparent from the following description and the accompanying claims.

According to one embodiment, a dyeing method for the surface of a polymer item is suggested that comprises the steps of: pretreating the surface; dyeing with a dye solution that contains an organic dye and an organic solvent, and drying the dye solution. During this method, only a layer of the polymer item close to the surface is dyed.

Advantages are obtained with respect to the suitability of the polymer surface as a carrier of engraved information. In particular, the contrast between the engraved markings that are applied subsequently to the dyed surface in the form of pictures, graphics, characters, codes or other marks, identifiers and information, and the engravings on undyed polymer surfaces, is significantly improved. In addition, even the slightest engraving depths are sufficient to enable the contrasts necessary to ensure reliable machine readability. The advantage of this is that the stability of the engraved items is not impaired on the engraved surfaces. The shorter time required to complete shallower engraving makes it easier to carry out serial marking of a large number of polymer items, raises throughput and lowers manufacturing costs.

According to one embodiment, the dyeing process comprises pretreating the surface of the polymer item with a swelling agent.

The advantage of using a swelling agent consists in that it improves the ability of the polymer matrix to absorb the compound being used as the dye. Colour fastness of the coloured area is improved, unintentional release, for example by washing out (leakage), is minimised or even prevented entirely.

According to a further embodiment, the swelling agent selected from acetone, dichloromethane and N,N-dimethyl formamide. A mixture of at least two of these solvents is also suitable for use as the swelling agent. The solvents for known for the fact that they penetrate rapidly, but then also evaporate without leaving any residue. Thus, they perfectly satisfy the requirements of a short-term expansion of the polymer network by causing temporary swelling of the polymer on the surface thereof.

According to a further embodiment, the application of a swelling agent is preceded by a pretreatment for cleaning the respective surface of the polymer item. Advantages consist in that residues, for example of releasing agents originating from the production of the polymer item, for example by injection moulding, can be reliably removed from the surface to be dyed in in a single cleaning step. Thus, any undesirable interaction between such impurities and the dye solution is prevented. Consequently, the dye solution can be used repeatedly and still retain its adapted dyeing behaviour in each case, without changes due to flocculation, colour alterations or other deteriorations.

According to further embodiments, the near-surface layer dyed in the process described has a thickness from 25 to 250 µm, for example in the range from 50 to 180 µm, particularly in the range from 75 to 125 µm. In this context, the dyed layer begins immediately on the surface or just a few µm below the outer surface of the polymer item. This offers the particular advantage of making it possible to generate good image contrasts using uncomplicated structuring techniques. Overall, the properties of the polymer surface can be improved for the purpose of introducing identifying marks, symbols, codes or other types of information with noticeably impairing the thermal switchability of the polymer, that it so say its properties as a shape memory polymer, or the shape memory effect (SME) of the SMP.

According to another embodiment, a swelling agent is allowed to act on the polymer surface for a period of 1 to 60 seconds during the pretreatment of the polymer surface that is to be dyed. Afterwards, the swelling agent is removed from the surface of the polymer item. This can be carried out with a lint-free cloth for example, or equally well with an airstream directed over the polymer surface. Advantageously, this enables serial colouring of a large number of polymer items, for example in a e colour of the serial number of polymer items, for example in a manufacturing sequence, similar to the known labelling of bottles.

According to another embodiment, the surface of the polymer article is coloured by dip coating, spin coating, spray coating, with the aid of a drum, roller, brush, stamp, inkjet or electroprinting. The advantage consist in that surface portions of a polymer item that have been selectively adapted to the respective application can be dyed, if necessary even without having to dye the whole surface of the polymer item completely.

According to another embodiment, a dye solution is suggested for dyeing the surface of a polymer item a prescribed colour, wherein the dye solution comprises an organic dye that is dissolved in a solvent compound. The solvent compound contains at least ethanol and ethyl lactate and may further contain, for example, acetone. This combination, particularly the combination of ethanol with ethyl lactate, ensures that the dyes used can be completely dissolved, especially in the case of mixtures of organic dyes.

According to a further embodiment, the dye solution comprises a solvent compound that consists of ethanol and ethyl lactate, and contains the dyes Basic Green 1 (CI 42040, CAS 633-03-4), Basic Red 28 (CAS 72828-91-2) and Victoria Blue B (CI 44045; CAS 2580-56-5) or Victoria Blue R (CI 44040; CAS 2185-86-6), wherein the colour obtained on a transparent polymer surface is black.

The German name for the dye called Basic Green 1 is Brillantgrün, the corresponding chemical name is 4-[(4-diethylamino)-α-phenylbenzylidene]-N,N-diethylcyclohexadien-2,5-ylidene ammonium hydrogen sulphate.

The German name for the dye called Basic Red is Basischrot 28, its chemical name is 3-[(1,3-Dihydro-1,3,3-trimethyl-2H-indol-2-ylidene)ethylidene]-9-ethyl-3H-carbazolium chloride.

The German name for the dye called Victoria Blue R is Viktoriablau R or Kornblau R. Another English name is Basic Blue 11. The chemical name of the substance is Bis(4-dimethylaminophenyl)-(4-ethylamino-1-naphthyl)-methylium-hydrochloride or N-(4-((4-(dimethylamino)phenyl)(4-(ethylamino)-1-naphthalenyl)methylene)-methanaminium-2,5-cyclohexadien-1-ylidene)-N-methyl-, chloride.

The German name for the dye called Victoria Blue B is Nachtblau or Viktoriablau B, its chemical name is Bis(4-dimethylaminophenyl)-(4-anilino-1-naphthyl)-methylium-hydrochloride or N-[4-[[4-(dimethylamino)phenyl][4-(phenylamino)-1-naphthyl]methylene]-2,5-cyclohexadien-1-ylidene]-N-methyl-Methanaminium, chloride.

The mixture of the above-described dyes enables thin layers on the surface of a polymer item to be dyed a distinctly black colour even with a short period of action of the corresponding dye solution on the pre-swollen polymer surface. This has the advantage that this black colouring may be performed serially on a large number of polymer items, for example in a manufacturing sequence or on a conveyor belt. An engraving that is introduced into such black-coloured surfaces provides good contrasts. Advantageously, black-white contrasts are easy to capture visually, and the corresponding markings are easily readable by humans and machines, and are highly suitable for machine reading.

According to a further embodiment, an advantageous solvent compound comprises the solvents ethanol and ethyl lactate, and contains the dye Basic Red 28. The use of a corresponding dye solution enables thin layers on the surface of a polymer item to be dyed a distinctly red colour even with a short period of action of the corresponding dye solution on the pre-swollen polymer surface. This has the advantage that this red colouring may be performed serially on a large number of polymer items, for example in a manufacturing sequence or on a conveyor belt. An engraving that is introduced into such red-coloured surfaces provides good contrasts. Advantageously, red-white contrasts are easy to capture visually, and have excellent signalling effect. The corresponding markings are easily readable by humans and machines, and are highly suitable for machine reading.

According to a further embodiment, an advantageous solvent compound comprises the solvents ethanol, acetone and ethyl lactate, and contains the dye Basic Green 28. The use of a corresponding dye solution enables thin layers on the surface of a polymer item to be dyed a distinctly green colour even with a short period of action of the corresponding dye solution on the pre-swollen polymer surface. This has the advantage that this green colouring may be performed serially on a large number of polymer items, for example in a manufacturing sequence or on a conveyor belt. An engraving that is introduced into such green-coloured surfaces provides good contrasts. Advantageously, green-white contrasts are easy to capture visually, and have excellent signalling effect. The corresponding markings are easily readable by humans and machines, and are highly suitable for machine reading.

According to a further embodiment, an advantageous solvent compound comprises the solvents acetone, ethanol and ethyl lactate, and contains the dye Victoria Blue B. The use of a corresponding dye solution enables thin layers on the surface of a polymer item to be dyed a distinctly blue colour even with a short period of action of the corresponding dye solution on the pre-swollen polymer surface. This has the advantage that this blue colouring may be performed serially on a large number of polymer items, for example in a manufacturing sequence or on a conveyor belt. An engraving that is introduced into such blue-coloured surfaces provides good contrasts. Advantageously, blue-white contrasts are easily perceptible visually, even in difficult conditions. The corresponding markings are easily readable by humans and machines, and are highly suitable for machine reading.

According to a further embodiment, an advantageous solvent compound comprises the solvents acetone, ethanol and ethyl lactate, and contains the dye Victoria Blue R. The use of a corresponding dye solution enables thin layers on the surface of a polymer item to be dyed a distinctly blue colour even with a short period of action of the corresponding dye solution on the pre-swollen polymer surface. This has the advantage that this blue colouring may be performed serially on a large number of polymer items, for example in a manufacturing sequence or on a conveyor belt. An engraving that is introduced into such blue-coloured surfaces provides good contrasts. Advantageously, blue-white contrasts are easily perceptible visually, even in difficult conditions. The corresponding markings are easily readable by humans and machines, and are highly suitable for machine reading According to a further embodiment, at least one organic dye that is dissolved in a solvent compound with ethanol and ethyl lactate in order to colour the surface of an item made from SMP is selected from:

Basic Blue 8 or Victoria Blue—according to the substance (4-((4-(Dimethylamino)phenyl)(4-toluidino-1-naphtyl) methylene)cyclohexa-2,5-dien-1-ylidene)dimethyl ammonium chloride;

Basic Red 28—corresponding to the substance 3-[(1,3-Dihydro-1,3,3-trimethyl-2H-indol-2-ylene)ethylidene]-9-ethyl-3H-carbazolium chloride;

Basic Green 1—corresponding to the substance 4-[(4-Diethylamino)-α-phenylbenzylidene]-N,N-diethylcyclohexa-2,5-dienylidene ammonium hydrogen sulphate;

Nile Blue or Basic Blue 12—corresponding to the substance 5-Amino-9-(diethylamino) benzo[a]phenoxazin-7-ium;

Methylene Blue or Basic Blue 9—corresponding to the substance 3,7-Bis(dimethylamino)-phenothiazinium chloride;

Victoria Blue R or Basic Blue 11 or Cornflower Blue R—corresponding to the substance Bis(4-dimethylaminophenyl)-(4-ethylamino-1-naphthyl)-methylium hydrochloride;

Victoria Blue B or Midnight Blue—corresponding to the substance Bis(4-dimethylaminophenyl)-(4-anilino-1-naphthyl)-methylium-hydrochloride.

According to further embodiments, at least one dye of the suggested dye solution is selected from triarylmethane dyes comprising hydroxytriphenyl methane dyes, phthaleins and sulphonephthaleins;

aminotriphenyl methane dyes comprising methyl violet dyes, fuchsine dyes, phenol dyes and malachite green dyes; and cationic dyes comprising the compounds:

Basic Blue 8 or Victoria Blue corresponding to the chemical formula 4-((4-(Dimethylamino)phenyl)(4-toluidino-1-naphthyl)methylene)cyclohexa-2,5-dien-1-ylidene) dimethylammonium chloride);

Basic Red 28 corresponding to the chemical formula 3H-Carbazolium, 342-(1,3-dihydro-1,3,3-trimethyl-2H-indol-2-ylidene)ethylidene]-9-ethyl chloride);

Basic Green 1 or Ethyl Green or Brilliant Green having chemical formula [4,4,4-(Diethylamino)benzhydrylenicyclohexa-2,5-dien-1-ylidene]diethylammonium hydrogen sulphate);

Nile Blue or Basic Blue 12 having chemical formula 5-Amino-9-(diethylamino)benzo[a]phenoxazin-7-ium and Methylene Blue or Basic Blue 9 having chemical formula 3,7-Bis(dimethylamino)-phenothiazinium chloride.

Advantage are derived from the extensive palette of colours and shades that can be created with the dyes used individually or by mixing them.

According to further embodiments, the dyes may be selected from anionic dyes that comprise the anion:

5-[5-(1,3-Diethylhexahydro-2,4,6-trioxo-5-pyrimidinyl)-2,4-pentadienylidene]-1,3-diethyl-2,4,6-(1H,3H,5H)-pyrimidintrione. Anionic dyes offer the advantage of easier diffusion and permanent anchoring in the network of a block copolymer, an SMP for example.

One or more dyes may also be selected from among cationic dyes that contain the following cations or which contain cations of the following cationic dyes:

3-[3-[4-(Dimethylamino)phenyl]-2-propenylide]-1-methyl-2-phenyl-3H-indolium;

3-(3-Amino-3-oxopropyl)-2-[[4-[bis(2-chloroethyl)amino]phenyl]azo]-6-methoxy-benzothiazolium;

3-(3-Amino-3-oxopropyl)-2-[[4-(diethylamino)phenyl]azo]-6-ethoxy-benzothiazolium;

3-(3-Amino-3-oxopropyl)-2-[[4-(diethylamino)-2-methylphenyl]azo]-6-ethoxy-benzothiazolium;

CAS 12221-40-8; CAS 12270-14-3; CAS 12221-31-7; CAS 12221-34-0; 9-(Dimethylamino)benzo[a]phenoxazin-7-ium;

2-[4,4-Bis[4-methylamino)phenyl]-1,3-butadienyl]-1-ethylquinolinium;

4-[4,4-Bis[4-(dimethylamino)phenyl]-1,3-butadienyl]-1-ethylaquinolinium;

2-[4,4-Bis[4-(dimethylamino)phenyl]-1,3-butadienyl]-3-ethylnaphtho[2,1-d]thiazolium;

2-[2-[4-(Dimethylamino)phenyl]ethenyl]-1-phenyl-3-methylquinoxalinium;

2-[3-(5-Chloro-1,3-dihydro-1,3,3-trimethyl-(2H)-indol-2-ylidene)-1-propenyl]-1-methyl-quinolinium;

2-[[4-(Dimethylamino)phenyl]azo]-6-methoxy-3-methylbenzothiazolium;

2-[4-(Diethylamino)-2-ethoxyphenyl]-1-ethyl-benz[cd]indolium;

2-[p-(Dimethylamino)styryl]-1,3-dimethyl-quinoxalinium;

2-[3-(5-Chloro-1,3-dihydro-1,3,3-trimethyl-(2H)-indol-2-ylidene)-1-propenyl]-1-methyl-quinoxalinium;

Basic Blue 40;

2-[[4-[Ethyl-(2-hydroxyethyl)amino]phenyl]azo]-6-methoxy-3-methyl-benzothiazolium;

Basic Blue 42; Basic Blue 53;

5-Chloro-2-[5-(5-chloro-1,3-dihydro-1,3,3-trimethyl-2H-indol-2-ylidene)-1,3-pentadienyl]-1,3,3-trimethyl-3H-indolium;

Basic Blue 142;

2-[2-(9-Ethyl-(9H)-carbazol-3-yl)ethenyl]-1-methyl-benz[cd]indolium;

2-[2-[4-(Dimethylamino)phenyl]-2-phenylethenyl]-1-methyl-benz[cd]indolium;

2-[2,2-Bis[4-(dimethylamino)phenyl]ethenyl]-1-methyl-benz[cd] indolium;

2-[2-(2,3-Dihydro-1-methyl-2-phenyl-1H-indol-3-yl)-2-(2-methylphenyl)ethenyl]-1-methylbenz[cd]indolium;

4-[5-(2,3-Dihydro-1,3-dimethyl-2-oxo-4-(1H)-pyrimidinylidene)-1,3-pentadienyl]-2,3-dihydro-1,3-dimethyl-2-oxo-pyrimidinium;

2-[[3-[(1,3-Dihydro-1,3,3-trimethyl-2H-indol-2-ylidene) methyl]-5,5-dimethyl-2-cyclohexen-1-ylidene]methyl]-1,3,3-timethyl-3H-indolium;

2-[2-[4-(Diethylamino)-2-methylphenyl]ethenyl]-1-methyl-benz[cd]indolium;

3-[3-[4-[(Dimethylamino)phenyl]-2-propenyliden]-1-methyl-2-(4-methoxyphenyl)-3H-indolium;

3-[(2,5-Dimethyl-1-phenyl-(1H)-pyrrol-3-yl)methylene]-1,2-dimethyl-3H-indolium;

3-[(2,5-Dimethyl-1-phenyl-(1H)-pyrrol-3-yl)methylene]-1-methyl-2-phenyl-3H-indolium;

2-[2-[2-Chloro-4-(dimethylamino)phenyl]ethenyl]-1-methylbenz[cd] indolium;

Basic Violet 22; Basic Red 15;

2-[2-[4-(Dimethylamino)phenyl]ethenyl]-1-methyl-benz[cd] indolium;

2-[2-[4-(Dimethylamino)-2-ethoxyphenyl]ethenyl]-1-methyl-benz [cd]indolium, and

2-[1-Cyano-4,4-bis[4-(dimethylamino)phenyl]-1,3-butadienyl]-1,3,3-ttimethyl-3H-indolium.

Cationic dyes offer the advantage of easier diffusion in the network of a block copolymer, an SMP for example, and permanent anchoring in said network.

According to further embodiments, one or more dyes of a dye solution are selected from neutral dyes, such as:

4-[[4-(Dimethylamino)phenyl]imino]-2,5-cyclohexadien-1-one;

2-Chloro-4-[[2-methyl-4-(diethylamino)phenyl]imino]-2,5-cyclohexadien-1-one;

4-[[4-(Diethylamino)phenyl]imino]-1,4-dihydronaphthalin-1-one;

4-[[4-(Dimethylamino)phenyl]imino]-1,4-dihydronaphthalin-1-one; 4-[[2-Methyl-4-(diethylamino)phenyl]imino]-1,4-dihydronaphthalin-1-one;

3-Methoxy-4-[[2-methyl-4-(diethylamino)phenyl]imino]-2,5-cyclohexadien-1-one;

3-Chloro-4-[[2-methyl-4-(diethylamino)phenyl]imino]-2,5-cyclohexadien-1-one;

2-Methyl-4-[[4-(4-morpholinyl)phenyl]imino]-2,5-cyclohexadien-1-one;

2,6-Dichloro-4-[[4-(4-morpholinyl)phenyl]imino]-2,5-cyclohexadien-1-one;

2,6-Dimethyl-4-[[4-(4-morpholinyl)phenyl]imino]-2,5-cyclohexadien-1-one;

2,5-Dichloro-4-[[4-(diethylamino)phenyl]imino]-2,5-cyclohexadien-1-one;

3-Methoxy-4-[[3-methoxy-4-(diethylamino)phenyl]imino]-2,5-cyclohexadien-1-one;

2,6-Dichloro-4-[[2-methyl-4-(diethylamino)phenyl]imino]-2,5-cyclohexadien-1-one;

3-[[4-(Diethylamino)-2-methylphenyl]imino]-6-oxo-N-phenyl-1,4-cyclohexadien-1-carboxamide;

5-[[4-(Diethylamino)-2-methylphenyl]imino]-8-(5H)-quinolinone;

2,5-Dichloro-4-[[2-methyl-4-(diethylamino)phenyl]imino]-2,5-cyclohexadien-1-one;
2,6-Dichloro-4-[[4-(acetamido)phenyl]imino]-2,5-cyclohexadien-1-one;
2,6-Dichloro-4-[(4-ethoxyphenyl)imino]-2,5-cyclohexadien-1-one; 2,6-Dichloro-4-[(2-methyl-4-ethoxyphenyl)imino]-2,5-cyclohexadien-1-one;
2,6-Dimethyl-4-[(4-hydroxyphenyl)imino]-2,5-cyclohexadien-1-one; 2,6-Dichloro-4-[(4-methoxy-1-naphthyl)imino]-2,5-cyclohexadien-1-one;
2,6-Dichloro-4-[[4-(benzyloxy)phenyl]imino]-2,5-cyclohexadien-1-one;
2,6-Dichloro-4-[(2,4-dimethoxyphenyl)imino]-2,5-cyclohexadien-1-one;
2,6-Dichloro-4-[(4-methoxyphenyl)imino]-2,5-cyclohexadien-1-one; 4-(Phenylimino)-2,5-cyclohexadien-1-one;
4-(1-Naphthylimino)-2,5-cyclohexadien-1-one;
4-(2-Naphthylimino)-2,5-cyclohexadien-1-one;
2,5-Bis(phenylamino)-4-(phenylimino)-2,5-cyclohexadien-1-one; 2,5-Dibromo-4-[(2,4-dibromophenyl)imino]-2,5-cyclohexadien-1-one;
2,3,5-Trichloro-4-[(2,4,6-trichlorophenyl)imino]-2,5-cyclohexadien-1-one;
2,6-Dichloro-4-[4-[4-(dimethylamino)phenyl]-5-phenyl-(2H)-imidazol-2-ylidine]-2,5-cyclohexadien-1-one;
2,6-Dichloro-4-[4,5-bis(4-hydroxyphenyl)-(2H)-imidazol-2-ylidine]-2,5-cyclohexadien-1-one;
2,6-Dimethoxy-4-[4,5-bis(2-furyl)-(2H)-imidazol-2-ylidine]-2,5-cyclohexadien-1-one;
2,6-Bis[1,1-(dimethyl)ethyl]-4-[4,5-bis(2-furyl)-(2H)-imidazol-2-ylidene]-2,5-cyclohexadien-1-one;
4-(Phenylimino)-2,5-cyclohexadien-1-imine;
Mono[(3-methyl-2-(3H)-benzothiazolylidene)hydrazono]-2,5-cyclohexadiene-1,4-dione;
4-[(3-Chloro-4-oxo-2,5-cyclohexadien-1-ylidine)amino]-1,2-dihydro-1,5-dimethyl-2-phenyl-(3H)-pyrazol-3-one;
4-[(3,5-Dichloro-4-oxo-2,5-cyclohexadien-1-ylidine)amino]-1,2-dihydro-1,5-dimethyl-2-phenyl-(3H)-pyrazol-3-one;
3-[(3,5-Dichloro-4-oxo-2,5-cyclohexadien-1-ylidine)amino]-2,5-dihydro-4,5-dimethyl-1-phenylpyrrol-2-one;
4-(Phenylsulfonyl)imino-1-[4-[(phenylsulfonyl)imino]-2,5-cyclohexadien-1-ylidenyl]-2,5-cyclohexadiene;
4-[6,6-Bis[(trifluoromethyl)sulfonyl]-1,3,5-hexatrienyl]-N,N-dimethylbenzolamine;
4-[4,4-Bis[(trifluoromethyl)sulfonyl]-1,3-butadienyl]-2-ethoxy-N,N-dimethylbenzolamine;
4-[4,4-Bis[(trifluoromethyl)sulfonyl]-1,3-butadienyl]-2,5-dimethoxy-N,N-dimethylbenzolamino;
9-[4,4-Bis[(trifluoromethyl)sulfonyl]-1,3-butadienyl]-2,3,6,7-tetrahydro-(1H,5H)-benzo[ij]quinolizine;
4-[4,4-Bis[(trifluoromethyl)sulfonyl]-1,3-butadienyl]-2,6-N,N-tetramethylbenzolamine;
4-[5,5-Bis[(trifluoromethyl)sulfonyl]-2,4-pentadienylidene]-1,4-dihydro-1-methylquinoline;
6,6-Bis[4-(dimethylamino)phenyl]-1,3,5-hexatriene-1,1-bis(sulfonylfluoride);
4-[4,4-Bis[(trifluoromethyl)sulfonyl]-1,3-butadienyl]-N,N-dimethylbenzolamine and 4-[3-[4-(Dimethylamino)phenyl]-2-propenylidene]-2-phenyl-5-(4H)-oxazolone. The dyes described offer the advantage of a large selection of obtainable colours and shades. Diffusion in the network of a block copolymer, an SMP for example, is made easier.

According to further embodiments, the use of a dye is suggested for staining near-surface layers of a polymer with shape memory, or a shape memory polymer (SMP), wherein particularly a segregated poly(ester urethane), a compound created from the hard-segment-forming block methylene diphenyl diisocyanate (MDI) or toluene-2,4-diisocyanate (TDI) with a diol, particularly 1,4-butanediol, or a diamine and the soft segment polyethylene adipate, polypropylene adipate, polybutylene adipate, polypentylene adipate or polyhexylene adipate, is used. The dye used is a triarylmethane dye, a hydroxytriphenylmethane dye, a phthalein, a sulfonephthalein, an aminotriphenylmethane dye, a methyl violet dye, a fuchsin dye, a phenol dye and/or a malachite green dye. The dyes described enable the polymer in question to be coloured sufficiently without significantly impairing the shape memory properties thereof. In this way, the resilience of the dyed SMP is no different from that of an undyed SMP.

According to further embodiments, the use of a dye for colouring the surface of items made from shape memory polymers is suggested, wherein the dye is a cationic dye, Basic Blue 8 (Victoria Blue, 4-((4-(Dimethylamino)phenyl)(4-toluidino-1-naphthyl)methylene)cyclohexa-2,5-dien-1-ylidene)dimethyl ammonium chloride), Basic Red 28 (3H-Carbazolium, 3-[2-(1,3-dihydro-1,3,3-trimethyl-2H-indol-2-ylidene)ethylidene]-9-ethyl-chloride), Basic Green 1 (Ethyl Green; Brilliant Green [4-[4-(diethylamino)benzohydrylene]cyclohexa-2,5-dien-1-ylidene] diethylammonium hydrogen sulphate), Nile Blue (Basic Blue 12,5-amino-9-(diethylamino)benzo[a]phenoxazin-7-ium) and/or Methylene Blue (Basic Blue 9, 3,7-bis(dimethylamino)phenothiazinium). This advantageously enables SMP to be dyed deeply with the designated basic colours black (from adapted mixtures of individual dyes), green (individually and in mixtures), red (individually and in mixtures), yellow (in mixtures) and blue (individually and in mixtures).

According to a further embodiment, a method is suggested for marking shape memory polymers (SMP) for the formation of highly contrasted surfaces with graphics, logos, characters, symbols, codes, QR codes, DataMatrix Codes and/or barcodes in the polymer surface, wherein the method comprises the steps of: pretreating the polymer surface (swelling), dyeing, drying and engraving. The characters or codes applied by engraving may advantageously be read out more easily on a surface that that has undergone surface colouring than would have been possible without any additional colouring.

According to further embodiments, the surface images, graphics, codes or other markings are applied in the method for marking polymers having a shape memory by introducing an engraving with a chemical etching step, mechanically by removing material and/or by the use of an ablating laser.

The embodiments described in the preceding can be used with each other in any combination.

At present, the shape memory effect (SME) of most shape memory polymers described in the literature is induced thermally. This means that that when programmed polymer materials are heated to above a defined transition temperature ($T_{trans}$), a shape restoration takes place under the effect of entropy elasticity. Shape memory polymers are usually polymers in which the permanent shape is determined by chemical (covalent) or physical (not covalent) crosslinking points. Examples of such switchable polymers are phase-segregated, lineare block copolymers made from hard and soft segments.

According to one embodiment, the SMP may be a thermoplastic shape memory polymer, particularly from the group of linear block copolymers, particularly polyurethanes and polyurethanes with ionic or mesogenic components, block copolymers of polyethylene terephthalate and polyethylene oxide, block copolymers of polystyrene and poly (1,4-butadiene), ABA triblock copolymers of poly-(2-methyl-2-oxazoline) (A-block) and polytetrahydrofuran (B-block), multiblock copolymers of polyurethanes with poly(ε-caprolactone) switching segment, block copolymers of polyethylene terephthalate and polyethylene oxide, block copolymers of polystyrene and poly(1,4-butadiene), polyurethane systems, in which the hard segment-forming phase consists of methylene diphenyl diisocyanate (MDI) or toluene-2,4-diisocyanate and a diol, particularly 1,4-butanediol, or a diamine and a switching segment based on an oligoether, particularly polytetrahydrofuran or an oligoester, particularly polyethylene adipate, polypropylene adipate, polybutylene adipate, polypentylene adipate or polyhexylene adipate, materials with a hard segment-forming phase of toluene-2,4-diisocyanate, MDI, diisocyanates that are constructed in particularly from MDI or hexamethylene diisocyanate in carbodiimide-modified form and from chain extenders, particularly ethylene glycol, Bis(2-hydroxyethyl) hydroquinone or a combination of 2,2-Bis(4-hydroxyphenyl)propane and ethylene oxide, in which the switching-segment determining blocks consist of oligoethers, particularly polyethylene oxide, polypropylene oxide, polytetrahydrofuran or a combination of 2,2-Bis(4-hydroxyphenyl)propane and propylene oxide, or oligoesters, in particular poly butylene adipate, materials of polynorbornene, natural rubber (cis-1,4-polyisoprene), trans-1,4-polyisoprene, graft copolymers of polyethylene/nylon-5, block copolymers with polyhedral oligomeric silsesquioxanes (POSS), including the combinations polyurethane/POSS, epoxy/POSS, polysiloxane/POSS, polymethyl methacrylate/POSS, silicone-based shape memory polymers and poly(cyclooctene) materials.

In poly(ester urethanes), the elements that can be used to construction switching segment blocks include poly(ε-caprolactone) diols having number average molecular weights between 1500 and 8000. The switching temperature for the shape memory effect (SME) may vary between 44° C. and 55° C. depending on the weight ratio of the switching segment (variation between 50 and 90% by weight) to the molecular weight of the poly(ε-caprolactone) diols. The crystallisation temperatures are between 25° C. and 30° C. Block copolymers consisting of trans-polyisoprene and urethanes manifest the SME, the restoring temperature is 65° C., the crystallisation temperature depends on the chemical composition and can be adjusted between 0° C. and 30° C.

According to another embodiment, polyadipate-based poly(ester urethanes) for example may be usable as smart labels, because the switching temperature of the soft segments thereof is about 37° C. and the crystallisation temperature is considerably lower than 23° C. (≤10° C.). Moreover, the material possesses adequate shape memory properties (shape restorability, shape fixability) and is stable in the long term. The poly(ester urethane) was shown to be easily processable. It was also demonstrated that about 75% of the tension applied for stretching is made available again for shape restoration (during triggering of the shape memory effect).

According to another embodiment, the SMP may be an elastomer SMP, particularly from the group of polyvinyl chloride, polyethylene-polyvinylacetate-copolymers, covalently crosslinked copolymer systems of stearyl acrylate and methyl methacrylic acid ester. Suitable block copolymers typically have a melting temperature above 30° C. and a crystallisation temperature below 23° C. Other possible materials include those with a glass transition temperature in the range between 30 and 100° C., particularly between 40 and 60° C.

According to another embodiment, the SMP may be an inorganic-organic, phase-segregated hybrid material such as a polyhedral oligomeric silsesquioxane (POSS)-polyurethane network. The melting temperature of the soft segment (in this case corresponding to the switching temperature $T_{trans}$) can be varied in the temperature range from 48 to 59° C. and the minimum temperature necessary for shape fixing (in this case corresponding to the crystallisation temperature of the soft segment) can be varied in the temperature range from 18 to 36° C. by means of the synthesis. Network materials of such kind are characterized by excellent shape memory properties, which are ultimately determined by the chain length of the soft segment (number of repeating units of the polycaprolactone) and the associated proportion of hard to soft segments, and the degree of crosslinking.

The SMP may also have the form of a shape memory polymer composite. In this context, it should be noted that the terms shape memory polymer and shape memory polymer composite are used interchangeably here. In other words, a correspondingly suitable SMP composite may be used just as well instead of a shape memory polymer, or vice versa. The term SMP composite is used to describe those materials in which one or more filler substances are embedded in the SMP matrix.

In the present case, a dyeing process has been developed especially for polymers with shape memory properties. In this context, poly(ester urethanes), epoxy- and styrene-based polymers and phase-segregated hybrid materials such as polyhedral oligomeric silsesquioxane (POSS)-polyurethane networks among others were selected as model polymers.

The marking method described here is based on the engraving of surfaces of an SMP that have been dyed beforehand in order to improve readability (contrast). The dyeing method used in this case comprises the steps of:
1) pretreating/cleaning the polymer with the swelling agent
2) dyeing one side of the polymer surface
3) cleaning the polymer surface with water to remove excess dye solution
4) drying the polymer
5) engraving with a laser beam or by mechanical or chemical methods.

The sequence of steps for dyeing and engraving is shown schematically in FIG. 1.

Conventional dyeing processes often lead to the complete colouring of polymers, since the dye is dispersed in the polymer matrix, e.g., due to the fact that it is covalently bonded to the polymer matrix or completely penetrates the polymer matrix.

With the dyeing procedure described here, however, the near-surface layers of a shape memory polymer can be dyed quickly and with relatively little effort after polymer production has been completed (polymerisation and curing). This applies especially for the poly(ester urethanes) used here as model polymers, as well as for epoxy- and styrene-based polymers and chemically cross-linked organic-inorganic hybrid materials, such as polyhedral oligomeric silsesquioxane (POSS)-polyurethane networks, all of which have strong shape memory properties. Epoxy- and styrene-based polymers with shape memory show a significant change in mechanical properties at the glass transition temperature thereof. In "standard Veriflex" (styrene-based) and Veriflex E2 (epoxy-based) (both from the same manufacturer, CRG Industries) the glass transition can be used both for fixing an imposed form by cooling it below the glass transition temperature ($T_g$) and subsequently for thermal switching by heating to a temperature above $T_g$. In the case of phase-segregated hybrid materials such as polyhedral oligomeric silsesquioxane (POSS)-polyurethane networks, the shape of a form that has been imposed above the soft segment melting temperature may be fixed by crystallization of the switching segment (soft segment); the shape recovery is effected by heating to above the melting temperature of the soft segment.

After dyeing, the dye or dye mixture remains close to the surface. The surface, which are advantageously able to be coloured on one side only, can be structured either mechanically by means of material removing, cutting processes, or chemically by abrasion, or by means of laser energy.

Lasers that may be considered suitable for this purpose include $CO_2$ lasers or material ablating excimer lasers (KrF, ArF, XeCl, Nd:YAG). By engraving, the surface of a polymer item can be structured in such manner as to ensure sufficiently good contrast between the applied marking and the dyed polymer surface. This applies for example to geometrical figures, glyphs, pictograms, ideograms, hieroglyphs, symbols, signs, chemical formulae, mathematical formulae, physical formulae, component drawings, thematic cards, signatures, graphics, logos, photographic images, numbers and codes such as QR codes, data matrix codes or barcodes. In addition, the dyes used can remain in the dyed near-surface polymer layers even when for example areas of the polymer surface are engraved with a $CO_2$ laser, the polymer is then thermomechanically programmed and the polymer item is then restored to its permanent shape by time-delayed triggering of the shape memory effect in the programmed SMP. The methods of thermomechanical programming of an SMP are known to a person skilled in the art and include any deformation caused by mechanical stress (e.g. compressive and/or tensile and/or torsional stress, etc.) at a temperature in the range of the transition temperature of the SMP or above the $T_{trans}$, followed by re-cooling to a shape fixing temperature ($T_{fix}$), wherein the force applied to effect the deformation is dissipated to a large extent during cooling and when the temperature falls below a phase transition (glass or crystallization transition). This type of stress is referred to in this document as thermo-mechanical shaping. The restoration of the SMP to its primary shape, i.e., the initiation of the SME, then takes place when an item—e.g., a label used to mark a product—is again heated up to close to the transition temperature ($T_{trans}$) or to a temperature above the transition temperature ($T_{trans}$).

This has the advantage that the engraved information is then visible with the naked eye again, or can be detected easily with a readout device (scanner). The creation of codes that can be read without error by machines represents one of the essential advantages of the methods and techniques, dyes, dye solutions, and the use thereof. The underlying reason for the effect obtained consists in that the contrast necessary for good readability is retained after shape recovery, even after it has been exposed to thermomechanical deforming and/or weathering action.

A further essential advantage is the stability of the applied dye with respect to various loading scenarios, such as cyclic reprogramming the SMP item while maintaining the visual contrast ratios necessary for reliable machine readability. The contrast in this context is considered to be the optical contrast between the dyed surface and an engraved surface introduced by chemical abrasion or mechanical or laser means and/or by selective removal of a material layer.

According to preferred embodiments, the dyeing process described here is used for the thermoplastically processable polyurethane elastomers cited in EP 0571830 B1. Such thermoplastically processable polyurethane elastomers with improved processing characteristics are polyurethane elastomers such as are obtained in a multi-step reaction according to the following steps 1) to 3):

1) Essentially linear polyols having molecular weights from 500 to 5,000 are reacted with an excess quantity of diisocyanate of general formula OCN—Z—NCO, wherein Z is a divalent organic radical, to form a higher-molecular weight NCO prepolymer, preferably with an NCO/OH ratio from 1.1:1 to 5.0:1.
2) The NCO prepolymer prepared in step 1) is mixed with the remaining amount of diisocyanate, so that when all of the reaction components from stages 1), 2) and 3) are included, a ratio of NCO to active H is set from 0.9:1 to 1.2:1.
3) The mixture prepared in step 2) is reacted with at least one low molecular weight diol, and optionally a triol and/or diamine chain extender having molecular weights in the range from 62 to 500 to form the polyurethane.

In embodiments described herein, polyurethane elastomers obtained according to the multistep synthesis described above were used as SMPs in the form of plane-parallel plate blanks, then dyed on one side as described, engraved on the dyed side, trimmed (shaped as labels) with $CO_2$ laser or by means of a sand or water jet, and optionally thermomechanically programmed by tensile or compressive load and exposed to various other load scenarios, or exposed to various load scenarios directly after engraving and trimming.

According to other embodiments, block copolymers consisting of trans-polyisoprene and urethanes may be marked using the described dyeing process. Such shape memory polymers exhibit a strong shape memory effect. Their recovery temperature is 65° C., the crystallisation temperature thereof depends on the chemical composition and can be adjusted between 0 and 30° C. According to further embodiments, the glass transition temperature ($T_g$) and thus also the elasticity of the shape memory polymer is adjusted at room temperature via the molar composition of the reactants (raw materials) used for the shape memory polymer matrix.

A value adapted to the intended application can be set by using the formulation ratio of the polyols and diisocyanates, and of the selected chain extenders used in the preparation of the respective polyurethane. For exemplary purposes, the following table shows forty different formulations for obtaining a SMP from various components (raw materials) based on U.S. Pat. No. 5,145,935.

The general formula of the 40 synthetic polyurethane elastomere is as follows:

in which m=1~16, n=0~16.

TABLE 1

| Raw materials and molar formulation ratio | Molecular Weight | 1 | 2 | 3 | 4 | 5 | 6 | 7 | 8 | 9 | 10 |
|---|---|---|---|---|---|---|---|---|---|---|---|
| Diisocyanates | | | | | | | | | | | |
| 2,4-toluene diisocyanate | 174 | 1.5 | | | 1.5 | | | | | | |
| 4,4'-diphenylmethane diisocyanate | 250 | | | 1.5 | | | 1.5 | | 1.5 | 1.5 | 1.5 |

TABLE 1-continued

| | | | | | | | | | | | |
|---|---|---|---|---|---|---|---|---|---|---|---|
| 4,4'-diphenylmethane diisocyanate (carbodiimide-modified) | 290 | | | | | | 1.5 | | | | |
| 4,4'-Diphenylmethane diisocyanate (carbodiimide-modified) | 303 | | 1.5 | 1.5 | | | | | | | |
| Hexamethylene diisocyanate | 168 | | | | | | | | 1.5 | | |
| Polyols | | | | | | | | | | | |
| Polypropylene glycol | 400 | | | | | | | | | | |
| Polypropylene glycol | 700 | | 1.0 | 1.0 | 1.0 | 1.0 | 1.0 | 1.0 | 1.0 | 1.0 | 1.0 |
| Polypropylene glycol | 1000 | 0.88 | | | | | | | | | |
| 1,4-butane glycol adipate | 600 | | | | | | | | | | |
| 1,4-butane glycol adipate | 1000 | | | | | | | | | | |
| 1,4-butane glycol adipate | 2000 | | | | | | | | | | |
| Polytetramethylene glycol | 650 | | | | | | | | | | |
| Polytetramethylene glycol | 850 | | | | | | | | | | |
| Polytetramethylene glycol | 1000 | | | | | | | | | | |
| Polyethylene glycol | 600 | | | | | | | | | | |
| Bisphenol-A + Propylene oxide | 800 | 1.0 | | | | | | | | | |
| Chain extender | | | | | | | | | | | |
| Ethylene glycol | 62 | | | | | | | | 0.51 | | |
| 1,4-butane glycol | 90 | 0.51 | | | | | | | | 0.51 | |
| Bis(2-hydroxyethyl)hydroquinone | 198 | | | | | | | | | | |
| Bisphenol-A + Ethylene oxide | 327 | | | | | | | | | | |
| Bisphenol-A + Ethylene oxide | 360 | | 0.51 | 0.51 | 0.51 | 0.51 | 0.51 | 0.51 | | | |
| Bisphenol-A + Propylene oxide | 360 | | | | | | | | | | 0.51 |
| Measured values of physical variables | | | | | | | | | | | |
| $T_g$ (° C.) | | 24 | −10 | 15 | −11 | 14 | 16 | −45 | 9 | 6 | 12 |
| E/E' | | 170 | 73 | 69 | 23 | 129 | 133 | 20 | 117 | 128 | 97 |
| Degree of crystallization (wgt. %) | | | 20 | 20 | 30 | | | 25 | | | |

| Raw materials and molar formulation ratio | | 11 | 12 | 13 | 14 | 15 | 16 | 17 | 18 | 19 | 20 |
|---|---|---|---|---|---|---|---|---|---|---|---|
| Diisocyanates | | | | | | | | | | | |
| 2,4-toluene diisocyanate | | | | | | | | | | | |
| 4,4'-diphenylmethane diisocyanate | | 1.5 | 1.5 | 1.5 | 1.2 | 1.8 | 1.35 | 1.35 | 1.35 | 1.35 | 1.35 |
| 4,4'-diphenylmethane diisocyanate (carbodiimide-modified) | | | | | | | | | | | |
| 4,4'-Diphenylmethane diisocyanate (carbodiimide-modified) | | | | | | | | | | | |
| Hexamethylene diisocyanate | | | | | | | | | | | |
| Polyols | | | | | | | | | | | |
| Polypropylene glycol | | | | | | | | | | | |
| Polypropylene glycol | | 1.0 | 1.0 | | 1.0 | 1.0 | 1.0 | | | | |
| Polypropylene glycol | | | | | | | | 1.0 | | | |
| 1,4-butane glycol adipate | | | | | | | | | 1.0 | | |
| 1,4-butane glycol adipate | | | | | | | | | | 1.0 | |
| 1,4-butane glycol adipate | | | | | | | | | | | 1.0 |
| Polytetramethylene glycol | | | | | | | | | | | |
| Polytetramethylene glycol | | | | | | | | | | | |
| Polytetramethylene glycol | | | | | | | | | | | |
| Polyethylene glycol | | | | 1.0 | | | | | | | |
| Bisphenol-A + Propylene oxide | | | | | | | | | | | |
| Chain extender | | | | | | | | | | | |
| Ethylene glycol | | | | | | | | | | | |
| 1,4-butane glycol | | | 0.51 | | | | | | | | |
| Bis(2-hydroxyethyl)hydroquinone | | | | | | | | | | | |
| Bisphenol-A + Ethylene oxide | | 0.51 | | | 0.21 | 0.81 | 0.36 | 0.36 | 0.36 | 0.36 | 0.36 |
| Bisphenol-A + Ethylene oxide | | | | | | | | | | | |
| Bisphenol-A + Propylene oxide | | | | | | | | | | | |
| Measured values of physical variables | | | | | | | | | | | |
| $T_g$ (° C.) | | 16 | −7 | −68 | −4 | 25 | 5 | −22 | 10 | −18 | −45 |
| E/E' | | 111 | 49 | 12 | 105 | 53 | 37 | 81 | 100 | 29 | 30 |
| Degree of crystallization (wgt. %) | | | 20 | 30 | | 20 | 25 | | | 25 | 25 |

| Raw materials and molar formulation ratio | Molecular Weight | 21 | 22 | 23 | 24 | 25 | 26 | 27 | 28 | 29 | 30 |
|---|---|---|---|---|---|---|---|---|---|---|---|
| Diisocyanates | | | | | | | | | | | |
| 2,4'-toluene diisocyanate | 174 | | | | | | | 1.5 | 1.4 | 1.3 | 1.2 |
| 4,4'-diphenylmethane diisocyanate | 250 | 1.4 | 1.4 | 1.4 | 1.5 | 1.5 | 1.35 | | | | |
| 4,4'-diphenylmethane diisocyanate (carbodiimide-modified) | 290 | | | | | | | | | | |

TABLE 1-continued

| Raw materials and molar formulation ratio | | | | | | | | | | | |
|---|---|---|---|---|---|---|---|---|---|---|---|
| Diisocyanates | | | | | | | | | | | |
| 4,4'-Diphenylmethane diisocyanate (carbodiimide-modified) | 303 | | | | | | | | | | |
| Hexamethylene diisocyanate | 168 | | | | | | | | | | |
| Polyols | | | | | | | | | | | |
| Polypropylene glycol | 400 | | | | | | 1.0 | | | | |
| Polypropylene glycol | 700 | | | | 1.0 | 1.0 | | | | | |
| Polypropylene glycol | 1000 | | | | | | | | | | |
| 1,4-butane glycol adipate | 600 | | | | | | | | | | |
| 1,4-butane glycol adipate | 1000 | | | | | | | | | | |
| 1,4-butane glycol adipate | 2000 | | | | | | | | | | |
| Polytetramethylene glycol | 650 | 1.0 | | | | | | | | | |
| Polytetramethylene glycol | 850 | | 1.0 | | | | | | | | |
| Polytetramethylene glycol | 1000 | | | 1.0 | | | | | | | |
| Polyethylene glycol | 600 | | | | | | | | | | |
| Bisphenol-A + Propylene oxide | 800 | | | | | | | 1.0 | 1.0 | 1.0 | 1.0 |
| Chain extender | | | | | | | | | | | |
| Ethylene glycol | 62 | | | | | | | | | | |
| 1,4-butane glycol | 90 | | | | | | | | | | |
| Bis(2-hydroxyethyl)hydroquinone | 198 | | | | | | | 0.5 | 0.4 | 0.3 | 0.2 |
| Bisphenol-A + Ethylene oxide | 327 | 0.4 | 0.4 | 0.4 | 0.4 | 0.35 | 0.36 | | | | |
| Bisphenol-A + Ethylene oxide | 360 | | | | | | | | | | |
| Bisphenol-A + Propylene oxide | 360 | | | | | | | | | | |
| Measured values of physical variables | | | | | | | | | | | |
| $T_g$ (° C.) | | −18 | −30 | −38 | 5 | 8 | 23 | 26 | 21 | 19 | 19 |
| E/E' | | 33 | 18 | 40 | 33 | 100 | 126 | 140 | 125 | 108 | 101 |
| Degree of crystallization (wgt. %) | | 25 | 25 | 25 | 15 | 15 | 10 | 15 | 15 | 15 | 15 |

| Raw materials and molar formulation ratio | 31 | 32 | 33 | 34 | 35 | 36 | 37 | 38 | 39 | 40 |
|---|---|---|---|---|---|---|---|---|---|---|
| Diisocyanates | | | | | | | | | | |
| 2,4'-toluene diisocyanate | | | 1.5 | | | | | | | |
| 4,4'-diphenylmethane diisocyanate | 1.6 | 1.7 | | 1.3 | 1.7 | 1.6 | 1.7 | 1.5 | 1.5 | 1.8 |
| 4,4'-diphenylmethane diisocyanate (carbodiimide-modified) | | | | | | | | | | |
| 4,4'-Diphenylmethane diisocyanate (carbodiimide-modified) | | | | | | | | | | |
| Hexamethylene diisocyanate | | | | | | | | | | |
| Polyols | | | | | | | | | | |
| Polypropylene glycol | | | | | | | | | | |
| Polypropylene glycol | 1.0 | 1.0 | | 1.0 | 1.0 | 1.0 | 1.0 | | | |
| Polypropylene glycol | | | | | | | | | | |
| 1,4-butane glycol adipate | | | | | | | | | | |
| 1,4-butane glycol adipate | | | | | | | | | | |
| 1,4-butane glycol adipate | | | | | | | | | | |
| Polytetramethylene glycol | | | | | | | | | | |
| Polytetramethylene glycol | | | | | | | | | | |
| Polytetramethylene glycol | | | | | | | | | | |
| Polyethylene glycol | | | | | | | | | | |
| Bisphenol-A + Propylene oxide | | | 1.0 | | | | | 1.0 | 1.0 | 1.0 |
| Chain extender | | | | | | | | | | |
| Ethylene glycol | | | | 0.3 | 0.7 | 0.5 | 0.5 | | | |
| 1,4-butane glycol | | | | | | | | 0.5 | | |
| Bis(2-hydroxyethyl)hydroquinone | | | 0.5 | | | | | | 0.5 | 0.8 |
| Bisphenol-A + Ethylene oxide | | | | | | | | | | |
| Bisphenol-A + Ethylene oxide | 0.5 | 0.5 | | | | | | | | |
| Bisphenol-A + Propylene oxide | | | | | | | | | | |
| Measured values of physical variables | | | | | | | | | | |
| $T_g$ (° C.) | 10 | 11 | 22 | 2 | 15 | 11 | 12 | 35 | 40 | 48 |
| E/E' | 126 | 126 | 107 | 83 | 122 | 100 | 135 | 124 | 138 | 152 |
| Degree of crystallization (wgt. %) | 15 | 20 | 15 | 20 | 15 | 15 | 10 | 10 | 5 | 5 |

Dyes that are suitable for colouring near-surface layers of SMPs include triaryl methane dyes such as hydroxytriphenylmethane dyes, phthaleins and sulphone phthaleins, and aminotriphenyl methane dyes such as methyl violet dyes, fuchsine dyes, phenol dyes and malachite green dyes, as well as the cationic dyes consisting of the compounds Basic Blue 8 (Victoria Blue, 4-((4-(Dimethylamino)phenyl)(4-toluidino-1-naphthyl)methylene)cyclohexa-2,5-dien-1-ylidene) dimethylammonium chloride), Basic Red 28 or 3-[(1,3-Dihydro-1,3,3-trimethyl-2H-indol-2-ylidene)ethylidene]-9-ethyl-3H-carbazolium chloride, Basic Green 1 or Ethyl Green or Brilliant Green or (4-[(4-Diethylamino)-α-phenylbenzylidene]-N,N-diethylcyclohexa-2,5-dienylidene ammonium hydrogen sulphate), Nile Blue (Basic Blue 12, 5-Amino-9-(diethylamino) benzo[a]phenoxazin-7-ium) and Methylene Blue (Basic Blue 9, 3,7-Bis(dimethylamino)-phenothiazinium chloride).

The following is an exemplary list of dye and solvent compounds for the colours black, green, blue and red, which lend themselves particularly well for dyeing poly(ester urethanes), epoxy-based and styrene-based polymers with shape memory, and chemically crosslinked inorganic-organic hybrid materials such as polyhedral oligomeric silsesquioxane (POSS)-polyurethane networks with shape memory:

Black dye solution: Ethanol (79 wt %),
  Ethyl lactate (8 wt %),
  Victoria Blue B (2 wt %),
  Basic Green 1 (5.5 wt %),
  Basic Red 28 (5.5 wt %).
Green dye solution: Ethanol (48 wt %), Acetone (48 wt %),
  Ethyl lactate (2 wt %),
  Basic Green 1 (2 wt %).
Blue dye solution 1: Ethanol (48 wt %), Acetone (48 wt %),
  Ethyl lactate (2 wt %),
  Victoria Blue R (2 wt %).
Blue dye solution 2: Ethanol (48 wt %), Acetone (48 wt %),
  Ethyl lactate (2 wt %),
  Victoria Blue B (2 wt %).
Red dye solution: Ethanol (88 wt %),
  Ethyl lactate (9.5 wt %),
  Basic Red 28 (5.5 wt %).

The common or commercial names of the suitable dyes are listed here with the substances they represent: German Basischrot 28: 3-[(1,3-Dihydro-1,3,3-trimethyl-2H-indol-2-yliden)ethyliden]-9-ethyl-3H-carbazoliumchlorid. The corresponding substance in English is Basic Red 28: 3H-Carbazolium, 3-[2-(1,3-dihydro-1,3,3-trimethyl-2H-indol-2-ylidene)ethylidene]-9-ethyl-3H-carbazoliumchloride;
German Brillantgrün: (4-[(4-Diethylamino)-α-phenylbenzyliden]-N,N-diethylcyclohexa-2,5-dienylidenammonium hydrogensulfat). The corresponding substance in English is Basic Green 1: [4-[4-(Diethylamino)benzhydrylene]cyclohexa-2,5-dien-1-ylidene]diethylammonium hydrogen sulphate. German Viktoriablau R or Kornblau R: Bis(4-dimethylaminophenyl)-(4-ethylamino-1-naphthyl)-methylium-hydrochlorid. The corresponding substance in English is Victoria Blue R or also Blue 11: N-(4-((4-(dimethylamino) phenyl)(4-(ethylamino)-1-naphthalenyl)methylene)-methanaminium-2,5-cyclohexadien-1-ylidene)-N-methyl-, chloride. German Nachtblau or Viktoria-blau B: Bis(4-dimethylaminophenyl)-(4-anilino-1-naphthyl)-methylium-hydrochlorid. The corresponding substance in English is Victoria Blue B: [4-[[4-(dimethylamino)phenyl][4-(phenylamino)-1-naphthyl]methylene]-2,5-cyclohexadien-1-ylidene]-N-methyl-methanaminium, chioride.

The person skilled in the art know that the composition of dye solutions can be varied. In particular, the proportional quantities of the solvents in the mixture may be varied. Equally, the dyes used may also be replaced with equivalent or related substances from the same or a related group of substances. In the same way, the proportional quantity or quantities of the one or more dye solutions may also also be varied. Such techniques may be applied advantageously to obtain variations in colour shades or intensities.

Figure 2:
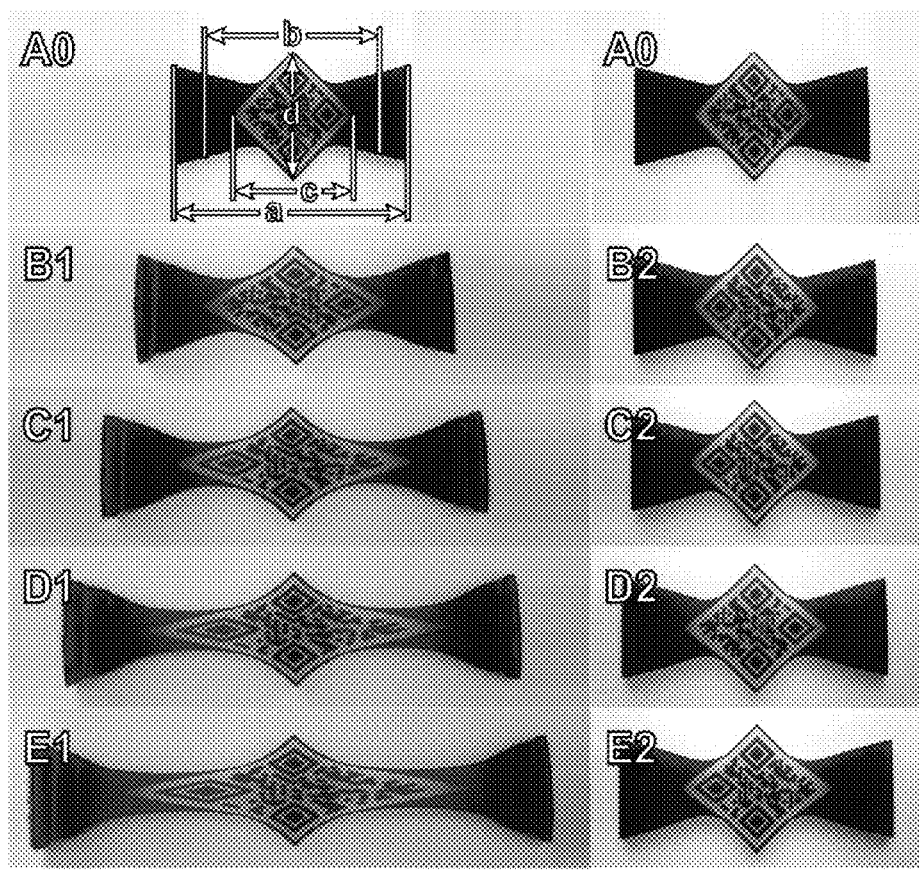
FIG. 2 shows the combination of dyeing process, QR code marking, thermomechanical programming and shape recovery (of a QR code) using the example of a poly(ester urethane) label after stretching.
Figure 3:
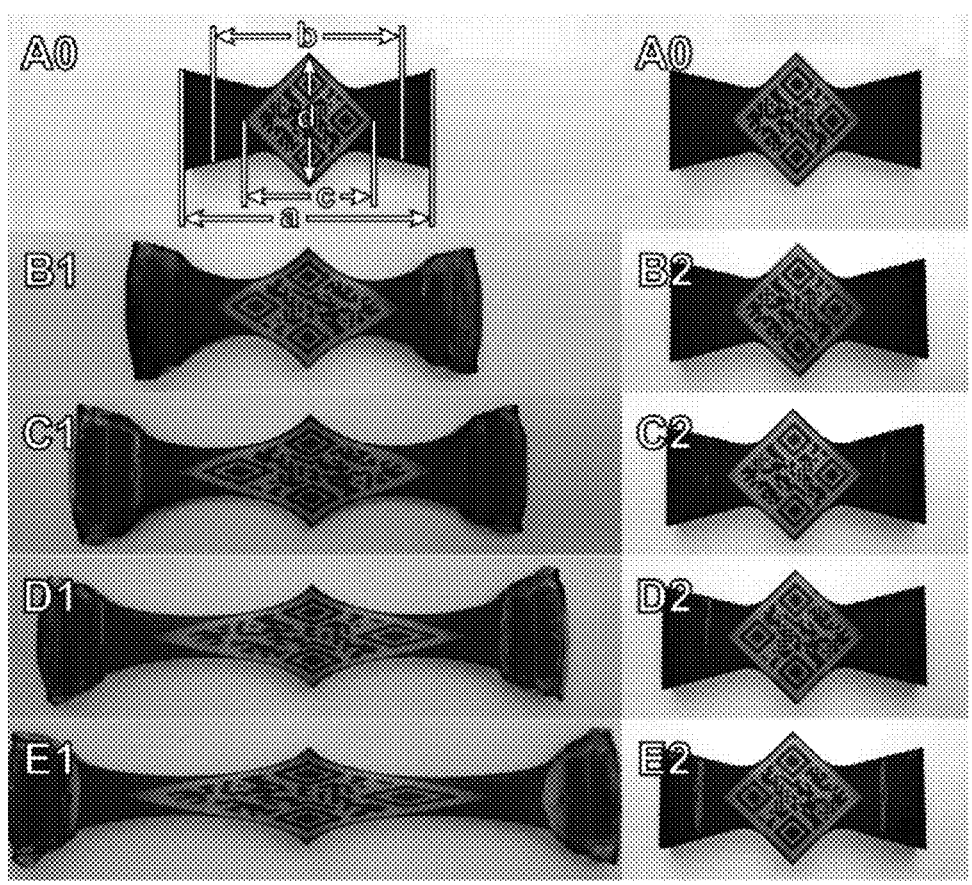
FIG. 3 shows the combination of dyeing process, QR code marking, thermomechanical programming and shape recovery (of a QR code) using the example of an epoxy-based, tempered SMP with a switching temperature of 62° C. after stretching.
Figure 4:
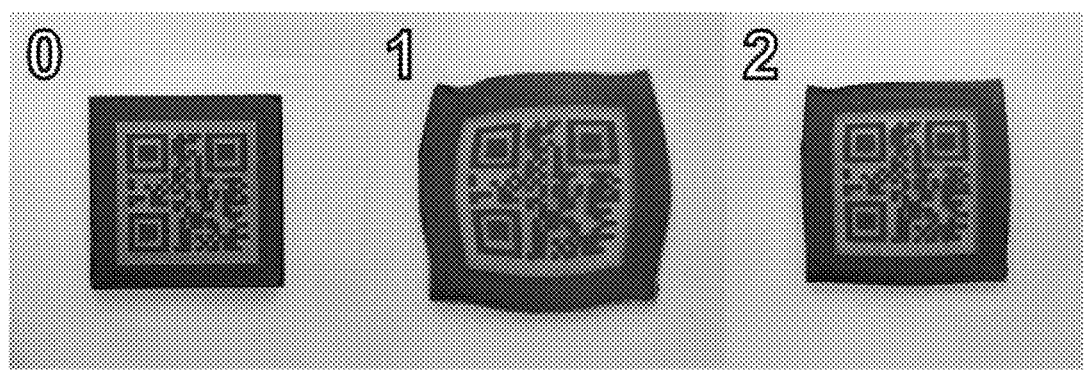
FIG. 4 the combination of dyeing process, QR code marking, thermomechanical programming and shape recovery (of a QR code) using the example of a poly(ester urethane) label after compression.
Figure 5:
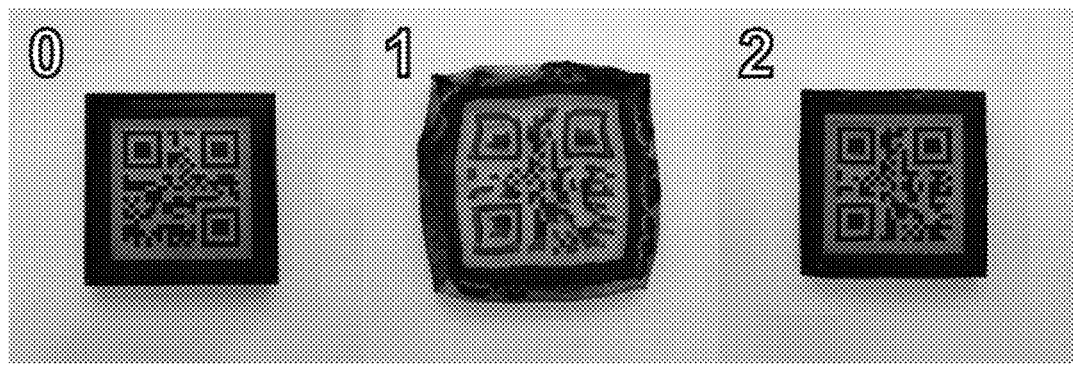
FIG. 5 the combination of dyeing process, QR code marking, thermomechanical programming and shape recovery (of a QR code) using the example of an epoxy-based, tempered SMP with a switching temperature of 62° C. after compression.
Figure 6:
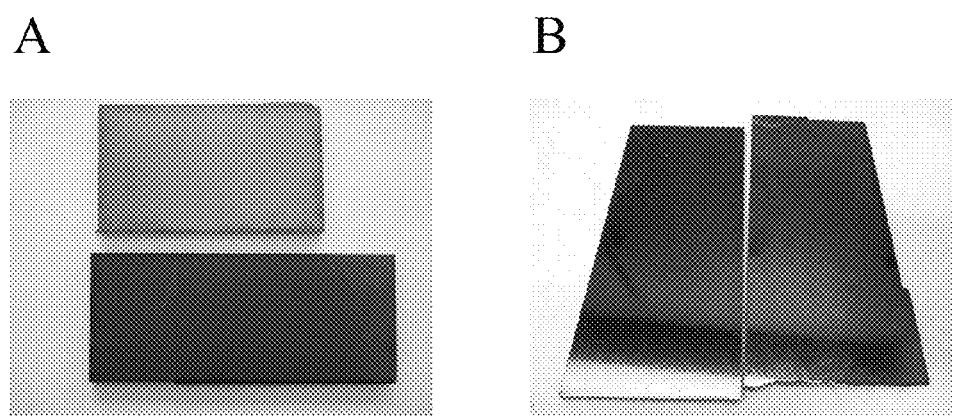
FIG. 6 shows the results of dyeing epoxy-based polymers.
Figure 7:
In FIG. 7, the results of the thermomechanical behaviours of poly(ester urethane) SMP and epoxy-based SMP are shown side-by-side for comparison purposes.
Figure 7:
Figure 7:
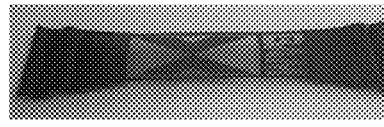
Figure 7:
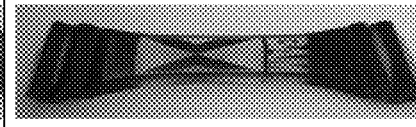
Figure 7:
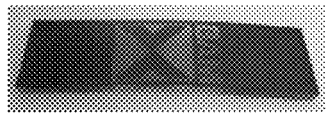
Figure 7:
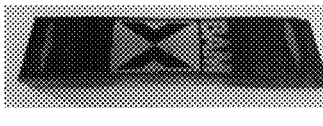
Figure 8:
FIG. 8 shows results of the weathering of markings in dyed poly(ester urethane).
Figure 8:
Figure 8:
Figure 9:
FIG. 9 shows results regarding resistance to deionised water of markings in dyed epoxy-based SMP.
Figure 9:
Figure 10:
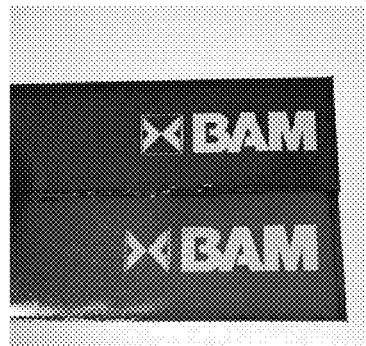
FIG. 10 shows results of the weathering of markings in dyed epoxy-based SMP.
Figure 10:
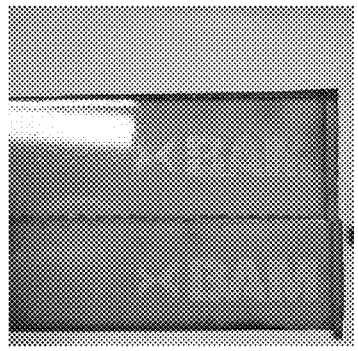
Figure 10:
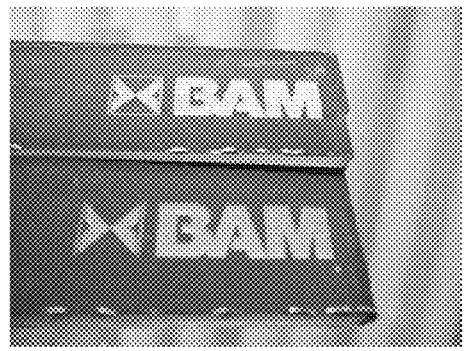
Figure 10:
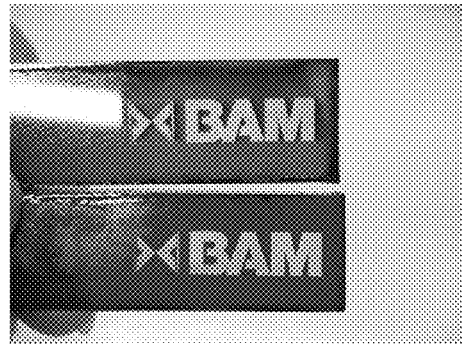
Figure 11:
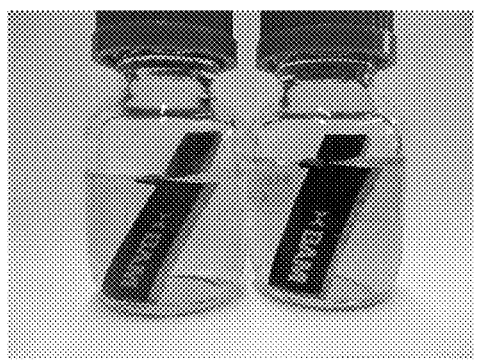
FIG. 11 shows results regarding resistance to deionised water of markings in tempered epoxy-based SMP.
Figure 11:
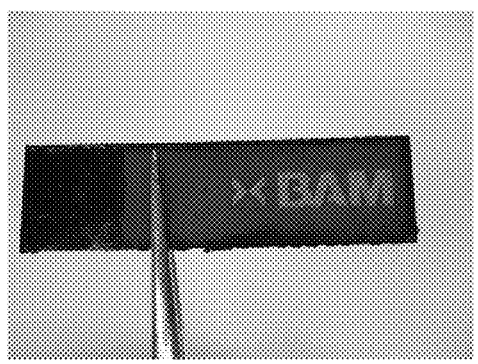
Figure 12:
FIG. 12 shows results of the weathering of markings in tempered epoxy-based SMP.
Figure 12:
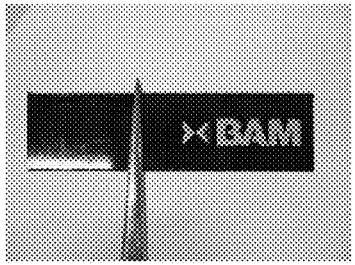
Figure 12:
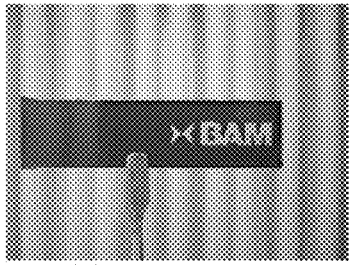
Figure 12:
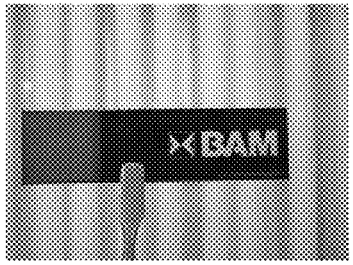
Figure 12:
Figure 12:
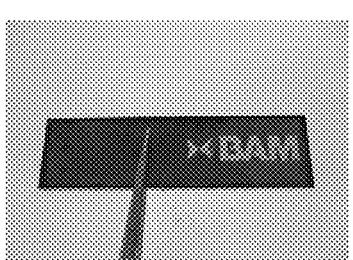
Figure 14A:
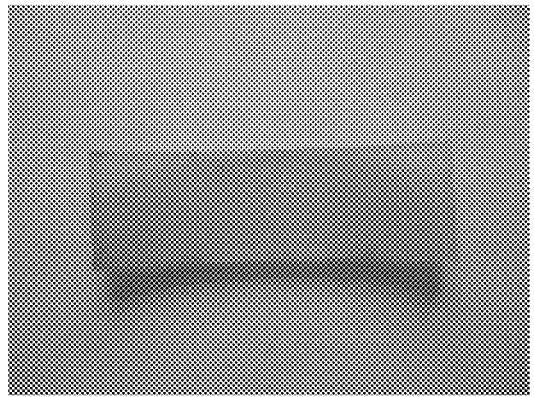
FIG. 14 a polymer item coloured with thermochromic dye.
Figure 14B:
Figure 15:
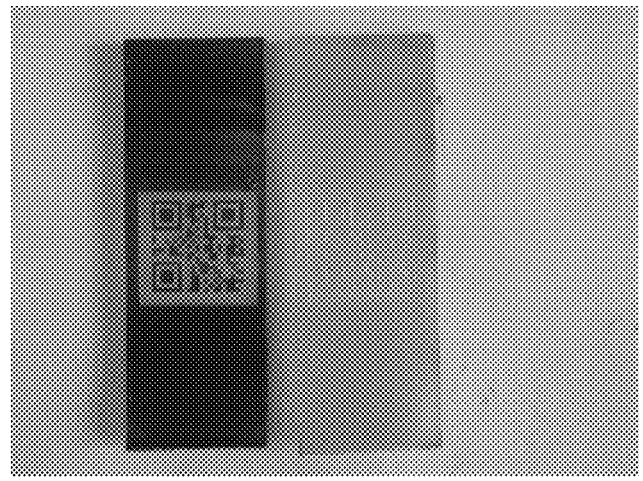
FIG. 15 the appearance of the polymer item as a function of temperature.
Figure 16:
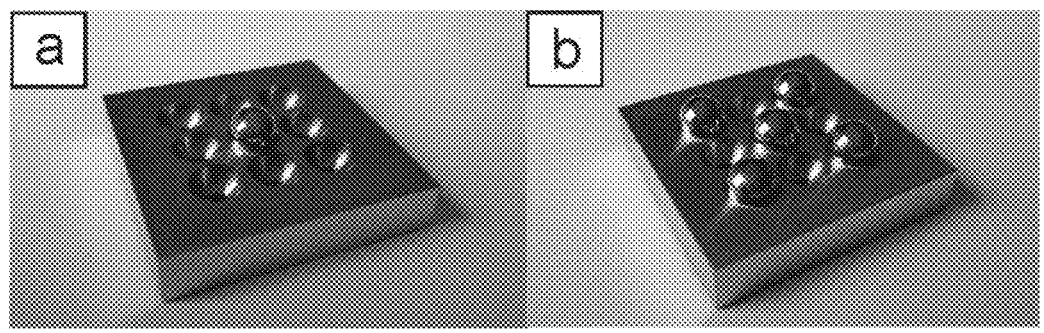
FIG. 16 a freely configurable embossing stamp based on steel balls.
Figure 17:
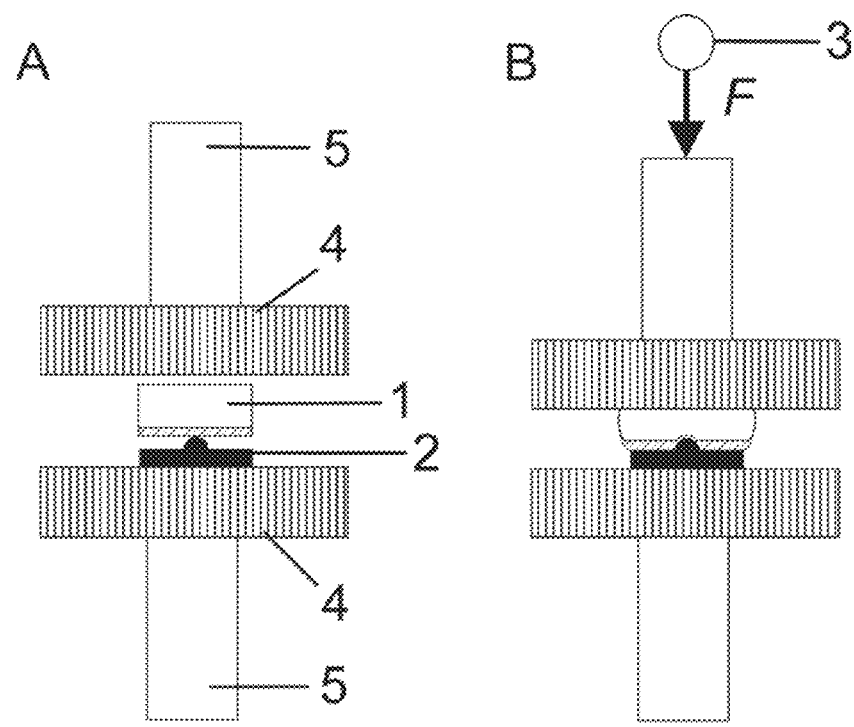
FIG. 17 the principle of compressive deformation of SMPs.
Figure 18:
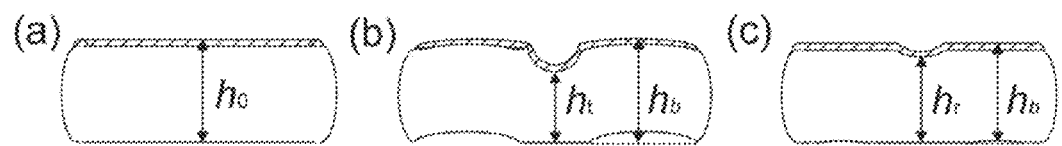
FIG. 18 a diagram of the deformation of SMP upon compression.
Figure 19:
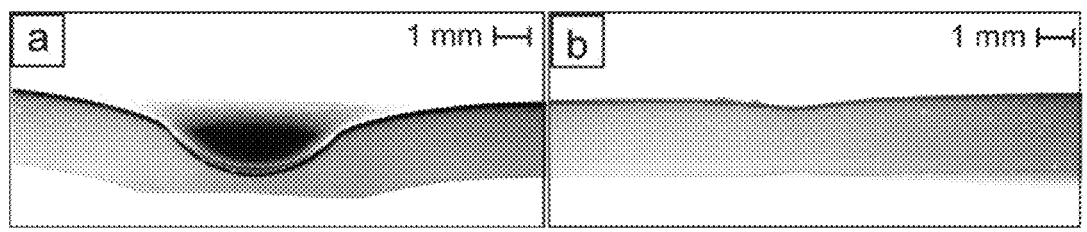
FIG. 19 the cross section of a deformation before and after recovery.
Figure 20:
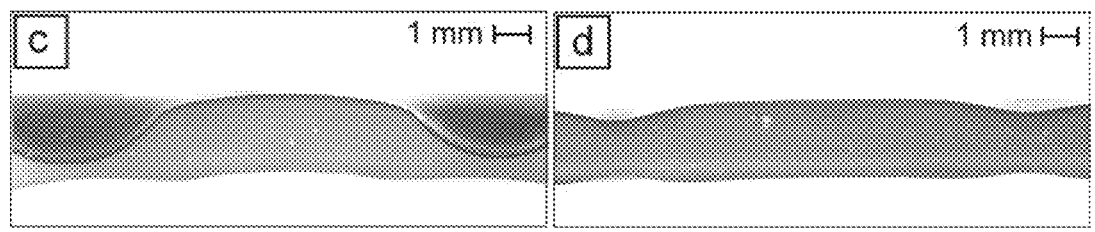
FIG. 20 the recovery at the cross section with adjacent deformations.
Figure 21:
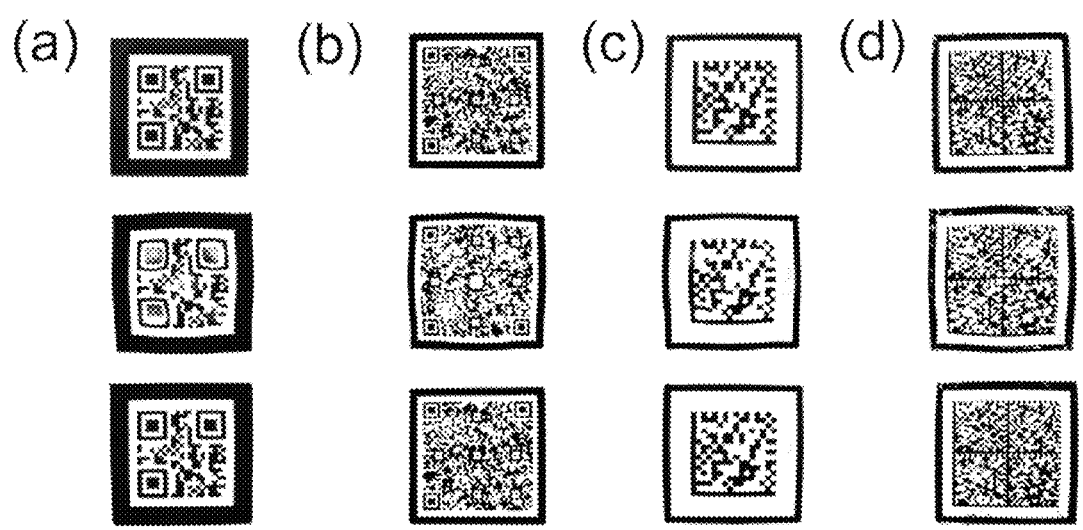
FIG. 21 intelligent labels in original, temporary and recovered states.
Figure 22:
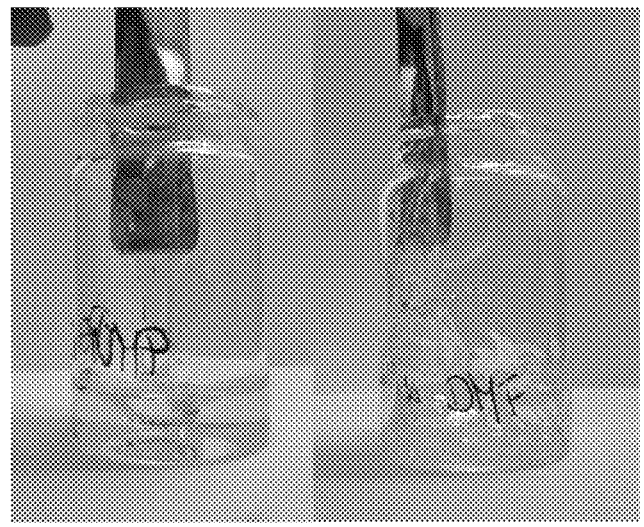
FIG. 22 mixing SMP pastes in various solvents.
Figure 23:
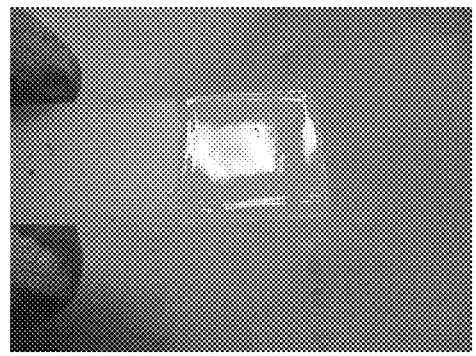
FIG. 23 a freshly applied SMP paste on an SMP substrate.
Figure 24:
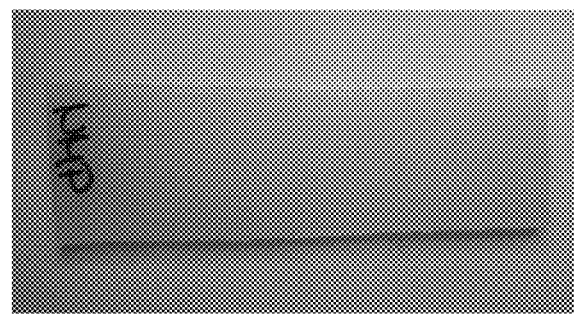
FIG. 24 a transparent SMP film after drying on an SMP substrate.
Figure 25:
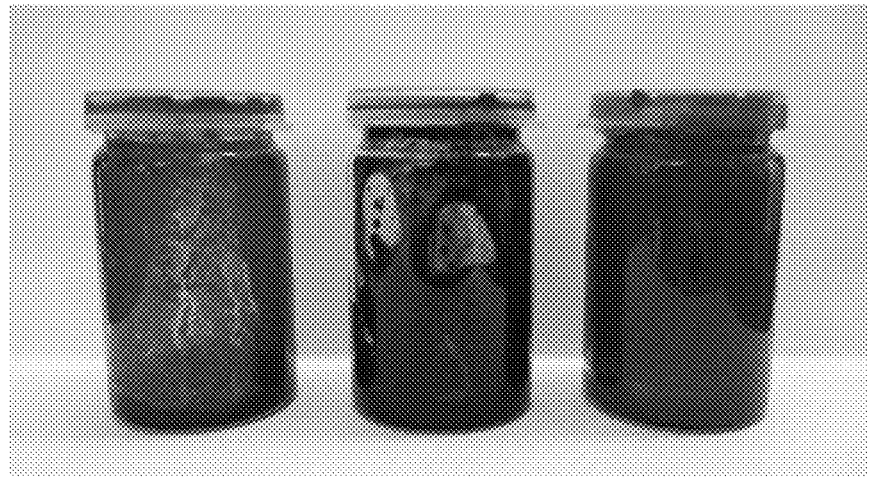
FIG. 25 SMP pastes with thermochromic pigments at 23° C.
Figure 26:
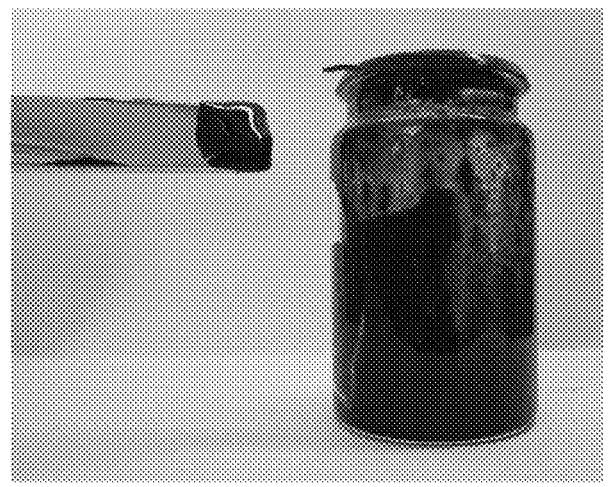
FIG. 26 an SMP paste dyed black with a thermochromic pigment.
Figure 27:
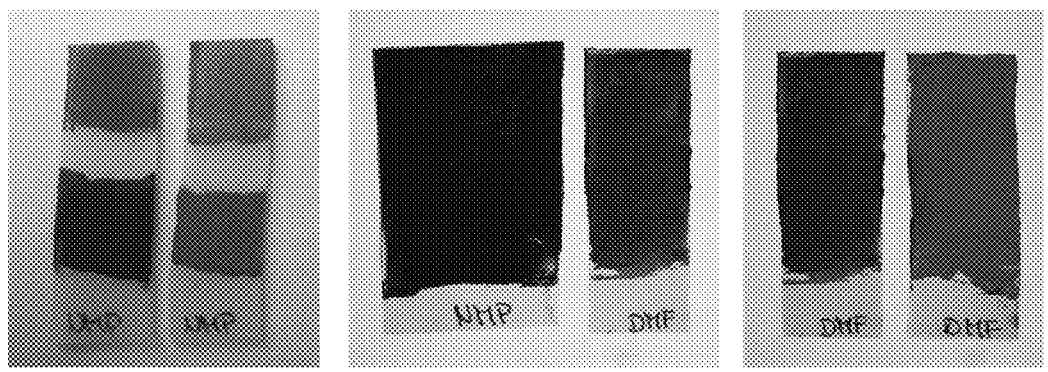
FIG. 27 thin films of thermochromic SMP pastes on a substrate.
Figure 28:
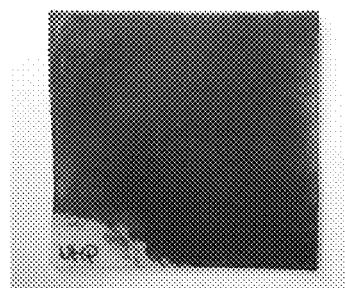
FIG. 28 a thin film of an SMP paste with thermochromic pigments.
Figure 29:
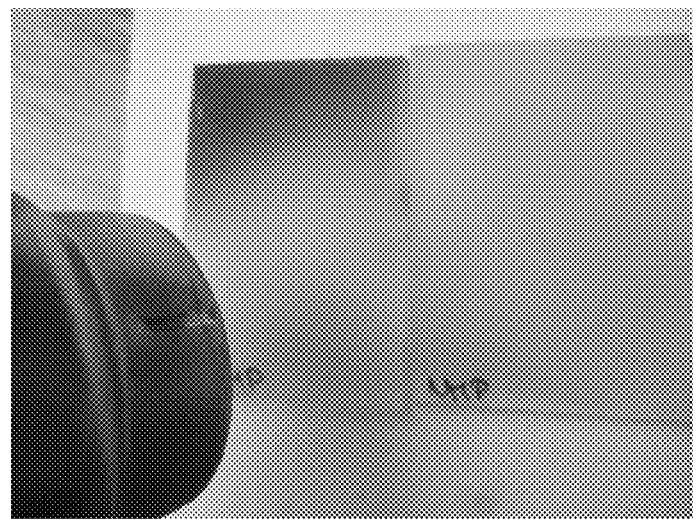
FIG. 29 the change in colour of thermochromic polymer pigment films upon heating.
Figure 30:
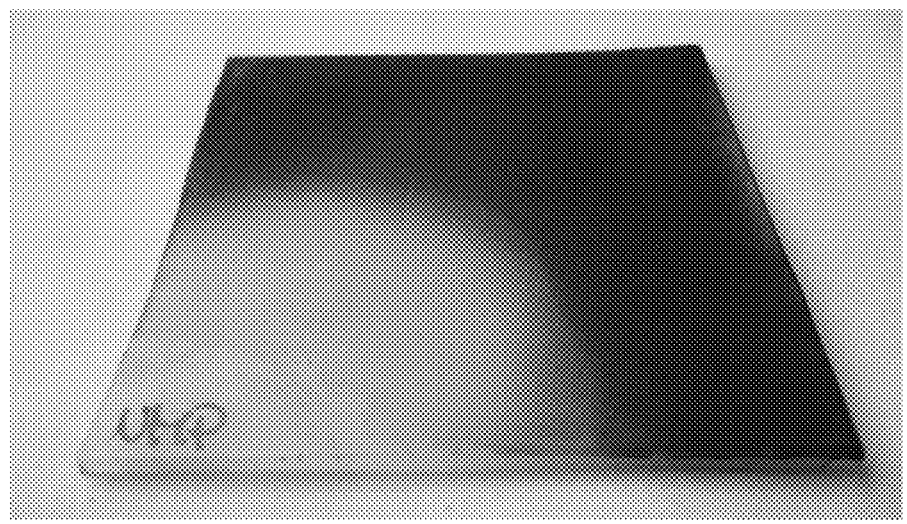
FIG. 30 temporary transparency of a thermochromic polymer pigment film.
Figure 31:
FIG. 31 thermally switchable readability of SMP-bilayer systems with engraving of the thermochromically dyed SMP-layer (QR code).
Figure 31:
Figure 31:
Figure 31:
Figure 31:
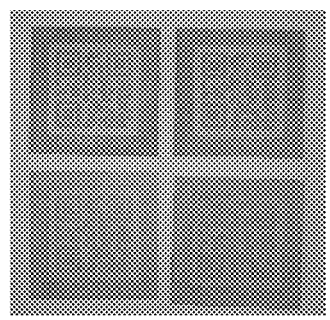
Figure 31:
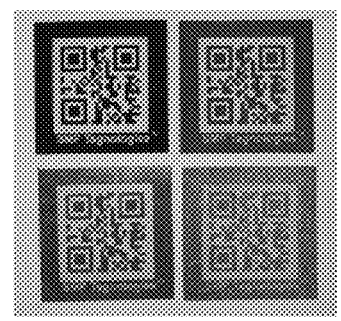
Figure 32:
FIG. 32 thermally switchable readability of SMP-bilayer systems with engraving of the thermochromic SMP layer (data matrix code).
Figure 32:
Figure 32:
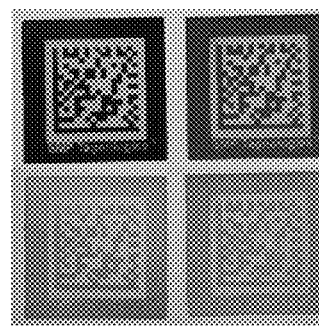
Figure 32:
Figure 32:
Figure 33:
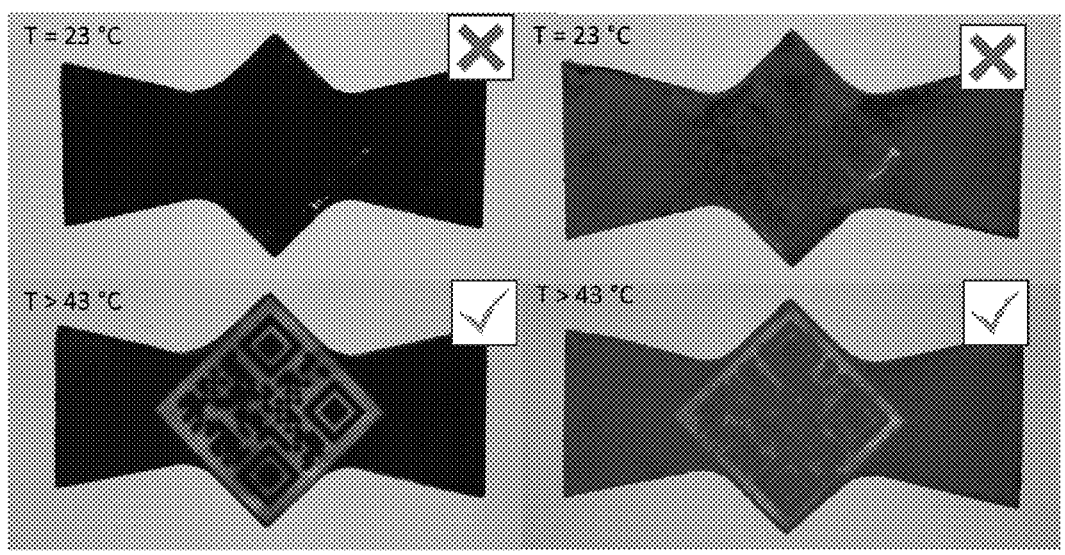
FIG. 33 thermally switchable readability through coverage with thermochromically dyed SMP-layer of a QR code in the permanent shape.
Figure 34:
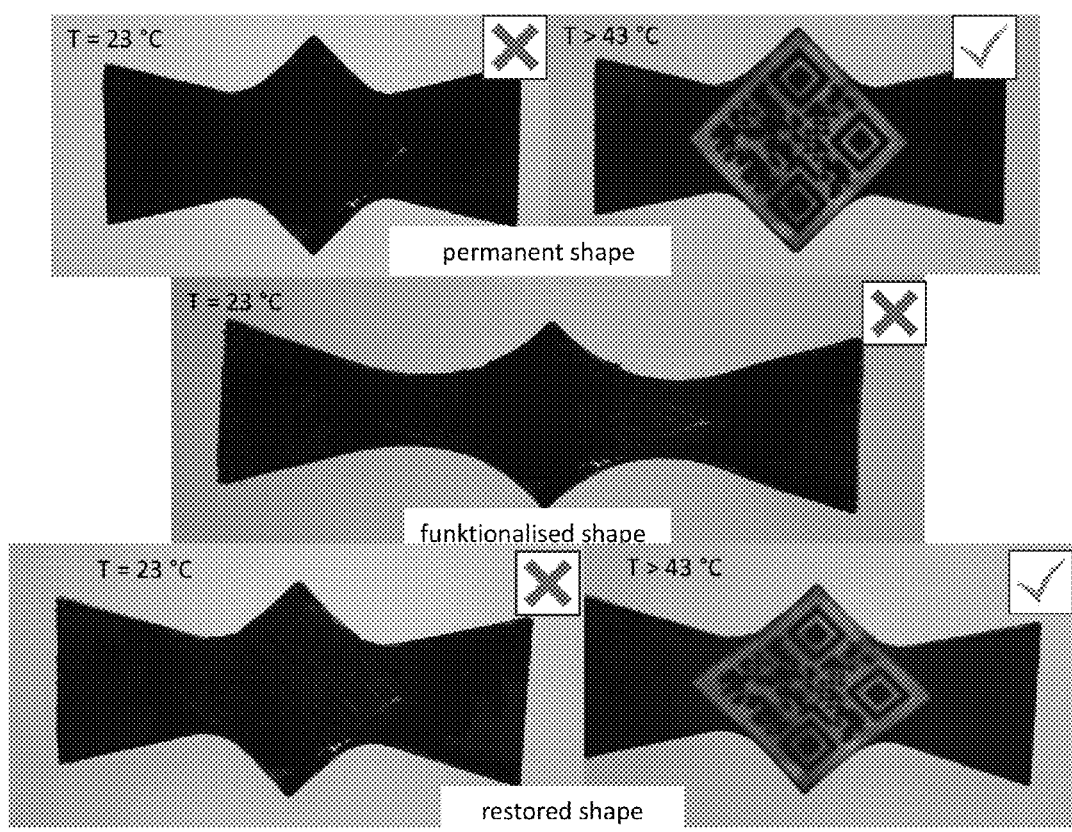
FIG. 34 masking QR codes in permanent and functionalised shape (at 23° C., lower than the temperature at which the thermochromic pigment changes colour) by dyeing the "permanently-coloured", laser-engraved polymer surface with thermochromic SMP paste.
Figure 35:
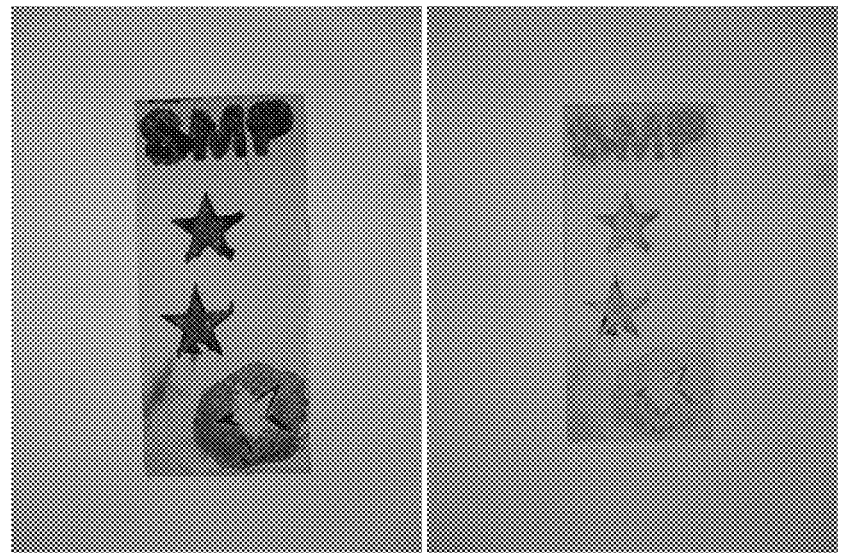
FIG. 35 view of a printed image of thermochromic polymer pigment films below and above the colour change temperature (transmitted light).
Figure 36:
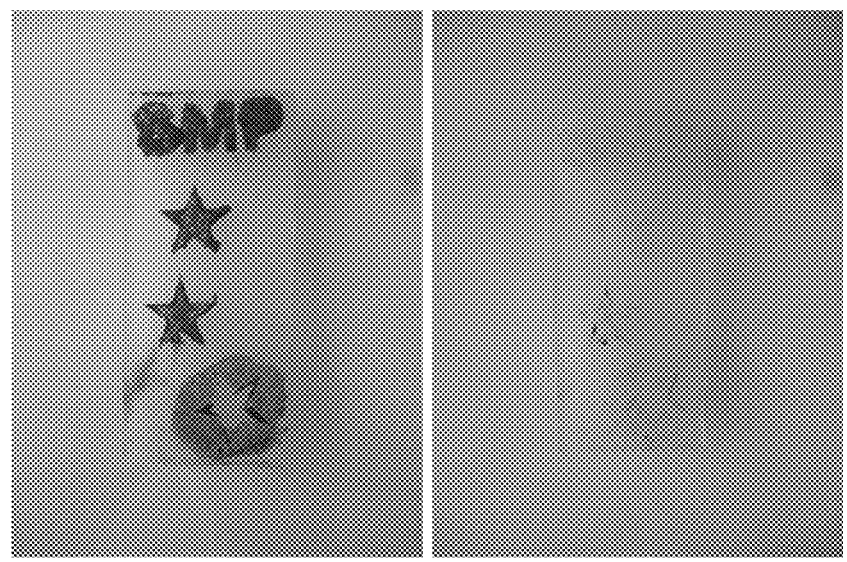
FIG. 36 view of a printed image of thermochromic polymer pigment films below and above the colour change temperature in incident light.
Figure 37:
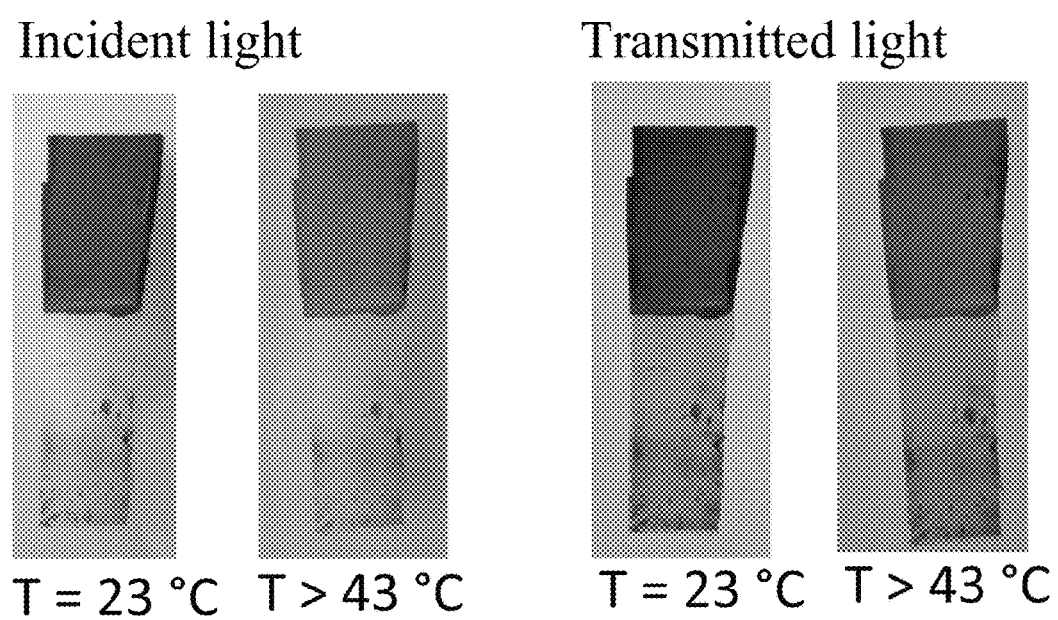
FIG. 37 the colour change in SMP films on SMP substrates, wherein a "permanent dye" is also contained in thermochromic pigment film, in incident light (left) and transmitted light (right), each below (at 23° C.) and above (higher than 43° C.) the switching temperature of the thermochromic pigment, which is 43° C.
Figure 38:
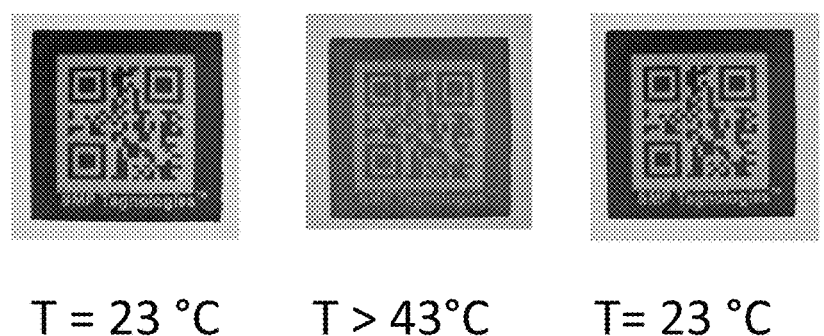
FIG. 38 the colour change in the films layer on an SMP substrate, wherein a QR code has been engraved in the film layer and the film contains both a blue thermochromic pigment and a green permanent dye.
Figure 43:
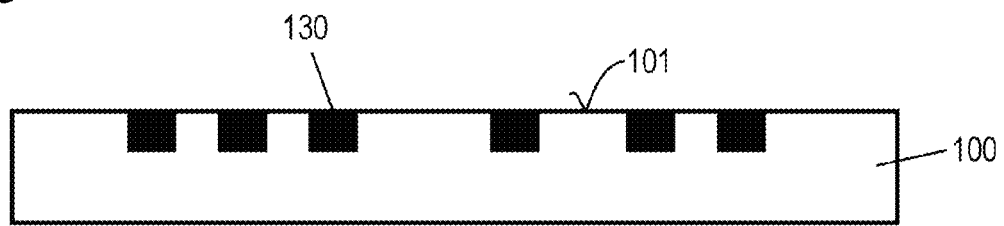
FIG. 43 application of a dye paste to an SMP item having undergone laser engraving.

In the following, results of investigations into the dye behaviours and stability tests are listed and illustrated. The figures of the drawing show:

FIG. 1 a general schematic illustration of the dyeing process;
FIG. 2 forming a QR code engraved in dyed polyesterurethane;
FIG. 3 forming a QR code engraved in dyed epoxy-based SMP;
FIG. 4 states of an intelligent label made from polyesterurethane;
FIG. 5 states of an intelligent label made from epoxy-based SMP;
FIG. 6 various material samples after surface dyeing;
FIG. 7 a comparative overview of restorability of used SMPs;
FIG. 8 results of colour fastness of dyed polyesterurethane samples;
FIG. 9 results of colour fastness of dyed epoxy-based SMP samples;
FIG. 10 results of resistance of epoxy-based samples to weathering;
FIG. 11 results of resistance of epoxy-based samples to immersion in water;
FIG. 12 results of resistance to dry heat and UV light;
FIG. 13 a polymer item with surface dyed using colourant paste;
FIG. 14 a polymer item coloured with thermochromic dye;
FIG. 15 the appearance of the polymer item as a function of temperature;
FIG. 16 a freely configurable embossing stamp based on steel balls;
FIG. 17 the principle of compressive deformation of SMPs;
FIG. 18 a diagram of the deformation of SMP upon compression;
FIG. 19 the cross section of a deformation before and after recovery;
FIG. 20 the recovery at the cross section with adjacent deformations;
FIG. 21 intelligent labels in original, temporary and recovered states;
FIG. 22 mixing SMP pastes in various solvents;
FIG. 23 a freshly applied SMP paste on an SMP substrate;
FIG. 24 a transparent SMP film after drying on an SMP substrate;
FIG. 25 SMP pastes with thermochromic pigments at 23° C.;
FIG. 26 an SMP paste dyed black with a thermochromic pigment;
FIG. 27 thin films of thermochromic SMP pastes on a substrate;
FIG. 28 a thin film of an SMP paste with thermochromic pigments;
FIG. 29 the change in colour of thermochromic polymer pigment films upon heating;
FIG. 30 temporary transparency of a thermochromic polymer pigment film;
FIG. 31 thermally switchable readability of SMP-bilayer systems with engraving of the thermochromically dyed SMP-layer (QR code);
FIG. 32 thermally switchable readability of SMP-bilayer systems with engraving of the thermochromic SMP layer (data matrix code);
FIG. 33 thermally switchable readability through coverage with thermochromically dyed SMP-layer of a QR code in the permanent shape;
FIG. 34 masking QR codes in permanent and functionalised shape
(at 23° C., lower than the temperature at which the thermochromic pigment changes colour) by dyeing the "permanently-coloured", laser-engraved polymer surface with thermochromic SMP paste;

FIG. 35 view of a printed image of thermochromic polymer pigment films below and above the colour change temperature (transmitted light);

FIG. 36 view of a printed image of thermochromic polymer pigment films below and above the colour change temperature in incident light;

FIG. 37 the colour change in SMP films on SMP substrates, wherein a "permanent dye" is also contained in thermochromic pigment film, in incident light (left) and transmitted light (right), each below (at 23° C.) and above (higher than 43° C.) the switching temperature of the thermochromic pigment, which is 43° C.;

FIG. 38 the colour change in the films layer on an SMP substrate, wherein a QR code has been engraved in the film layer and the film contains both a blue thermochromic pigment and a green permanent dye;

FIG. 39 (A to E) the formation of a surface relief with subsequent colouring of the areas from which material is removed;

FIGS. 40 (A and B) an SMP item having undergone laser engraving, before and after colouring;

FIG. 41 (A to C) an SMP item having undergone laser engraving, before and after thermomechanical programming;

FIG. 42 (A to C) an SMP item having undergone laser engraving, before and after thermomechanical programming;

FIG. 43 application of a dye paste to an SMP item having undergone laser engraving; and FIGS. 44 (A and B) application and partial removal of a dye paste on an SMP item that has undergone laser engraving.

The method described was investigated as explained on various polymers with a shape memory.

First, the surface of the shape memory polymer is cleaned, at least at the site that is to be dyed. A solvent or a solvent-containing composition may be used for this. Then, the respective swelling agent is applied. A swelling agent is an organic solvent that by virtue of its molecular weight and polarity is capable of penetrating at least one phase of a block copolymer having shape memory properties (SMP), for example by diffusion, thereby increasing the volume thereof. As a result, the SMP swells. In the case of poly (esterurethanes), styrene- and epoxy-based shape memory polymers, acetone, dichloromethane and N,N-dimethyl formamide and/or mixtures were shown to be highly suitable swelling agents. In the case of chemically cross-linked, inorganic-organic hybrid materials such as polyhedral oligomeric silsesquioxane (POSS)-polyurethane networks, the most effective agent was found to be dichloromethane. After about 1 to 60 s contact time at room temperature (23° C.), the residual swelling agent is removed from the polymer surface with a lint-free cloth and then the dye solution is spread evenly over the surface of the shape memory polymer with a brush, a paint roller or similar device at room temperature. Alternatively, in the dip coating method one side of the polymer may be dipped into a dye solution and then air dried. The polymer solution may also be applied to the substrate by spraying or spin coating.

It can be demonstrated on cross-sections of the treated surfaces that the depth of penetration of the dye is dependent on the swelling time, the adjusted dye concentration, and the polarity of the selected solvent among other factors. Typically, penetration depths of about 90 to 110 micrometers by the dye/dye mixture for poly(ester urethanes) as well as epoxy-based polymer samples for example, have been detected on microtome sections.

Surface-dyed and subsequently $CO_2$ laser-marked (engraved depth, corresponding to the penetration depth of the dye: 90 to 110 micrometers) poly(ester urethane) with shape-memory: After 164 h in a drying cabin at 60° C., no change is observed in the black or green coloured surface.

After weathering for 70 h including UVA irradiation with radiation strength of 38 W/m$^2$ (23° C., 50% humidity) the contrast in black poly(ester urethane) samples remains high, and adequate even after 164 h.

Surface-dyed and subsequently $CO_2$ laser-marked (engraved depth: 130 to 150 micrometers) epoxy-based shape memory polymer with a switching temperature of 62° C.: the epoxy-based shape memory polymer shows no signs of significant change in the blue or red coloured surface after 44 hours of immersion in deionised water (DI water) at 23° C. The engraving is still fully readable and the solvent has no staining, from which it may be inferred that no dye was washed out. After 44 h at 60° C. in a drying cabinet, the blue-coloured, epoxy-based polymer with shape memory looks almost unchanged. After 44 hours in a drying cabinet at 60° C., no is observed in the blue or red coloured surface observed. After 44 h UVA weathering (irradiance of 38 W/m$^2$, 23° C., humidity: 50%) the contrast in the blue-coloured epoxy-based samples is very good. After 44 h UVA weathering (irradiance of 38 W/m$^2$, 60° C., humidity: 16%) the contrast in the originally blue-coloured epoxy-based samples is very good, but the colour has changed from blue to green.

Surface-dyed and subsequently $CO_2$ laser-marked epoxy-based shape memory polymer with a switching temperature of 105° C.: after 89 h immersion in deionised water at 23° C. no change in the blue or black colouring is observed. After 89 h at 60° C. in deionised water, a slight fading of the blue coloured samples is noticeable, causing insignificant deterioration in the contrast. After 89 h at 60° C. in the drying cabinet, no change is observed in the blue or red dyed surfaces. After 89 h UVA weathering (irradiance of 38 W/m$^2$, 23° C., humidity: 50%), the contrast in the blue-coloured epoxy-based samples is very good. After 89 h UVA weathering (irradiance of 38 W/m$^2$, 60° C., humidity: 16%) the contrast in the blue and black epoxy-based samples is good.

After dyeing the near-surface layers of SMP, laser engraving can create such a strong contrast between the engraved and non-engraved areas that it is possible to identify logos, characters, symbols and read out QR codes, data matrix codes or barcodes from the polymer surfaces both before the shape memory polymers are programmed and after shape recovery has been fully completed (i.e., after the shape memory transition has been initiated).

Results from associated research into the stability of the incorporated codes are described hereafter in figures. In FIG. 1A, the step of dyeing is represented schematically. FIG. 1B is a schematic representation of the step of engraving the dyed polymer surface. FIG. 2 shows, for exemplary purposes, labels of poly(ester urethane) with surfaces dyed blue on one side, which are then engraved with a QR(M) code ("smart labels"). QR codes can be read using a suitable reader. A smart phone was used as a reader here for exemplary purposes. To read the QR code, a "smartphone" [Samsung Galaxy S 19000 with Android™ operating system version 2.3.3 equipped with a 1.4 GHz processor and 5.0 megapixel camera (2560×1920 pixels)] with autofocus function was used. The software used was the barcode scanner (version 3.6) of the ZXing "zebra crossing" team. This was downloaded as a free software application ("app") downloaded from Android Market™ (open source).

Similarly, other combinations of a suitable camera or scanner with adapted control or image recognition software can be used for machine-reading the representation.

The tests of readability of the generated QR code described here were carried out in daylight. The distance between the QR code and the camera lens was approximately 10 cm. Other suitable devices from different manufacturers can also be used for reading.

The engraving was carried out with a $CO_2$ laser after the polymer surface had been dyed. The QR Code contains the information "BAM QRM-Label". The first row of images in FIG. 2 shows the initial state A0. The first picture in the first row shows typical dimensions, selected for characterization purposes, of the labels used as test specimens. The undeformed label (A0) has dimensions $a_0=50$ mm, $c_0=25.3$ mm, $d_0=25.3$ mm, thickness=2.1 mm). The samples were deformed under defined conditions using a tensile testing machine: After clamping in the jaws of the tensile testing machine (clamping distance $b_0=30$ mm), the label was heated to 60° C. and deformed at a stretching rate of 30 mm/min to the maximum degree of deformation $\Delta b/b_0$, 50% (B), 100% (C), 150% (D) and 200% (E). The state imposed on the sample in this way was stabilised by cooling to the shape fixing temperature ($T_{fix}$) of −15° C.

Details about the deformation forces applied and the deformation achieved in each case are summarised in the following table.

Starting from the second image from the top, the left series of images in FIG. 2 shows the temporary, non-readable form of the four (functionalised) labels (B1, C1, D1, E1) which have undergone various degrees of distortion, after heating to 23° C. The original shape was largely recovered only when the labels were re-heated to 60° C., and thus to a temperature above the material-specific switching temperature.

This is demonstrated by the series of images on the right (B2, C2, D2 and E2). The QR codes of the labels are again legible with a smartphone after shape recovery. Thus, information that was originally engraved (readable by electronic means) can be rendered indecipherable using the described thermomechanical treatment process without destroying the information stored in the polymer itself. The readability of the label can be restored by heating to actively trigger the shape memory effect.

FIG. 3 includes a series of corresponding images relating to the stretching of labels made from epoxy-based, tempered SMPs. The material used, Veriflex E2, is manufactured by CRG Industries (Dayton, Ohio, USA). Its switching temperature is 62° C.

One side of the epoxy-based SMP was dyed blue and marked with a QR code that was engraved with a $CO_2$ laser after colouring. Similarly to the results in FIG. 2, the initial state was referred to as A0 in this case also. Again, the QR code contains the information "BAM QRM-Label". The undeformed label (A0) has dimensions $a_0=50$ mm, $c_0=25.3$ mm, $d_0=25.3$ mm, thickness=3.5 mm. After clamping in the jaws of the tensile testing machine (clamping distance $b_0=30$ mm), the label was heated to 80° C. and deformed at a stretching rate of 30 mm/min to the maximum degree of deformation $\Delta b/b_0$, 50% (B), 100% (C), 150% (D) and 200% (E). The state imposed in this way was stabilised by cooling to the shape fixing temperature of 23° C. Starting from the second image from the top, the left series of images

| Deformation parameters for labels with dimensions $a_0 = 50$ mm, $c_0 = 25.3$ mm $d_0 = 25.3$ mm, thickness = 2.1 mm | | | Label in temporarily fixed state (1): QR code distorted QR code distortion | | | Label after triggering of the shape memory effect (2) QR code distortion | | |
|---|---|---|---|---|---|---|---|---|
| | Max. force [N] | Stretching $\Delta b/b_0$ [%] | $\Delta c/c_0$ [%] | $\Delta d/d_0$ [%] | QR code readable? | $\Delta c/c_0$ [%] | $\Delta d/d_0$ [%] | QR code readable? |
| B | 48.3 | 50.0 | 54.2 | −11.5 | NO | 6.0 | −2.8 | YES |
| C | 59.1 | 100.0 | 99.1 | −14.3 | NO | 13.0 | −5.9 | YES |
| D | 64.8 | 150.0 | 143.3 | −17.5 | NO | 20.8 | −6.8 | YES |
| E | 70.7 | 200.0 | 182.3 | −20.6 | NO | 27.2 | −7.1 | YES |

The table shows the deformation parameters resulting from the stretching of poly(ester urethane) labels on which the surface has been dyed and a QR code has been applied, the deliberate distortion thereof for the temporarily fixed state 1, i.e. the code rendered illegible, state 2 after the switching of the polymer or after triggering of the shape memory effect, and the respective readability by automated means, which was determined here by means of a standard commercial smartphone. The information contained in the standard engraved QR Code "BAM QRM-label" was generally readable with a smartphone before deformation was carried out by the application of a tensile force. The listed parameters b, c and d are marked graphically in image "A0" in FIG. 2. The thickness cited refers to the unengraved material.

shows the temporary form of the four labels B1, C1, D1, E1, which have undergone various degrees of functionalisation, wherein the QR codes of labels C1, D1 and E1 were no longer readable with a smartphone. The original shape was largely recovered only when the labels were re-heated to 80° C., and thus to a temperature above the material-specific switching temperature, as is shown in the image series on the right in images B2, C2, D2 and E2. After the shape recovery, the QR code could be read by electronic means again. This was confirmed for example using a smartphone.

Details about the deformation forces applied and the deformation achieved in each case are summarised in the following table.

| Deformation parameters for labels with dimensions $a_0 = 50$ mm, $c_0 = 25.3$ mm | | Label in temporarily fixed state (1): QR code distorted | | | Label after triggering of the shape memory effect (2) | | |
|---|---|---|---|---|---|---|---|
| $d_0 = 25.3$ mm, thickness = 3.5 mm | | QR code distortion | | | QR code distortion | | |
| Max. force [N] | Stretching $\Delta b/b_0$ [%] | $\Delta c/c_0$ [%] | $\Delta d/d_0$ [%] | QR code readable? | $\Delta c/c_0$ [%] | $\Delta d/d_0$ [%] | QR code readable? |
| B  18.9 | 50.0 | 46.0 | −10.4 | YES | 1.3 | −3.1 | YES |
| C  21.9 | 100.0 | 93.5 | −19.5 | NO | 2.8 | −4.0 | YES |
| D  24.3 | 150.0 | 140.8 | −25.9 | NO | 4.7 | −4.2 | YES |
| E  32.8 | 200.0 | 182.2 | −31.4 | NO | 6.8 | −5.5 | YES |

The table above shows the deformation parameters resulting from the stretching of labels made from epoxy-based, tempered SMP on which the surface has been dyed and to which a QR code has been applied, the distortion of the QR code achieved for the temporarily fixed state (1), and state (2) after switching of the polymer, that is to say after the shape memory effect is triggered, and the recovery achieved thereby. Besides testing readability by automated means, which was determined here too with a standard commercial smartphone for exemplary purposes, the residual distortion is indicated separately in terms of typical dimensions. The QR code information "BAM QRM-label" engraved in the labels was generally readable by electronic means (smartphone) before deformation was carried out by the application of a tensile force. The parameters b, c and d taken from the QR code are defined in image "A0" in FIG. 3.

FIG. 4 shows the combination of dyeing process, QR code marking, programming and automated reading of the QR code using the example of poly(ester urethane) labels. Thermomechanical programming was carried out here by compression of the engraved code.

A surface of a poly(ester urethane) material sample intended to serve as a smart label was dyed blue and marked with a QR(M) code on one side, which was applied by engraving with a $CO_2$ laser after dyeing. The QR Code contains the information "BAM QRM-Label". The undeformed label on the left in the FIG. 0 with dimensions $25 \times 25 \times 2$ mm$^3$ was heated to 60° C. and compressed with a load of 3800 N. The state that as was imposed in this way was stabilised by cooling to the form fixing temperature of −15° C. After heating to 23° C., the temporary shape (1) shown in the centre was obtained. In this state, the QR code cannot be read with a smartphone. The shape was only largely recovered upon re-heating to 60° C. and thus to a temperature above the material-specific switching temperature, as shown in the image on the right (2), which in turn resulted in the restoration of readability.

FIG. 5 shows a further embodiment of a smart label, with shape memory. The described combination of dyeing, QR code marking, thermomechanical programming and machine reading the QR code using a suitable reader (smartphone) were here labels epoxy-based, tempered shape memory polymer of the type E2 Veriflex CRG Industries Ohio, USA prepared and tested. The thermo-mechanical programming was done here by means of compression of the engraved code. The switching temperature of this polymer is 62° C.

Again, the side surface of the blue-coloured material having a QR (M) code is provided by a CO2 laser engraving was conducted. The QR Code contains information "BAM QRM-label". The undeformed label left in FIG. 5, FIG. 0 with the dimensions $25 \times 25 \times 3.5$ mm$^3$ was heated to 80° C. and compressed with a load of 1000 N. In this way, the forced state was stabilized by cooling to form the fixing temperature of 23° C., in the temporary shape. This condition (1) is shown in the center. The QR code of the deformed label cannot be read by a smartphone. Only the re-heating to 80° C. and thus heated to a temperature above the material-specific switching temperature led largely to the shape recovery (2) and to restore the readability.

FIG. 6 shows various material samples after colouring a surface. FIG. 6A shows samples of the epoxy-based SMP Veriflex E2 manufactured by CRG Industries (Ohio, USA). The material has a transition temperature $T_{trans}$ of 105° C. At the top of the image is a red-coloured sample, below it is a sample coloured blue with a dye solution.

FIG. 6B shows surface-coloured epoxy-based polymer of the brand Veriflex E2, tempered, $T_{trans}$=62° C. (manufacturer CRG Industries, OH, USA). In this case, two dye solutions were used, one black (on the right) and one blue (on the left).

FIG. 7 shows a comparative overview of the results for the resistance of the surface stained with shape memory polymers for their ability to assume the original initial shape after deformation of the QR coding supporting sample area again. It is clearly visible that the samples to return to their original shape.

To test the stability of the coloration of the polymers dyed as described above, control samples were exposed to weathering under various conditions with defined UVA radiation.

The pertinent results for surface-coloured and subsequently CO2-laser-marked poly(ester urethane) with shape memory are shown in FIG. 8. FIG. 8A shows a comparison of black (bottom) and green (top) coloured samples after storage for 164 hours in an oven at 60° C. There is no observable change in the black or green coloured surface of the polymer.

FIG. 8B shows the contrast ratios of a poly (ester urethane) after the surface is dyed black and laser engraved and then weathered for 70 h under irradiance of 38 W/m$^2$ at a temperature of 23° C. and humidity of 50%. As can be seen, the contrast of the original black-coloured poly (ester urethane) sample is still good. FIG. 8C shows the same sample after continued weathering a total of 164 h. It can be seen that the contrast is still sufficient to allow good readability of the engraved structure.

FIG. 9 shows the results of examination of the resistance of dyed and laser engraved samples of epoxy-based shape memory polymer (switching temperature 105° C.) to deionised water (DI water). According to FIG. 9A, no changes can be seen in the blue (left) or red colour (right) after 44 h immersion in deionized water at 23° C. The engraving is still fully readable and the solvent has no staining by washed-out dye.

FIG. 9B shows a blue-coloured, engraved material sample of epoxy-based shape memory polymer after 44 h immersion in deionized water at 60° C. The sample has a strong contrast that remains virtually unchanged.

FIG. 10 shows a comparison of the results of resistance of surface dyed epoxy-based polymers with shape memory (switching temperature ~62° C. or 105° C.) to 44 hours of weathering. In each image, the untreated control samples appear at the bottom, the weathered samples are shown at the top. The weathering conditions were:
- FIG. 10A: blue coloured sample (switching temperature~105° C.) in an oven at 60° C.;
- FIG. 10B: red coloured sample (switching temperature~105° C.) in an oven at 60° C.;
- FIG. 10C: blue coloured sample (switching temperature~62° C.) UVA exposure with irradiance of 38 W/m$^2$, 23° C. and humidity of 50%;
- FIG. 10D: blue coloured sample (switching temperature~62° C.) UVA exposure with irradiance of 38 W/m$^2$, 60° C. and humidity of 16%.

As may be seen, the red and blue coloured samples were found to be stable after a heat treatment in a drying cabinet for 44 hours at 60° C. The blue coloured sample (FIG. 10C) weathered as described at 23° C. still retained very good contrast. Said contrast remained good even after weathering at 60° C. (FIG. 10D), though the colour changed from blue to green.

Further resistance tests were conducted on a tempered epoxy-based shape memory polymer having a lower switching temperature of ~62° C. The corresponding results are shown in FIG. 11. FIG. 11A shows blue (left) and black (right) dyed samples after 89 h immersion in deionized water at 23° C. It may be seen that there is no change in the blue or black colour. FIG. 11B shows a slight loss of colour in a blue coloured sample after 89 h storage in deionized water at 60° C.

FIG. 12 shows an overview of the results of weathering on tempered epoxy-based samples with switching temperature ~62° C. The dry heat treatment for 89 h at 60° C. in a drying cabinet causes no colour change, neither in the blue nor black material (see top row). After 89 hours of weathering with UVA exposure at an irradiance of 38 W/m2 at 23° C. and 50% humidity, the contrast of the blue and the black coloured samples is still very good (see middle row). At 89 hours of aging the sample at a temperature of 60° C. and humidity of 16% with UVA exposure at 38 W/m2 for both blue and black coloured samples the contrast obtained was still good contrast (see bottom row).

As can be seen with reference to the foregoing embodiments, the method described allows the very good contrast achieved after site-selective mechanical treatment and laser engraving to be retained even under extreme conditions. This improves the applicability of the method for protecting items treated correspondingly or equipped with correspondingly designed labels against forgery. These may in particular be smart labels with shape memory. It is considered particularly advantageous that undergoing the dyeing process does not result in any significant degradation of the shape memory functionality of the dyed polymers. It should be borne in mind that sufficient contrast cannot be created in the fully coloured SMP, and each polymer dye as well as any added filler material directly affects the functionality of the polymer.

If the coloured, i.e. chemically altered domains in the polymer network are relatively small, as is the case with the embodiments described here, the shape memory functionality, e.g., such parameters as switching temperature, are practically unaffected by the dyeing process or dye absorption.

Therefore, it is to be regarded as a particular advantage of the proposed method that even very substantial deformations of the polymers can be restored almost completely after a shape fixing step, wherein the dyed volumes return almost completely to their initial state.

The dyeing process can also be applied to other polymer applications. It is not always necessary to dye plastics completely.

Overall, a dyeing process for the surface of a polymer item is suggested, comprising the steps: —pretreating the surface, —staining with a dye solution containing an organic dye and an organic solvent, —cleaning the polymer surface, and —drying the dye solution, wherein only a near-surface layer of the polymer article is dyed. Advantageously, the dyeing process is suitable for colouring the surface of a shape memory polymer (SMP), wherein the information is engraved in a form of a code or other label on the coloured surface. The colouring causes an increased contrast and thus facilitates machine readability of marking and coding without affecting the other properties of the SMP.

According to one embodiment a method is provided for colouring a surface of a shape memory polymer (SMP), comprising: providing a polymer item comprising a shape memory polymer, applying a paste containing at least one pigment, for example in the form of pigment particles, or nanoparticles, to at least a portion of a surface of the shape memory polymer to form a colour layer on the shape memory polymer, and drying the colour layer.

Besides the at least one pigment, the paste may contain a solvent and a polymer dissolved in the solvent. For the preparation of the paste, the polymer may first be dissolved in the solvent to form a polymer solution and subsequently the at least one pigment is mixed with the polymer solution. The polymer may be a shape memory polymer, and in particular may consist of the same polymer as the shape memory polymer item. Two, three or more colour layers of the same or different pastes may be deposited sequentially, wherein the paste can contain the same or different pigments, and it being possible for a full or partial drying between the application of each individual colour layer. The pigment or pigments can be a thermochromic pigment or pigments and/or nanoparticles. The method may also include removing a portion of the colour layer or layers, in particular as far as the undyed surface of the shape memory polymer to form a graphic element on the upper surface of the polymer item.

Figure 13A:
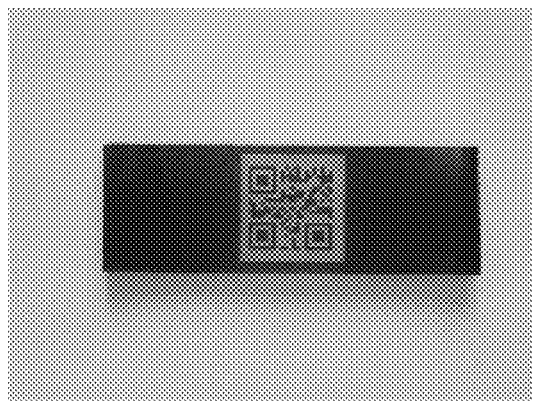
FIG. 13 a polymer item with surface dyed using colourant paste.
Figure 13B:

The method described above is based on the use of pastes, which contain at least one pigment, for example thermochromic pigments. As a specific embodiment, the method was applied to a solid polymer body of polyesterurethane (PEU). The method differs fundamentally from the previously described staining methods for soluble dyes. To load the surface of the polymer body with a thermochromic pigment (for example microcapsules particle size <10 μm, Sintal Chemie GmbH), first a "dye paste" is produced. For this, 5 g PEU is first fully dissolved in 15-20 ml N,N-dimethylformamide (DMF) before 1 g thermochromic pigment (20% by weight relative to the PEU) is added and the mixture is mixed to form a uniform paste. This paste is applied as a uniform, thin film to the surface of the solid polymer body of PEU, for example with a brush or paint roller. After the film has completely dried, the result is a homogeneous colouring of the PEU surface. The coating layer is firmly bonded to the surface. This was also checked after stretching of the polymer body. For this, the polymer body was loaded to several times 100% elongation or similar compressive load. Even after such exposure, the coated layer remained firmly attached to the polymer body. FIG. 13A shows a surface-coloured polymer product of PEU with a graphic element in the form of a QR code at 23° C. in the unstretched state, that is prior to thermomechanical treatment for "programming" the shape memory polymer. FIG. 13B shows the polymer product at a temperature of 23° C. in its temporary shape after previous stretching by 100% and the subsequent shape fixing. The QR code is no longer machine-readable, i.e., the distortion leads to a substantial change in the graphical element, such that the readability of the code is outside the permissible tolerance.

The thickness of the colour layer can be influenced by the amount of paste applied, or by repeated application of the paste. The intensity of the colour can be varied by the amount of pigment.

As an example, a black pigment is used, which turns colourless when heated above 43° C. This colour change may be seen as a further security feature, in addition to triggering the shape memory effect. When the pigment is cooled to below 43° C., the black coloration returns and the readability of the code is restored, as shown for example in FIG. 14B. FIG. 14A shows the situation after initiation and the shape memory effect at a temperature above the colour change temperature of 43° C. Here, the graphical element, in this case a QR code formed in the polymer item (label) is indeed restored, but it cannot be read by machine, due to the colour change (black→colourless). The situation is different if, as shown in FIG. 14B, the polymer item is cooled to below the colour change temperature. Then, the colour is visible again and the graphic element has a sufficiently high contrast to enable it to be read by a machine. This dyeing may also be used with other pigment and particle types provided they are unaffected by the solvent, e.g. DMF.

FIG. 15 shows polymer products made from PEU in their permanent shape at different temperatures. On the left is the state below the colour change temperature, here shown to be 43° C. and above the colour change temperature appears on the right. The QR code on the left polymer article is readable, the one on the right is not.

According to one embodiment, the process of preparing a solution of shape-memory polymers and dyes and/or pigments and/or nanoparticles lends itself well to preparing pastes. Such pastes can then be applied to the respective polymer surface to form a colour layer, so that after engraving, for example using a laser, sufficiently high contrast with the basic colour of the polymer can be produced. In one embodiment the shape memory polymer that is dissolved in the solution is the same as the shape memory polymer used for polymer body or polymer item. The shape memory polymers can differ in molecular size, with otherwise the same chemical composition. The surface of and SMP, for example, a poly(ester urethane) (PEU) can be equipped with a thermochromic pigment and e.g. a QR code can be engraved in the surface so that a sufficient colour contrast is created with the underlying SMP layer. This contrast remains in principle until the SMP is warmed above 43° C. (transition temperature of the thermochromic pigment). The SMP and thus the QR code can be stabilised in a temporary form by thermo-mechanical functionalisation, which represents a sufficiently high contrast in the condition at 23° C., but due to the distortion introduced does not render the QR code readable. Heating the SMPs above the switching temperature thereof, which in this case is close to the transition temperature of the pigment, leads to shape recovery, the QR code becomes readable again as soon as the system cools to below the transition temperature of the thermochromic pigment, since then the unlasered domains turn black again. The described conditions of such a system based on PEU are shown in FIGS. 13 and 14.

In one embodiment, a method of colouring a surface of a polymer article is provided, comprising: providing a polymer item comprising a shape memory polymer, and colouring at least a portion of a surface of the shape memory polymer with a dye solution containing an organic dye and an organic solvent and/or by introducing nanoparticles by diffusion to form a coloured layer on the surface of the shape memory polymer.

In addition to dyes and nanoparticles, such as gold and/or silver nanoparticles, etc. can be introduced by diffusion into host shape memory polymers, which can be done in accordance with the dyeing process described above. In this way, the coloured surface layers have a high contrast to the layers underneath. Thus, here is the requirement for the use for high-contrast imaging, for example, machine-readable code in met shape memory polymer surfaces. Pastes with less than 20 wt % nanoparticles can also be prepared as described above, and are then coated on the polymer surface before the desired information by a laser, or possibly a machine-readable code is engraved into the polymer surface.

Further, the method may include: removing a portion of the colour layer, in particular to the undyed surface of the shape memory polymer to form a graphic element on the upper surface of the polymer item. Furthermore, the method may include performing, for example, a thermo-mechanical treatment of the polymer article for the deformation of the graphical element.

In one embodiment, a method for producing a graphical element on a surface of a polymer article, which is a shape memory polymer, comprising: providing the polymer article with one or more coloured layers on or in at least a portion of a surface of the shape memory polymer; undyed removing part of the coloured layer or the coloured layer, especially to the surface of
The shape memory polymer to form a graphic element on top of the polymer article.

The coloured layer or the coloured layers can be formed by the methods described above or by other methods.

In one embodiment, a method for the transmission of information, comprising: providing a polymer item which is a shape memory polymer, in which a graphic element is incorporated which represents a code according to a predetermined code system, performing, for example, thermo-mechanical treatment of the polymer article, so that the graphical element is modified to the extent that the readability of the code outside the permissible error tolerance of the code system is, and submitting the polymer article to a receiver.

The method may further include: triggering the shape memory effect for the restoration of the graphical element, and reading out the data stored in the graphic element codes and comparing the represented by the code information to a data source, wherein the information so obtained can be used to enable access to an access-controlled area, where it the access-controlled area may be a physical area, such as a building, or a data area. The method may further comprise:

Attaching the article to a polymer items to be shipped or to a package, the code represents information regarding the item or the package, the shape memory effect by triggering the readability of the code is restored and the restored readability as a measure of the proof of the authenticity of the sent item or the package can be used. The method may further comprise: generating a data information representing the modified graphical element, transmitting the data information to the Receiver so that the receiver can compare the modified graphical element having information of the data transmitted.

In one embodiment, a method for detecting the authenticity of an article is provided comprising: attaching a polymer article having a shape memory polymer to a product to be sent or to a package, wherein the polymer article serves to document the authenticity of the item or package, and the polymer product includes a graphic element that was changed by thermo-mechanical processing for example to the extent that the readability of a code of the predetermined coding system represented by the graphic element is outside the permitted error tolerance of the coding system; creating a data element representing the altered graphic element; transmitting the data information to a receiver, transmitting the item and/or the package together with the attached polymer products to the receiver so that the modified graphical element can be compared with the data transmitted information by the receiver.

The data information can be sent via a different route than the product or the packaging to the receiver.

The polymer product according to one of the previously described embodiments may be utilised as a label. This can be by means of a connecting element attached to a commodity such as an article or directly on a package. The label can be directly part of a packaging.

Such labels can be used to prove the authenticity of the goods, the item or the packaging. For this purpose a label with that has been programmed, i.e. modified to such an extent that it is no longer readable with a label reader, which has a distorted QR code, for example, can be photographed or otherwise digitised to generate a data element representing the distorted QR code. This data element, can be included with/attached to the goods/products/package for identification purposes or sent separately to the recipient. When the goods/products/package reach the receiver, the data element such as the photo, can be compared with the label. The consistency of image/data information with the distorted or altered original label serves as an authenticity feature. Then, the receiver tries to read the code with a reading device (such as a smartphone). If this is not possible, this may be considered a further authentication feature. Then, the receiver or a third person may activate the shape memory effect. The label is restored almost entirely to its original shape. In this respect too, information can be generated in advance, for example, about the quantity of the reversal, which can then be made available to the receiver. Now, the QR code can be read properly with a reader—which may be considered a further security criterion.

Possible applications include, among others, the identification of watches, especially watches, food, toys, clothing, especially designer clothes and branded goods, electronic and/or technical products, instruments, museum pieces, pharmaceutical products, chemical products and production parts in mechanical engineering, automotive and aviation and space technology.

Another application is the encryption of passwords and/or confidential information that is sent by post. There as well, the shape memory effect is triggered only by the recipient and thus the information stored in the label (polymer article) in the form of a code or otherwise is rendered readable and usable. The receiver recognizes immediately when the shape memory effect has been triggered before. Again, before a data information such as a picture can be generated, which represents the modified, i.e. programmed label or polymer body. This data information is then sent to the receiver, for example, by other means. The receiver can then compare the data information with the changed label, where the shape memory effect was not triggered yet. If the shape memory effect was triggered by an unauthorized third party, and the label was then reprogrammed, the receiver will detect this directly by comparing the data since a new programming, for example a thermo-mechanical treatment, results in a different distortion.

Another field of application is in the areas of tickets/passes that ensure unique access to a controlled access area, such as a field or a company event. In some cases it may also be tickets for concerts, cabaret, musicals, shows, including TV shows, cinema, festivals of all kinds, sporting events, fairs, exhibitions and visits to the zoo. In addition, labels may provide access to VIP areas and/or areas backstage. In general, event- and/or personal data can be encrypted in the polymer surface as a result of programming. If one triggers the shape memory effect, the data/information is rendered readable, for example, machine readable.

The access-controlled area may also be public local or long-distance travel networks, in which case the label or the polymer product can be a ticket for bus and/or train, but also flight tickets and parking tickets.

As another field of application lottery tickets can be regarded. These come in a non-machine readable (programmed) state; the triggering of the shape memory effect restores for example the (machine) readability of QR codes and informs the buyer, whether and if so how much he won. After one single use, the labels can be re-programmed or, alternatively be disposed of.

The access-controlled area may also relate to access to computer systems and/or databases and/or individual computers and/or networks and/or user account (user access).

Further, machine-readable 2D codes to be considered here for use of the described labeling technology include: Data-Matrix, Cool-Data-Matrix, Aztec, MaxiCodes, Upcode, Trillcode, Quickmark, Shotcode, mCode and Dotcodes (point codes) as Dotcode A, Snowflake code and/or BeeTagg and two-dimensional bar codes such Codablock A Codablock F, Codablock 256, Code 49 and PDF417.

In addition, multiple symbols of the same type can be arranged side by side in labels, or alternatively, different codes may be combined. These can be stabilised temporarily in a machine-unreadable form (programming) before the individual codes are rendered readable by activating the shape memory effect.

According to another embodiment, a method for producing a layer of shape memory polymer is provided with a surface profile, comprising: providing a solution containing at least one solvent, dissolved in the solvent, the shape memory polymer and a dye and/or pigment and/or contains nanoparticles, filling a mould with the solution, evaporation of the solvent, so that a solid polymer article emerges, and forming a surface profile on at least one side of the polymer product by partially removing a portion of the material of the polymer article.

Accordingly, a polymer product of continuously coloured shape memory polymer is provided. For this purpose, a shape memory polymer is dissolved in a solvent and a dye is added. The organic dyes above, any pigments or nanoparticles can be used. After evaporation of the solvent and curing the now coloured shape memory polymer in one side of the polymer article then a surface profile can be provided, for example a company logo, information, or the like by removing a portion of the polymer item. In the case of thermochromic particles and dyes, the surface profile or surface relief can be made visible by triggering of the colour change.

According to another embodiment, a method for producing a layer of shape memory polymer with a surface profile is provided, comprising: providing a solution containing at least one solvent, a shape memory polymer and a dye and/or pigment and/or nanoparticles dissolved in the solvent; filling a mould with the solution, wherein the mould has a negative surface relief profile of a desired surface; evaporating the solvent, so that a solid polymer article with the surface profile emerges.

The surface profile is not obtained here by removal but by casting a relief in the mould. The relief may also be generated by a stamp which is part of the mould.

While the previously described functionalization or programming comprises a large deformation of the entire surface of a smart label, comprising the shape memory polymer, for example, by compressing, stretching, twisting, and the like, according to other embodiments the encoded information can be made unrecognizable by a local thermomechanical programming or partial functionalization.

Thus, it is proposed to treat with a specially designed stamp tool labels comprising a shape memory polymer by a partial functionalization. With the tool can be made unreadable by a scanning and/or reading device, for example, machine readable 2D codes, which are adapted for the technology of intelligent labels for use as a label (smart label, smart label), temporarily.

In particular, to the codes belong DataMatrix (at least version 1-12), quick response (QR, at least version 1-7), Cool-Data-Matrix, Aztec, Maxi codes, Upcode, Trillcode, QuickMark, Shotcode, mCode, and Dotcodes (code point) like Dotcode A, Snowflake code and/or BeeTagg and the two-dimensional bar codes such as Codablock A Codablock F, Codablock 256, Code 49 and PDF417.

A QR code of version 1 can be up to 34 numeric, 20 alphanumeric (including the Latin letters A to Z and the Arabic numerals 0 to 9 or 14 (8-bit) characters (alphanumeric and additional letters, where each letter as 8-bit byte is encoded), while a QR code version 7 up to 293 numeric, 178 comprising alphanumeric or 122 (8-bit) characters. In comparison, a data matrix code of version 5 comprises up to 36 numeric, 25 alphanumeric or 16 (8-bit) characters, while a Data Matrix code of version 12 comprises up to 228 numeric, 169 alphanumeric or 112 (8-bit) characters.

According to particular embodiments a used SMP is a poly (ester urethane), which surface can be easily coloured, provided for example by engraving with a corresponding code and then thermo-mechanically be programmed or functionalized. The resulting and at room temperature (23° C.) stable temporary shape of the so produced label can not be read with a scan- and reader device and thus can be used to temporarily hide or make unreadable information derivable from the code or carried by the label.

According to a typical embodiment, a method of thermo-mechanical treatment of a polymer article is proposed, wherein the treatment renders unreadable a visually and/or machine-readable information stored on the polymer article. The proposed method comprises:

Providing a polymer item comprising an at least partially painted surface of a shape memory polymer, which has a graphic element that is visually and/or machine readable, or represents a code according to a predetermined code system;

Providing a die stamp;

Producing a mechanical contact of the die stamp and the surface of polymer article, so that the surface of the polymer article is at least partially deformed;

Raising the temperature of the polymer item to a temperature which is above a transition temperature ($T_{trans}$) of the shape memory polymer;

Applying a stress to the polymer product through the die stamp above the transition temperature ($T_{trans}$) of the shape memory polymer;

Lowering the temperature of the polymer item to a temperature below a shape fixing temperature ($T_{fix}$) of the polymer article by maintaining contact;

Separation of die and polymer products.

The proposed method of using shape memory polymers as smart labels with switchable readability thus includes providing an optionally dyed surface for the purpose of improved contrast, preferably engraved, etched or moulded sheet-like structure comprising a shape memory polymer. Starting from a permanent state produced by removing material or moulding wherein a surface structure on at least one side of the sheet-like structure can be mechanically recorded and read out with a suitable reading device the shape memory polymer is made temporarily unreadable by the combination of the procedural steps.

For this purpose, the proposed method includes providing an adapted stamping tool, preferably in the form of a variable embossing stamp. Advantages arise for a facilitated and error-free configuring or reconfiguring of the stamp.

During functionalization, also referred to herein as programming, the shape memory polymer is transferred from its natural state in a permanent or temporary state. Both conditions are based on the spatial molecular configuration of the shape memory polymer, for example a block copolymer with shape memory properties, such as polyester urethane (PEU). A deformation of the surface of the polymer article synchronously with heating of the shape memory polymer above its transition temperature $T_{trans}$ in contact with the stamp and a subsequent thereto cooling to a temperature below the shape fixing temperature $T_{fix}$ while maintaining the deforming force applied, and thus maintaining the contact of stamp and surface of the polymer article results in a new form the surface of the SMP. The new form is due to a change in molecular configuration of the shape memory polymer that is fixed during the lowering of the temperature described. The surface of the functionalized polymer product retains its new configuration even if the described mechanical contact after lowering the temperature to below the value $T_{fix}$ when removing the stamp from the surface is interrupted. This condition continues until the SMP is reheated above its transition temperature $T_{trans}$. If an item comprising a SMP or the label, for example, carry a machine-readable information, this information can be rendered illegible in the way of the described thermo-mechanical treatment. The information stored on a label comprising a SMP can be rendered illegible even when the label during the thermo-mechanical treatment is only partially treated or is only partially deformed. Using the die stamp described, a label comprising a SMP may be deformed precisely in such surface sections, which are important for the readability of the available information. For this purpose the configuration of a stamp can be adapted to the present digital code, for instance to the nature and/or the version of the digital code.

In this manner, the force required for making unreadable a label with a stored digital information can be dimensioned much smaller than for example, for deforming the entire label. Similarly, merely a local heating of the shape memory polymer is required advantageously. This reduces the expenditure for making the information unreadable considerably and makes programming the label, hence the smart label as such less expensive. Overall, the described partial functionalization offers the advantage of completely eliminating with less effort, the readability of a machine-readable digital information, thus encrypting the information temporarily, without limiting the accessibility of this information.

Thus, according to preferred embodiments of the proposed method a partial functionalization of the label is proposed. The term partial functionalization includes a local thermo-mechanical programming, and typically refers to the surface of the smart label. As a synonym for the term local in this regard the term locally spatially selective is used as well. The term temporary refers to the period between thermo-mechanical programming (functionalization) and triggering the shape memory effect for resetting to the original, permanent shape of the shape memory polymer.

Thus, a partial functionalization of the code bearing surface (code area) can be used to prevent the readability of the code. The readability of the code can be restored at a desired time through triggering the shape memory effect in the shape memory polymer that bears the code. The presence of a shape of the SMP or the label to be obtained by thermo-mechanical treatment, can thus be limited in time and can be reset or switched to the original form on call.

Optionally, a stamp can be adapted so that the label in the functionalized or partially functionalized state comprises another (second) readable information than a first information which is accessible only after the initiation of the shape memory effect causing encryption of the second information. This offers particular advantages for the brand and product protection, and for all fields which use coded and machine-readable information that shall be concealed for protection against unauthorized imitation.

Immediate benefits of a local or site-selective deformation, for example, consist of easier control of the distortion of individual regions of different codes. Furthermore, the extent of targeted, "selective" deformations can easily be controlled via the force exerted during deformation. In addition to a distortion, a piercing of a sheet-like structure serving as a label can be carried out, wherein the modified and now also provided with openings shape of the label is the temporarily unreadable form. The indentations and optionally also the holes, which number depends on the kind of the used stamp are largely restored by triggering the shape memory effect. A reset of the polymer contrary to a direction of the deformation can thus be reached in the case of hole formations, so that the holes are almost completely closed. Thus, the readability of the code functionalized by introducing breakthroughs or holes is restored when initiating the shape memory effect.

According to another embodiment of the method the surface of the polymer item comprises a surface or surface portions coloured by applying a dye solution or pigment paste. Here, the surface or the relevant surface portion may be pre-treated prior to application of the dye solution or pigment paste with an organic solvent, so that the diffusion of a dye or a dye mixture of the dye solution or the dye paste is facilitated in a superficial layer of the polymer article. After complete evaporation of one or more organic solvent from the dye solution or the dye paste sections of the coloured surface can be removed mechanically, chemically or by means of laser at least partially, so that a sufficiently good colour contrast between dyed, non-ablated regions of the surface to coloured and ablated regions of the surface or unstained, non-ablated adjacent surface areas is guaranteed. The adjacent stained and unstained surface areas represent together a machine readable information, preferably a digital information or a digitally recordable or machine readable and electronically processable information.

In another embodiment, the proposed method of making temporarily illegible a machine-readable information by thermo-mechanical partial functionalization of a polymer article comprising a shape memory polymer further comprises the simultaneous defacing or concealing of a partially functionalized engraving or structure arranged at a rear surface.

Special advantages are that impressions embossing or engraving on the back of SMP having a code are hidden with the site-selective deformation of the front. Therefore, from the smart tag can not be seen, whether the label transmits information also on a rear side. This increases the security against forgery of equipped polymer items or of corresponding goods or products labeled with the corresponding polymer items.

In another typical embodiment there is provided a reconfigurable stamp, comprising:
  a substantially planar base plate which on one side has at least one receptacle for a formed body, and
  at least one formed body adapted to the size and to the shape of the receptacle at least partially so that the formed body accommodated in the receptacle is in a substantially precisely fitting contact with the receiving part and projects beyond the base plate. Advantages of this embodiment, in addition to the robustness of the stamp for location-selective programming of shape-memory polymers, is its easy reconfigurability. This results in the ability to use one and the same stamp with differently arranged formed bodies for the adapted partial functionalization of different codes in SMP labels. In particular the stamp serves for spatially selective compression and deformation of codes which are engraved on a shape memory polymer, or are moulded with a shape memory polymer.

Such codes are typically quick response codes (QR) or data matrix codes. However, other codes of the above-described formats can be selectively deformed temporarily as well, wherein the codes exist in the form of engravings or impressions which are typically introduced into a superficial dyed shape memory polymer (SMP). Mouldings may typically be carried out by adding a solution of a shape memory polymer which is introduced into a casting mould and then the solvent is driven off or evaporated.

The reconfigurability of the stamp comprises its adding or removing of elevations or adding or removing pits in a substantially flat base plate of the stamp. Both the elevations and depressions of the base typically have a substantially conical shape, so that the stamp always easily detaches from the embossed material, can be taken away, or be removed from the embossed material, because the surface of the stamp essentially has no undercuts. In this example, the adding may be an applying, an inlaying, an inserting, a locking or anchoring of formed bodies in a receptacle which is adapted to the form or shape, the material composition or the electrical or magnetic properties of the formed body, wherein the receptacle of the base plate is an integral part of the stamp. Advantages arise for a facilitated and error-free configuring or reconfiguring of the stamp.

Typically, a polyhedron, such as e.g. an Archimedean solid, a pseudo-rhombicuboctahedron, a Platonic solid, a sphere, an ellipsoid, or a torus, or a body comprising a central axis of symmetry such as a solid of revolution are considered as the formed body. Any or all faces of the polyhedra, or sections of the surface of the formed body can carry a pattern, an engraving, a character, a number, a symbol or a character. Resulting advantages are an increased variety of information embossed with a single imprint step opposite towards the information that can be impressed with a differently configured stamp or information which can be impressed with a formed body without surface texture.

In typical embodiments the proposed re-configurable stamp thus comprises at least a formed body whose surface at least partially comprises a fine structure so that at least some mutually adjacent structural elements of this formed body comprise a roughness depth or height, which differ by 0.1 µm, preferably by 0.5 µm, in particular at least by 1 µm.

A special material characteristic of the receptacle for a sample body or of a sample body of the preferred stamp can consist in that, for example, a formed body is ferromagnetic. Where such a formed body is placed in sufficient proximity to a particular receptacle for him, he can independently engage a desired position on the base plate of the stamp. An advantage is that the formed body retains this position at a correspondingly adapted magnetization and shape also during the later demoulding. Another feature may consist in that a formed body, for example, snaps into place by a suitable fitting to a base of the receptacle. A stamp with such modified receptacles can for example be lowered on a label arranged under the stamp. This enables a simplified serial functionalizing a plurality of labels.

According to other embodiments, the reconfigurable stamp comprises a base with various receptacles for various formed bodies as well as various formed bodies, which are adapted to a receptacle at least partially. For example, if balls are to be used as shaped bodies and hemispherical indentations are to be obtained in order to facilitate mould removal, the receptacles may be present in the form of semi-spherical recesses, into which optionally matching balls of approximately equal diameter are inserted up to a depth of the respective radius of the sphere, or can be inserted. The balls can be moved or removed easily, for example, manually or under automatic control using an appropriately adapted device.

For example, a square steel plate to be 25 mm of the edge length of the die as described, the surface of which nine arrayed hemispherical recesses identical diameter (5 mm) and comprises an identical depth (2.5 mm). The closest distance between the maxima of adjacent low Recesses may for example be 5.5 mm.

According to the total available positions, a total of $$\binom{n}{k} = \frac{n!}{k!(n-k)!}$$

distinct patterns are created for a number of k spheres in n positions.

Accordingly result for k=4 and k=5 up to 126 different configurations when n=9 if label and embossing stamp are always oriented the same way to each other, for example when during embossing the upper left corner of the label, when looking at the side which comes into contact with the stamp, always touches the upper right corner of the stamp, when looking at the formed body.

According to another embodiment a reconfigurable stamp is provided, wherein a superficially introduced fine structure is selected from: moulded or etched, engraved or otherwise incorporated by removal of material letters, numbers, signs or symbols; adjacent sections with different roughness in the sub-µm or µm range; adjacent sections with different grain sizes, dotting, striping, dashes, harness, hatching pattern or sculpturing in the µm or in the mm range. Advantageously, the fine structuring introduced into a formed body may be adapted to the dimension of the shaped body.

In further embodiments, there is provided a reconfigurable stamp, which fine structure is provided by one or more continuous bore holes of same or different diameter. This form of fine structuring offers the particular advantage of great variability and good distinguishability.

According to further embodiments, there is provided a reconfigurable stamp, wherein n receptacles are preferably arranged in a grid on the base plate and the n receptacles are occupied by a k number of formed bodies, wherein $1 \le k \le n$, preferably $1 \le k \le n/2$. This results in the advantage of the greatest possible deformation, achieved through impressions.

Typically a QR code leads an interested party to a particular site if the code in question is detected or scanned with an adapted network-enabled reader such as a mobile phone programmed via so-called application software ("app"). The information carried by the code, here the direct link to the relevant Internet address, typically cannot be changed. Other possible variables to modify the respective steps, triggered in response to the call with a corresponding terminal may affect other parameters, for example, the data which are stored about each terminal in a database.

A further possible modification consists in transferring different data formats, such as text, image, audio, video, multimedia and other to the query-starting terminal.

However, by a suitable programming of the end server (host) providing the site in question the direct link with just this one Internet address (website) can be changed or the type of digital information transmitted in response to a query may be modified.

For example, accessibility, and thus the provided on request information may be modified with respect to the time of the call setup to the terminal device, in terms of local (territorial) position (such as the radio cell) of the request initiating terminal or in respect to the compound to the terminal realizable system operator (provider).

Advantages of these encodings, referred to as dynamic codes, consist, for example, in that the number of visits and the number of successful code acquisitions are accessible to analysis by suitably programmed terminal equipment. Thus dynamic codes represent an even higher safety standard over non-dynamic codes. A smart label which is totally or partially deformed in his code area could be possibly rectified with appropriate computer software.

As a result, the hidden information in it could be made visible. To make sure now that no attempt was made to read such graphically processed codes, the receiver can easily find out by looking at the code in the linked site to see if there has already been an attempt to read the information contained in the code in front of him. Another point is that information stored on the Internet allows reading at a later, together with the input at the receiver of the smart label. The information is quasi unlocked at an intended date.

Thus, for the recipient there is a total of following safety standards: 1 The label is in a deformed state (which can be checked by the recipient, for example by an image matching with the visual material provided by the sender); 2 the code of the label has a partial deformation or deformation, which leads to that it can not be read with a corresponding scanning and/or reading device; 3 the triggering of the shape memory effect results in that the information is readable; and 4 linking to a website on the Internet or database divulges the information whether an attempt to read has taken place before. In summary it can be said that such smart labels thus represent a very high safety standard and a reliable bridge between the physical and the virtual world.

In the case of the thermo-mechanical treatment of polymer products which are provided with codes described here, the use of dynamic codes allows to register the triggering of the shape memory effect and the deliberate resetting a hidden security feature and to backtrack if necessary. Advantages consist in the acquisition of a decoding of a label done.

The function of the QR code can be modified whenever wanted by controlling the server. This modification can be made, for example, via an appropriately programmed web site via input form by Internet browser. Benefits of linking these embodiments attributable to the field of software and communications technology with the above-described smart labels based on shape memory polymers are obvious: Further security-providing levels become available, the counterfeit security and thus the product and product-protection of items equipped with smart labels according to the described embodiments increase.

The mentioned embodiments can freely or partially be combined with each other. This increases the flexibility of the accessible partial programming and the variety of the information temporarily stored using an intelligent tag.

According to a specific embodiment, Desmopan DP 2795A SMP, which is a poly (ester urethane) (PEU) of the manufacturer, Bayer MaterialScience AG, is used as shape memory polymer. The hard segment of this polymer comprises 4,4'-methylene diphenyl diisocyanate with 1,4-butanediol chain extender. The soft segment has a poly (1,4-butylene adipate) (PBA) basic structure.

The material used had a sample size of 126 mm×52 mm×2 mm. Its surface was coloured black with a solution comprising: 2% by weight of N-[4-[[4-(dimethylamino) phenyl] [4-(phenylamino)-1-naphthyl]-methylene]-2,5-cyclohexadien-1-ylidene]-N-methyl-methanaminium chloride (Victoria Blue B, CI 44045, CAS 2580-56-5, Sigma Aldrich), 5.5% by weight [4-[4-(diethylamino) benzhydrylene] cyclohexa-2,5-diene-1-ylidene] diethyl ammonium hydrogen sulphate (Basic Green 1, CI 42040, CAS 633-03-4) and 5.5% by weight of 3-[1,3-dihydro-1,3,3-trimethyl-2H-indol-2-ylene) ethylidene]-9-ethyl-3H-carbazolium chloride (Basic Red 28, CAS 72828-91-2), all were dissolved in a 1:1 mixture of ethanol (96%, Merck) and acetone (98%, AppliChem). The resulting solution had a dye concentration of $27.9 \times 10^{-2}$ mol $l^{-1}$.

First, the PEU surface was cleaned with a lint-free cloth and then treated with acetone for about 30 seconds. Subsequently, the black dye solution was pipetted onto the surface of the PEU and distributed evenly using a brush. After another 30 s, the solution residues were completely removed with a fresh cloth. Thereafter, either a QR code or a data matrix was introduced into the coloured surface.

The QR code is generated (error correction level "M") using a software freely available at the Internet address http://goQR.me selecting the error correction level "M". The Data Matrix codes were generated via software available from the Internet-Address http://www.barcode-generator.org.

For engraving inverted black-and-white 2D codes, the coloured PEU sample was first cut into 25 mm×25 mm sample pieces and then appropriate codes were engraved. An epilogue Zing 16 Laser served as engraving and cutting tool. To achieve a sufficiently high contrast, the ablation depth was set so that it was larger than the depth of diffusion of the dye in the PEU.

The partial programming (functionalization), and resetting of the samples was made with an electro-mechanical test bench (MTS Insight 10), which was equipped with a thermal chamber (Thermcraft). The heating of the samples was carried out by means of two electrical heating elements on the rear wall of the thermal chamber. Cooling was accomplished by introducing liquid nitrogen from a Dewar vessel into the thermal chamber.

For site-selective compressive deformation, the above-described steel ball-stamping device was used. The device is shown in FIG. 16.

In particular, FIG. 16a shows the arrangement of a single, centrally disposed sphere, FIG. 16b shows the arrangement of five balls 5 in the manner of the 5 dots on the face of a cubic playing dice in a uniform 3×3 grid. The size of the die can be of course adapted to the respective size of the label, or the size of the code area.

In the present case, the deformed area of the surface of the PEU code has been set by the selected number of steel balls and their position. The PEU samples were always placed on the stamp, so that their coloured side was directed to the balls. To facilitate lateral adjustment the sample was wrapped in a thin aluminum foil and then oriented accordingly on the stamp. The arrangement of the stamp and the PEU sample in the electromechanical test bench is shown schematically in FIG. 17. Here reference numeral 1 denotes a single-coloured PEU sample, 2 denotes the configurable stamp, numeral 4 is a steel plate, reference numeral 5 shows the leverage of a test stand, in which by means of an electromechanical or hydraulic actuator 3, a force F is applied to the sample arranged on the stamp.

In order to fix the PEU sample with respect to the stamp, first a pressing force of 10 N is set, and then the polymer is heated at a rate of 4.3° C. min$^{-1}$ to 80° C., thus above the melting temperature of PBA (which is approximately 40° C.). The temperature of 80° C. was maintained for a period of 5 minutes, and the sample was then loaded at a rate of 100 N min$^{-1}$ until the maximum force $F_{max}$. The maximum force was selected in accordance with the configuration of the stamp. For each sphere a force $F_{max}$=60 N was applied. For five balls, the maximum resulting force is then $F_{max}$=300 N.

In order to fix the polymer in its temporary state the Maximum force is also maintained during the subsequent cooling, wherein the cooling was done with a ramp of 5.3° C. min$^{-1}$ until −20° C. and thus until significantly lower than to the crystallization temperature of the PBA. The crystallization temperature of the PBA is located at about 0° C. After a holding time of 5 minutes at −20° C., the embossed PEU sample was relieved at a rate of 500 N min$^{-1}$, removed from the test stand and cooled to room temperature (23° C.).

In order to trigger the shape memory effect or for resetting into the almost permanent shape the PEU sample was again heated to 80° C. and held for 5 min at this temperature. Finally, the sample was cooled again to room temperature (23° C.).

Before and after triggering of the shape memory effect frozen sections were prepared. For this purpose using a microtome (CM 1950, Leica) each deformed (programmed) and recovered samples had been cut at −20° C. perpendicular to the painted surface and accurately through the lowest point of the embossed impression and then were investigated at a Microscope. The sections were heated to 80° C. and held for 5 minutes at this temperature to achieve the most complete recovery of the continuous form of the polymer. Now another microscopy image was taken.

For the investigations described a Wild M5A stereo microscope with 6× optical zoom and a program for image analysis of the company Dietermann and Heuser Solution GmbH (dha) was used.

The Farbeindringtiefe and the steel ball embossing depth were made using the ImageJ image analysis, and the darkest point was placed on the surface as default. Thus, a decrease in colour intensity was measured up to 70%, the corresponding distance to the surface is referred to as dye-diffusion depth (penetration depth).

Regardless of whether one or five steel balls were used for embossing, the PEU samples in the initial state had a height $h_0$ of 2 mm. The maximum embossing depth $(h_0-h_t)$, was determined according to the lowest embossing point in the temporary state of the PEU, as well as the degree of recovery $(h_r-h_t)$ and the maximum height of protrusive bulges $(h-h_0)$ were determined by measuring in the temporary and in the reset state. These relationships are shown in FIG. 18.

In particular, FIG. 18 shows views of cross sections through the permanent (a) form, through the temporarily fixed form (b)—that is the shape of the code which is made unrecognizable by deformations and which is characterized by bulges surrounding the respective impressions, and the recovered shape—that is, the shape of the code made re-readable in the PEU specimens.

The obtained microscopy images show that a typical embossing depth of about 1.5 mm, for example, already causes an deformation which is acceptable distinct and sufficient for the distortion of an engraved code.

An embossing depth close to the penetration depth (1.67±0.05) mm of the used steel ball used was assumed as the criterion of a good shape fixability for the given surface structure. To assess the recoverability of site-selectively deformed SMP the quotient Rr according to the following formula 2 was determined:

$$R_r = \frac{h_r - h_t}{h_0 - h_t} \cdot 100 \qquad (2)$$

The micrographs of the Microtome sections also show that the depth of penetration of the dye mixture was about 100±5 μm. Therein the dye content in the polymer varied by between 0.1 to 0.16 weight-%.

FIG. 19 shows cross sections of a black-coloured as described specimen, which had been embossed by a single steel ball in the stamp grid. The impression in FIG. 19a shows an embossing depth $(h_0-h_t)$ of 1.50±0.02 mm, which comes close to the depth of penetration 1.67±0.05 mm of the steel ball used. Accordingly, there the quotient of shape fixability was 90±3%.

At the same time to the embossed dentin its immediate surroundings a uniform bulging of material was caused having a maximum height $h_b-h_t=0.5$ mm. Such bulgings of material are known from other SMP such as e.g. styrene-based block copolymers.

The activation of the shape-memory effect resulted as illustrated in FIG. 19b in the almost complete disappearance of the bulgings described above. This is supported by the measured values of $h_b-h=(0.01\pm0.02)$ mm. In addition, the calculated ratio $R_r$ (79±2)% confirms the sufficiently good recoverability of this polymer.

The measurement of corresponding locally deformed samples deformed with 5 steel balls, confirms the statements made. Corresponding results are shown in FIG. 20. Here, too, FIG. 20a shows the locally deformed pattern and FIG. 20b, the sample after the triggering of the shape memory effect. The impressions here had a mean impact depth of 1.5 mm, a fixation of form quotient of 89+3% and an $R_r$ value of (71±2%).

Regardless of the chosen two-dimensional code (e.g. QR-Code or Datamatrix code), the readability of the code can be completely restored by triggering the shape memory effect. Thus, the respective maximum number of characters comprising 122 characters for a QR code (version 7), and 112 characters for a data matrix code (version 12), with an appropriate scanner and decoder, or a reader, or a network-enabled device, such as a properly configured mobile phone, can be read, or if necessary, further processed.

That is shown at the practical example in FIG. 21. The panels a and b show QR codes, particularly a QR code of version 1 in panel a and a QR code 7 or later in panel b. The partial images c and d show, respectively, a data matrix code, with c showing a partial image data matrix code version 4 while partial image d shows an image of a data matrix code version 12. From top to bottom in each case the original state (top), the temporarily fixed, i.e. the programmed state (middle, after partial functionalization with the 5-ball-stamp tool described above) and the reset state, i.e. the state after triggering the shape memory effect (below) are shown.

Apart from that the specimens provided with a code as described were initially deformed with a single steel ball. It should be noted that the exact position of the embossing is of great importance. In particular the deformation of already one of the three positioning patterns each having a size of 5.0 mm×5.0 mm, respectively, lead to the illegibility of the whole QR code for version 1, having a total area 15×15 mm. Thus, these positioning patterns prove to be particularly sensitive to distortions. In the case of the other areas of the code which were deformed with only a single steel ball, the code always remained decipherable. Also in the case of QR Code Version 7 with a total area of 20×20 mm$^2$ the deformation of one of the three positioning patterns was sufficient to render the code unreadable.

In contrast to the positioning marks of the QR code, a data matrix code comprises two so-called "search-lines" which can be made indecipherable merely insufficiently by a single steel ball with the selected diameter of 5 mm in case of code areas of 15×15 mm$^2$ (version 5) or 18×18 mm$^2$ (version 12) leaving the codes readable. Thus, in case of deformation with merely a single steel ball regardless of the code area data matrix codes could always be decoded.

Ignoring the effected material bulgings at the material surface, the total deformed area proportion was 5% (QR Code Version 7), 6% (data matrix code version 12) and 9% (QR Code Version 1 and Data Matrix code version 5) and each was within the high range of fault tolerance of this code.

When using a stamp occupied with five steel balls 25% (QR Code Version 7), 30% (Data Matrix code version 12) and 44% (QR code for version 1 and Data Matrix Code Version 5) of the entire area used for coding could be deformed. In all these cases, the distorted area exceeded the range of fault tolerance of the respective codes. As a consequence, each code became unreadable by the deformation. After triggering the shape memory effect and the associated reset of the SMP, machine-readability of the code has been completely restored.

Other embodiments of the functionalization of a code-bearing polymer products include perforation of the SMP substrate during embossing with the freely configurable stamp.

For example, a compression force of more than 200 N/ball of a stamp equipped with steel balls lead to puncturing of the substrate. If, for example, a force of 1000 N was applied to a PEU sample by a stamp equipped with five steel balls, the formation of five holes in the substrate each having a diameter of about 1.1 mm was caused. The triggering of the shape memory effect by heating at 80° C. resulted in a uniform shrinking of the holes to only 0.4 mm (not shown).

Advantageously, a force of 60 N/ball and of 300 N/ball is spent for applying a mechanical stress to the shape memory polymer in connection with the heating of the shape memory polymer to 80° C. and cooling to −20° C. This force does not lead to penetration of the code area. Maintaining it during the lowering of the temperature fixes the mechanical strain produced.

In summary, it should be noted that due to the large number of possible distortions of only or non-copyable shapes which carry an information available on call, shape memory polymers can be used as a viable carrier of coded and additionally temporarily hidden information or of information made temporarily illegible.

Using a suitably adapted stamping tool comprising a regular pattern of receptacles in a planar base plate for formed bodies, with a single ball or with up to nine identical balls given 9 possible positions a maximum of 511 different configurations can be realized. The achievable diversity of deformation possibilities can be increased further.

A first possibility to increase the achievable diversity and thus the complexity of each code deformation achievable by embossing or to provide with additional features is that the number of receptacles forming a grid is increased.

A further possibility is that a grid is modified by the insertion and/or replacement of a receptacle or a portion of the existing receptacles with other types of receptacles for other types of formed bodies.

Similarly, the receptacles of two or more different grids can also be nested or overlapped with each other.

Alternatively or additionally, modifying the surface of a formed body or part of the formed bodies which are arranged in a grid, e.g. spheres, ellipsoids, rotational bodies, flattened polyhedral or similar objects, or of the intermediate space lying between them in the carrier plate of the stamp may be undertaken.

For example, identical or different patterns can be engraved into a single formed body or into all formed bodies. Similarly, a sphere or any body shape can be provided with several bores of equal or different diameters.

The resulting characteristic surface shapes of the formed bodies are stored temporarily as marks in the shape memory polymer during its partial functionalization and are clearly visible according to their respective numbers in the deformed polymer. Also, the surface structure of one or more spheres arranged in the stamp, the respective structural depth, roughness, shape, size, etc. of the structure therein may be distinct and clearly visible in the temporarily fixed state of the SMP.

Such structures can include terraced arrangements or height differences, which are in the submicron range or above it. The presence of such additional fine structures of the authenticity feature can be used as an information carrier based on a shape memory polymer.

A further possibility for encoding is that the shape of the recesses introduced at the thermo-mechanical programming can be varied by variation of the thermo-mechanical parameters (e.g., the maximum deformation force).

Advantages of linking these embodiments which may be assigned to the field of software and communication technology with the smart labels described above based on shape memory polymers are obvious: additional security-enhancing levels become accessible, thereby further increasing protection against counterfeiting thus product protection of items equipped with smart labels according to the described embodiments.

The above-described processes comprise surfaces of shape memory polymers or articles of such which at least partially have been coloured by diffusion or by applying a dye paste, which carry an information introduced by engraving or molding or a machine-readable code, wherein the information or the code can be obliterated or defaced at least partially by a thermo-mechanical programming or functionalization.

Below additional security features for such codes or marks are proposed to be developed through the use of thermochromic pigments. In particular, the combination of thermochromic pigments in coloured SMP-pastes is described in combination with the shape memory effect of smart labels for producing coloured shape memory polymer surfaces and for masking the information carried by the labels.

In this context, the combination of thermally switchable pigments and shape memory polymers is proposed as an additional safety feature for the purpose of authenticity certificate or for increasing the security against forgery of articles or labels of a shape memory polymer.

In particular, it is proposed to obtain a temporarily pasty mass (polymer paste) from a identical polymer or from a polymer which is chemically related to the at least partially dyed shape memory polymer, and bring thermochromic pigments in this paste. A layer formed on a substrate after the solidification of the paste is then dyed continuously with the thermochromic pigment. It may be firmly bonded to the substrate, particularly when the shape memory polymer used to prepare the paste is chemically identical to the shape memory polymer that serves as the substrate.

The heat-inducible colour change of the thermochromic pigment of the paste which has been applied to a coloured, and optionally thermally programmed SMP-surface in a material-locking way and which has been solidified to form a layer, for example by solvent release, extends by appropriate heating over the entire layer of the SMP which was colored with the thermochromic pigment. The temperature required to trigger the colour change of the thermochromic pigment can be adjusted by the selection of the thermochromic pigment, especially by the composition of dyes and auxiliaries of a thermochromic composition.

In the context described here, a thermochromic pigment is understood to be a pigment which changes its absorption properties and/or its reflection characteristics for electromagnetic radiation in the wavelength range of visible light and thus its colour in dependence on the ambient temperature. This change takes place typically as a colour change or a colour change from coloured to transparent or vice versa at a more or less discrete colour change temperature. Thermochromic pigments may be present in the form of microcapsules. In particular, a dye may be present together with an adjuvant referred to as an activator in the respective microcapsules. The capsule material is typically selected such that a solvent used for dissolving the shape memory polymer does not damage the material of the capsule shell. Suitable capsules have sizes in the micrometer range. Microencapsulated pigments are for example described by Periyasamy S. and G. Khanna (2008) entitled "Thermochromic Colours in Textiles" in Colourage (ISSN 0010-1826), vol. 55 (2): 53-62.

It is proposed to use this heat switchable state of the thermochromic pigment in a shape memory polymer layer as an additional thermally switchable security feature—either in the form of a modification of an already existing code or for masking thereof.

Against this background there is provided a manufacturing method of a thermochromic polymer paste according to claim 65, a thermochromic shape memory polymer according to claim 69, a polymer article according to claim 74, a label according to claim 82 and a method of communicating information according to claim 85.

In a first embodiment, a method for preparing a thermochromic polymer paste is proposed, comprising the steps of: —dissolving a shape memory polymer in a first solvent, wherein the shape memory polymer is initially present in the form of granules, powder or other particulate form and wherein the first solvent is selected so that the shape memory polymer is completely dissolved; —homogenizing and/or stirring the mixture thus obtained; —stirring in of a thermochromic pigment in the predetermined mixture, and optionally, setting a viscosity of the mixture by adding pure first solvent and/or a second solvent.

Advantages of this embodiment depending on the intended application will be apparent from the adjustable colour, which is thermally switchable, the intensity of such colour and the adjusted depending on the application viscosity, wherein the selection of suitable thermochromic pigments, and adjuvants and the temperature range at which for example, discolouration of the polymer paste used starts, can be adjusted according to the intended application. Of particular advantage is the ability to adjust the viscosity of the paste, since that allows the respective adaptation to a printing process which is preferred or typical for an application.

According to another embodiment of the above-proposed method, the shape memory polymer dissolved in the first solvent is chemically the same as the substrate of a shape memory polymer provided for the coating with the thermochromic polymer paste.

Advantages result from the fact that during the application of such a polymer paste on the substrate, the solvent contained in the paste effects a superficial swelling and/or solubilization of the substrate prior to the gradual evaporation of solvent and the mutual interpenetration of the polymers of the substrate and paste leads to a physical bond of the formed from the paste layer to the substrate after the evaporation of solvent.

According to another embodiment of the proposed method, the shape memory polymer is a poly (ester urethane), and the first solvent is N-methyl-2-pyrrolidone (NMP), or
N,N-dimethyl formamide (DMF).

Advantages result from the easy accessibility of these solvents and the good solubility of the designated SMP in these solvents.

According to a further embodiment it is proposed to adjust the viscosity of the thermochromic polymer paste by the addition of adjuvants, for example by the addition of solvents so that it obtains an optimal suitability as ink at a given operating temperature of a printing unit.

The resulting advantages are obvious and relate to the receipt of a thermochromic ink, for example, which is adapted for printing on articles of shape memory polymers for their overt or covert marking and/or for the coding of article authenticity features from shape memory polymers or labels of the same.

According to another embodiment, a thermochromic shape memory polymer is suggested comprising a shape memory polymer selected from: —poly(ester urethanes), in particular multiblock copolymers of polyurethanes having poly (ε-caprolactone) switching segment, —block copolymers of polyethylene terephthalate and polyethylene oxide-polyurethane systems, the hard segment-forming phase from Methylenediphenyl diisocyanate (MDI) or toluene-2,4-diisocyanate (TDI) and a diol, particularly 1,4-butanediol, or a diamine and a switching segment based on an oligoether, oligoester or a polytetrahydrofuran, in particular, in particular polyethylene adipate, polypropylene adipate, polybutylene adipate, polypentylene adipate or polyhexylene adipate—materials having a hard segment-forming phase from TDI, MDI, diisocyanates, in particular of MDI and hexamethylene diisocyanate in carbodiimide modified form of chain extenders and, in particular ethylene glycol, bis (2-hydroxyethyl-hydroquinone, or a combination of 2,2-bis (4-hydroxyphenyl) propane and ethylene are constructed, the blocks of switching segment determining oligoethers, in particular polyethylene oxide, polypropylene oxide, polytetrahydrofuran or a combination of 2,2-bis (4-hydroxyphenyl) propane and propylene oxide, or oligoesters, in particular of polybutylene adipate, consist or-chemically cross-linked, an inorganic-organic hybrid material, in particular a polyhedral oligomeric silsesquioxane (POSS) polyurethane network and a thermochromic pigment, wherein the thermochromic pigment and microcapsules containing a thermochromic pigment are homogeneously distributed in the shape memory polymer.

Advantages of this embodiment comprise, for example, the variable due to the different chemical compositions of the shape memory polymers switching temperature of the polymer and in combination with the thermochromic pigment resulting displacement of the discolouration or colour change of the thermochromic coloured portion and its deformation due to the shape memory effect.

In a preferred embodiment, it is suggested to select a shape memory polymer from the compositions shown in Table 1 referred to above.

Accordingly, a thermochromic made shape memory polymer is suggested according to another embodiment, wherein a colour of the shape memory polymer or of a dye paste containing the shape memory polymer fades and/or disappears completely upon heating, due to the thermochromic pigment existing in addition to shape memory polymer network or included in the SMP-paste.

The advantages of this embodiment are arising from the possibility of a thermally inducible drastic reduction of a colour contrast that can prevent or limit the machine readability of a code.

According to another embodiment, a thermochromic shape memory polymer is suggested, the colour of which indicates a colour change from a first colour to transparent at a temperature of 43° C. Here, the SMP may be present as a solid or as a paste.

Advantages of this embodiment are resulting from the easy accessibility of the indicated colour change, for example by immersion in warm water.

In another embodiment, a shape memory polymer is proposed, wherein the shape memory polymer is at least partially built-up in layers and wherein mutually adjacent layers comprise different thermochromic pigments or different microcapsules, which are distinguished by thermochromic pigments contained therein.

Advantages of this embodiment comprise the possibility to construct differently discolouring multilayer systems or multilayer systems changing colour at different temperatures. In combination with a suitable engraving, a quasi-two-way information encoded or concealed can be provided. While a first print image or structure of a first layer of the thermochromic coloured shape memory polymer provides a first information this information (code) is complemented and/or modified at the onset of the second colour change of the information contained in the second engraved or engraved and printed layer.

In another embodiment, a polymer article is proposed comprising one at least partially coloured and built up layer-wise shape memory polymer, wherein the polymer article comprises at least one layer of the thermochromic shape memory polymer and at least one layer of a shape memory polymer, which is additionally or independently stained with a further dye. This dye is chosen from: (4-((4-(dimethylamino)phenyl)(4-toluidino-1-naphthyl) methylene)-cyclohexa-2,5-dien-1-ylidene)dimethylammonium chloride, 3-[(1,3-Dihydro-1,3,3-trimethyl-2H-indol-2-ylidene) ethylidene]-9-ethyl-3H-carbazoliumchlorid, 4-[(4-diethylamino)-α-henylbenzyliden]-N,N-2,5-diethylcyclohexa dienylidenammonium bisulfate, 5-amino-9-(diethylamino) benzo [a]phenoxazin-7-ium, 3,7-bis (dimethylamino)-phenothiazinium, bis (4-dimethylaminophenyl)-(4-ethylamino-1-naphthyl)-methylium hydrochloride or bis (4-dimethylaminophenyl)-(4-anilino-1-naphthyl)-methylium chloride hydrochloride.

Advantages of this embodiment comprise the achievable diversity of a permanent colour colouring dye-containing shape memory polymer.

In another embodiment, a polymer article is proposed, comprising an at least partially coloured and at least two layers exhibiting shape memory polymer comprising at least one layer of a thermochromic shape memory polymer and shape memory polymer that is coloured with a dye that is selected from a triarylmethane dye or hemicyanine dye.

Advantages of this embodiment comprise, for example, the achievable diversity of resulting colour changes, as well as the opportunity to make an information engraved into a permanently coloured layer irrecognizable at room temperature or at a temperature below the colour change point of the thermochromic pigment.

In another embodiment, a polymer article is proposed, wherein the dye is a triarylmethane dye, and polymer products when heated from a first temperature below 25° C., preferably at a temperature less than or equal to 23° C., to a second temperature above 40° C., preferably above 43° C., are showing a colour change from a first colour to a second colour.

In principle, two cases can be distinguished: A) the permanent dye is located in the surface of the substrate before and B) the permanent dye—as shown in FIGS. 37 and 38—is located together with the thermochromic pigment in the film, which has been formed from the paste. Typical benefits of this and derived therefrom embodiments are the possibility of a contrast between the first colour of the polymer article and the second colour of the polymer article, wherein the transition of the first to the second colour of the polymer article is triggered by the ambient temperature or by the temperature of a liquid, which is contained in a container consisting of such a polymer or which is in contact with such a polymer product.

In another embodiment, a corresponding thereto polymer article is proposed, wherein said first colour is blue and the second colour is green, or wherein the first colour is purple and the second colour is blue.

Advantages of this embodiment results from the good visual discrimination of said different shades of colour.

In another embodiment, a polymer article is proposed, wherein the dye is a hemicyanine dye and the polymer article during the heating from a first temperature below 25° C., preferably from a temperature less than or equal to 23° C., to a second temperature above 40° C., preferably above 43° C., shows a colour change from a first colour to a second colour.

The advantages of this embodiment are consistent with the above.

In another embodiment, a polymer article is proposed, wherein the first colour is violet and the second colour is red.

Again, there are potential advantages of this embodiment, for example, in a facilitated visibility of this colour transition.

In another embodiment a polymer item it is proposed, further comprising an engraving in at least one layer of the at least partially coloured and built up in layers shape memory polymer.

Advantages of this embodiment, for example, comprise the fact that the information conveyed by the engraving of the at least one layer in cooperation with the respective state of the color of the enclosed thermochromic pigment acquires an additional feature. This feature can be read out as an authenticity criterion in addition to the independently present information content of the engraving or can conceal it temporarily.

In another embodiment, such a polymer product is proposed, wherein the engraving is covered by a closed layer of thermochromic shape memory polymer.

Advantages of this embodiment are that the cover below the decolouration of the thermochromic pigment, for example, can be used for concealing or masking a code (or QR data matrix code).

In another embodiment, a label is proposed which comprises a shape memory polymer having a laser engraved and permanently coloured surface, wherein the label at least partially or completely is covered by a layer of a shape memory polymer paste made thermochromic by adding appropriate pigments.

Advantages of this embodiment have been indicated above. Through the combination referred to information carried by the label can be obscured and/or hidden. Advantageously, by the combination of a programming step (resettable thermo-mechanical deformation of the label) and the reached colour change below the masking range of the thermochromic pigment, a complete hiding of the label can be achieved. The previously occupied observer of such a label will not recognize the label as such and accordingly not read the information carried by it, the less copy or fake it. Such combinations may offer advantages for the prevention of piracy.

In another embodiment, a label is proposed, wherein the colour of the thermochromic pigment covers at least partially or completely a code or lettering incorporated in the shape memory polymer and inhibits its readability.

Advantages of this embodiment have already been discussed above. In particular, by a suitable arrangement a safety feature can be hidden, and the appearance of a decorative element can be given to it.

In another embodiment, a label with a lettering or a code is proposed, wherein a colour change of the thermochromic pigment makes the code or the lettering more readable below 43° C.

Advantages of this embodiment may arise, for example, for advertising and promotional purposes. Benefits for other application's scenarios have already been discussed.

According to another embodiment, a method for transmitting information using an article comprising a shape memory polymer is proposed, wherein the method for a selected temperature and for a selected range of temperatures and/or for a predetermined temperature change comprises reading a combination of the features colour, colour change, shape and/or change of shape together with or prior to reading a graphical element which represents a code according to a predetermined code system, which is integrated in a shape memory polymer.

Possible advantages of this embodiment in the field of product protection result from the fact that according to the proposed process multi-stage security features can be provided. Other advantages are related to advertising and marketing. Other benefits may arise for specific markings or warnings in the area of occupational safety or related to the field of entertainment, jewelry and decorations.

The embodiments described can be combined and linked.

In a specific embodiment a polymer paste has been produced from the shape memory polymer poly (ester urethane) Desmopan DP 2795A SMP with a switching temperature near 40° C. that can be applied, for example, on plates, films etc. of the substrate Desmopan DP 2795A SMP.

Examplary polymer pastes are shown in FIG. 22: Here, 5 g Desmopan DP 2795 A SMP is dissolved in 15 ml of N-methyl-2-pyrrolidone (NMP, left panel) or 15 ml of N,N-dimethylformamide (DMF, right). FIG. 23 shows a polymer paste before drying freshly applied as a thin film on a disc-shaped sample of DP 2795A SMP.

After evaporation of the solvent, the paste applied on the substrate forms a largely chemically identical to the substrate film of poly (ester urethane) Desmopan DP 2795A SMP which combines irreversibly with the substrate (see FIG. 24). The SMP-formed film is completely transparent. Advantageously, the polymer composition of the paste may be designed so that it contains thermochromic pigments, whose range of colour change is located, for example, at about 43° C.

The workability of the pastes, is not affected. FIG. 25 shows the shape memory polymer pastes with 1 g of thermochromic pigment (blue, black or red) which were (according to 23.3 wt-% polymer and 4.7 weight-% pigment) mixed with 5 g each of Desmopan DP 2795A SMP and 15 ml of NMP. FIG. 26 shows the good wettability of the resulting paste. The size of the microcapsules, in which the particular thermochromic pigment was located together with a further solvent was less than 10 microns, the density of the pigment used was 0.26 g/cm$^3$, source of the microcapsules is, e.g. the Sintal Chemie GmbH, Germany.

FIG. 27 shows SMP shape memory polymer pastes with thermochromic pigments in different colours (dissolved in NMP or DMF) applied as thin films on a substrate DP 2795A. FIG. 28 demonstrates that colour mixtures are possible as well. Here the colour violet is shown as a mixture of red and blue thermochromic pigments.

The composition of the applied shape memory polymer paste was 1 g of thermochromic pigment (blue, black, red or a mixture of blue and red), 5 g Desmopan DP 2795A SMP and 15 ml NMP (corresponding to 23.3 weight-% and 4.7 weight-% polymer pigment), or alternatively, 15 ml DMF (corresponding to 24.7 weight-% polymer and 4.9 weight-% of pigment).

These pigments remain even after drying in the polymer film so that it then has a characteristic thermally inducible colour change.

To exemplify the thermally generated colour change of a thermochromic pigment polymer film from blue to clear after staining the surface of a sheet of DP 2795A SMP is shown in FIGS. 29 and 30. Due to the heating in the hot air jet, the coated milky plate of DP 2795A SMP above the colour change temperature of 43° C. becomes visible (FIG. 30). The composition of the deposited shape memory polymer paste was here: 1 g of thermochromic pigment (blue, black, red or blue+red), 5 g Desmopan DP 2795A SMP and 15 ml of NMP (corresponding to 23.3 wt-% polymer and 4.7 wt-% pigment).

In a subsequent step, the thus formed two-layer system can be treated with a laser engraving and cutting system. Thereby one can ablate partially the thermochromic pigment-bearing polymer layer which, for example, has a black, blue, red, green, lilac or other colour. For example, a label can be engraved according to a code described above, or an icon or a lettering. The thus engraved structures have a sufficiently high colour contrast (milky white) between the non-lasered and lasered sections at a temperature of 23° C. This colour contrast is sufficient to read error-free, for example, a quick response (QR) or Data Matrix code (such as shown in FIGS. 31 and 32) with a scan and decode unit, for example, with the aforementioned Samsung smartphone. In the figures the machine readability is indicated by a check mark (✓). Lack of legibility or illegibility is indicated in the figures by a cross (X).

For example, a label produced this way can subsequently thermo-mechanically be programmed or functionalized as described in detail above, wherein the layer formed from the polymer paste does not dissolve from the substrate. The thereby deformed code is not readable with a scanning and decoding device due to its deformation or the deformation of the label. The shape of the label can be stabilized in this state, for example, at 23° C. In this form, the label will remain until the shape memory effect is triggered by heating. During the thermal switching the changes of shape and colour of the colour-defining pigment are running almost parallel (e.g. from the colour Black/Blue/Red/Green/Purple, etc. to colourless). The heat-induced discolouration of the layer colouring at 23° C. is reversible. This means that after the thermal switching on cooling to 23° C. anew, the reading of a code such as a QR code is enabled again.

According to the previously described use of "permanent colouring" such as triarylmethane dyes, such as bis (4-dimethylaminophenyl)-(4-anilino-1-naphthyl)-methylium chloride hydrochloride (Victoria Blue B), [4,4,4-(diethylamino) benzhydrylenicyclohexa-2,5-dien-1-ylidene] diethylammonium hydrogensulphat) (Basic Green 1), or hemicyanine dyes, for example, 3H-Carbazolium, 342-(1,3-dihydro-1,3,3-trimethyl-2H-indol-2-ylidene) ethylidene]-9-ethyl chloride (Basic Red 28), which can be introduced by diffusion into the near-surface layers of shape memory polymers for smart label technology further described above, the respective code (such as a QR code) is also in the functionalized, i.e. distorted state recognizable as such. The dye does not work here as temperature indicator. Corresponding experimental results are described in the article "Switchable information carriers based on shape memory polymer" of the authors T. Pretsch, M. Ecker, M. Schildhauer, and M. Maskos (2012), J. Mater. Chem 22 (16), 7757-7766.

In the course of further development of this technology by the herein described use of thermochromic pigments, dye paste, comprising a dissolved shape memory polymer and at least one thermochromic pigment were applied on smart labels containing in its surface a "permanent dye" and carrying a code previously introduced via laser engraving. As a result of this additionally applied layer, containing a thermochromic pigment the code can be concealed, both in the permanent and in the functionalized (i.e. the programmed) form. This is shown in FIGS. 33 and 34. In particular, the concealing works particularly well if the colour of the thermochromic pigment matches the colour of the permanent label. For example, dyes can be used on the basis of triarylmethane or hemicyanine permanent dyes. The achievable layer thickness can be adjusted between 20 and 200 µm by the concentration of polymer in solution, and the procedure for applying the paste.

A portion-wise dyeing a SMP-surface or a smart label with the same pigment-containing polymer paste or multiple pigmented polymer pastes based on Desmopan DP 2795A SMP under variation or combination of thermochromic pigments is also possible, so that a series of colour changes can take place at various points in the polymer surface, which may be useful for the certification of authenticity.

Further multi-layer systems with at least two different polymer pastes containing thermochromic pigments, and optionally intermediate layers of a pigment-free polymer paste Desmopan DP 2795A SMP or another one of the shape memory polymers listed above can be applied as well. Such multi-layer design allows different colour effects during subsequent heating—depending on how far the heat penetrates the layers.

Other variations arise from the temperature of colour change by variation of the thermochromic pigment in the polymer paste, or by a combination of different thermochromic dyes with different temperature of colour change. As a result, consecutive discolouration of layers loaded with thermochromic pigments can be obtained.

A further advantageous approach is to incorporate temperature-sensitive letterings with polymer surfaces whose colour changes can be interpreted as an authenticity characteristic of a label. This is shown in FIGS. 35 and 36. This can be done by printing, stamping, etc. of the substrate. For example, a substrate consisting of Desmopan DP 2795A SMP can be printed with a thermochromic dye paste based on Desmopan DP 2795A SMP, for example by screen printing or stencil printing means (Engl—stencil printing).

The mixture of thermochromic pigments with triaryl methane in shape memory polymer pastes and films produced therefrom enables a particularly innovative protection. In this way—as shown in FIGS. 37 and 38—reversible colour changes between different colours, such as blue and green, are achieved. In particular, the FIGS. 37 and 38 show the temperature-induced colour change of a dye system comprising blue thermochromic pigment together with [4-[4-(diethylamino) benzhydrylene] cyclohexa-2,5-diene-1-ylidene]diethyl ammonium hydrogen sulphate (Basic Green 1). In another system, comprising red thermochromic pigment together with bis (4-dimethylaminophenyl)-(4-anilino-1-naphthyl)methylium hydrochloride (Victoria Blue B), colour changes from the colour purple to blue could be achieved at T>43° C.

In another specific embodiment, instead of a Hemicyanine dye, a triarylmethane dye (for example, 3-[(1,3-dihydro-1,3,3-trimethyl-2H-indol-2-ylidene)ethylidene]-9-ethyl-3H-carbazoliumchlorid or Basic Red 28) was used and combined with a blue thermochromic pigment. In this way, a change in colour of the dyed substrate was achieved from Purple to Red at an ambient temperature T>43° C.

These three approaches represent a particular development, since by heating thermochromic pigments alone the thermosensitive colour change is always performed of one colour A (black/blue/red/green/purple etc.) to colourless. A reversible, temperature-dependent switching between two different colours could not be achieved in a shape memory polymer surface to our knowledge, previously.

The use of the proposed thermochromic SMP pastes on a permanently dyed SMP substrate or the use of SMP-pastes which in addition to a thermochromic pigment also contain a permanently temperature-stable dye or the combination of thermochromic pigments in SMP-pastes with thermally stable dyes thus enables complex colour changes of a polymer article which are typical for the respective composition.

We propose to use such complex temperature-dependent colour changes as an additional authentication feature of smart labels.

Another important point is that a shape memory polymer surface can be printed directly with a code, such as a QR code using shape memory polymer paste with thermochromic pigments contained therein. Alternatively, this way the possibility exists to incorporate logos, symbols, etc. with thermochromic properties permanently anchored to a shape memory polymer surface, i.e. to combine coherently and thus permanently the local labeling with the substrate or the polymer item.

Advantageously, even the quite harsh deformation during functionalizing (programming) of the thus modified labels does not result in detachment of the applied thermochrom pigmented polymer layer. Thus, the generated upon activation of the shape-memory effect according to programmed specific labels shape change is accompanied, under appropriate conditions of temperature control, by specific colour or colour successions of the label or portions of its surface, while sustaining the integrity of the label.

Thus, a method is proposed for transmitting information by means of an item, comprising a shape memory polymer, wherein the method for a specific temperature and for a certain temperature range and/or for a predetermined temperature change comprises a registering or reading out a combination of the features colour, colour change, shape and/or shape change together with reading out a graphical element integrated in the shape memory polymer, wherein the graphic element represents a code according to a predetermined code system.

Further, an information carrier is proposed in particular a label, comprising a shape memory polymer which at least in sections, is coloured with a permanent dye and/or a thermochromic pigment, and comprises an engraving which includes a graphic element, or an arrangement of graphical elements, and wherein the arrangement of graphic elements is a machine readable string or read by a machine, results in a string or is recognizable and understandable as lettering or symbol.

Particular advantages result from the fact that in the form of the resulting complex feature combinations, a higher hurdle for potential counterfeit products is established to prevent the counterfeiting of SMP labels or the copy of the described technology of smart labels. Especially the visualization of identifiable (readable) graphical characters or strings by triggering the thermochromic transition as a result of heating of the material now also allows to produce smart labels, where one does not recognize the code at room temperature as such, therefore can not identify and thus can not fake it.

According to one embodiment there is provided a method of labeling an article comprising a shape memory polymer (SMP) having a visually and/or machine readable graphic element on the surface of the article. In this case, a surface relief is first introduced, for example in the form of a QR code in the surface of the article. This can for example take place by means of a laser. In another process, then the machined surface areas are coloured. If the machining was carried out using a laser and the material of the article was removed in the lasered areas, the areas in which the material was ablated are stained. For staining, a dye solution containing an organic dye and an organic solvent may be used, as described in detail above. The dyeing may also be carried out with a dye paste which as essential components contains a solvent, the SMP either solely or in admixture with another dye in dissolved form, and a thermochromic pigment.

The item is typically, but not necessarily, uncoloured, for example transparent. The material of the article is removed and the surface is roughened and turns opaque there in the lasered areas in particular. According to one embodiment, it suffices if the surface is roughened in the areas to be dyed without any appreciable removal of material. Such roughened areas stain more than not roughened areas. In addition, after application of the dye solution it can be removed from the non-roughened and raised areas, for example by wiping. In contrast, the worn and depressed areas remains the dye solution and reacts there with the material of this article and colours.

If merely the surface has been roughened in the areas to be dyed, the dye solution is applied over the entire surface and acts on the entire surface. Since the roughened surface areas change colour significantly more than the non-roughened areas by limiting the exposure time or a subsequent purification step can be ensured that not roughened areas remain unstained.

The thermo-mechanical programming of the article is typically performed after staining of the ablated areas. However, thermo-mechanical programming is also possible after the introduction of the surface relief, i.e. for example, after the laser treatment, but before the dyeing.

FIGS. 39A-39E and 40A and 40B show concrete examples. In the surface 101 of a 2 mm thick plate of PMMA 100 (Plexiglas) a $CO_2$ laser 120 can introduce a QR code. PMMA is here the SMP material of the article. For this purpose the laser beam 122 of the laser 120 is directed to the regions of the surface 101 of the article 100 in which material is to be removed and/or to be merely roughened. Thereby the PMMA at the surface 101 is evaporated, whereupon the laser structured regions 110 accept a white hue and thus have a contrast to the non-lasered, transparent PMMA areas.

The movement of the laser beam 122 on the surface 101 of the article 100 occurs typically through a suitable optical beam guidance or by moving the laser beam relative to the article 101 of 122. Both can be controlled by a computer, wherein in the computer a setting template for the surface relief/pattern is stored. By black-and-white inversion of the setting mask, an interchanging of the fields to be lasered with those not to be lasered can be reached.

Figure 39A:
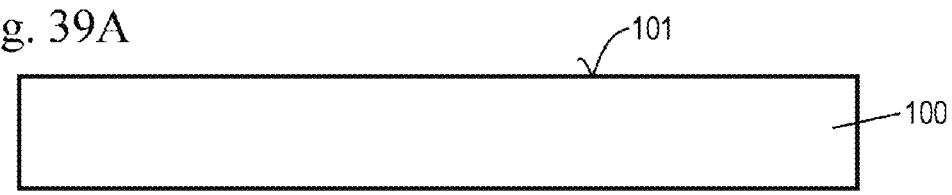
FIG. 39 (A to E) the formation of a surface relief with subsequent colouring of the areas from which material is removed.
Figure 39B:
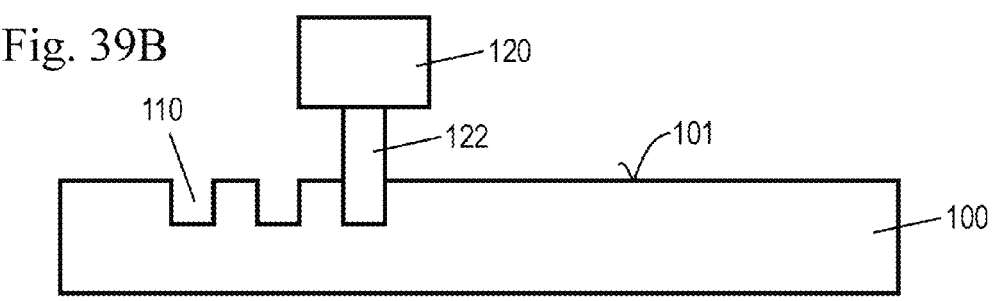
Figure 39C:
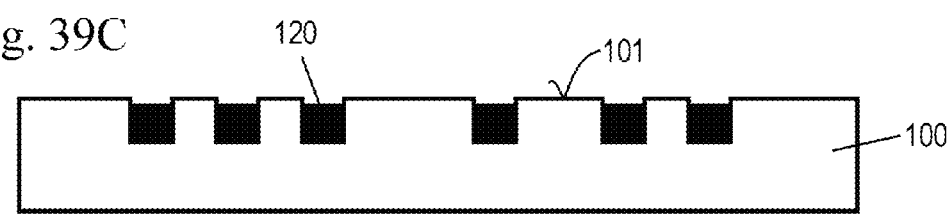
Figure 40A:
FIGS. 40 (A and B) an SMP item having undergone laser engraving, before and after colouring.
Figure 40B:

The contrast between the laser-engraved and non-laser-engraved areas is often not sufficiently high on a light background in order to read the code with a scan and decoding device such as a smartphone directly. However, a reading of the QR code on a dark background is readily possible, as can be seen in FIG. 40A, which shows an experimental result. To now allow the reading on a light background after laser structuring, one can in particular colourize the laser-treated surface areas 110. This is done for example with a dye solution 120 (see FIG. 39C) which was further used for colouring SMP-surfaces as indicated above, for example by means of Victoria Blue B-based dye solution. Other possible dyeing solutions for colouring SMP surfaces with triaryl- or hemicyanine dyes are listed above.

Figure 39D:
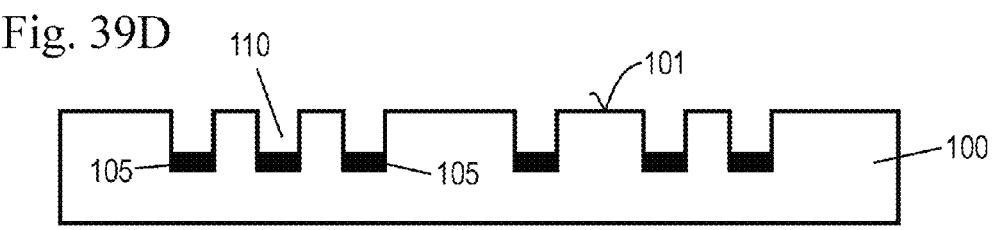

For dyeing, the dye solution 120 can be applied and be removed again, for example, from the untreated and elevated areas, so that the dye solution 120 is left only in the recesses of the laser-processed surface areas 110. This is shown in FIG. 39C. After a certain reaction time, the dye solution 120 is removed and the surface 101, if necessary, purified and dried. The recesses of the laser-treated surface portions 110, in particular the bottoms thereof are now coloured, as shown in FIG. 39D.

In principle it is also possible, in addition or alternatively, to equip the lasered surface regions 110 with at least a thermochromic pigment, or a mixture of at least one thermochromic pigment and a further dye, so that characteristic colour changes can occur when an item (tag) is heated later. These can be either of a first room-temperature stable colour to colourless (in the event that thermochromic pigments are not "combined" with other dyes) or, alternatively, from a first room-temperature stable colour to a second colour at elevated temperature (which requires combination with another dye). In principle, the desired colour behaviour can be achieved by two approaches.

Approach 1: The thermochromic pigments are introduced into the SMP (PMMA) surface 101 in a diffusion process from a dye, which follows the $CO_2$ laser structuring. The dyeing process carried out for the proof-of-concept consisted of the individual steps:
1 Cleaning the surface with a lint-free cloth;
2 Applying the staining solution;
3 Allowing the staining solution to work (approx. 30 s); and
4 Removing the staining solution from the non-lasered areas by wiping with a damp cloth.

A concrete result of the approach described above is shown in FIG. 40B.

Approach 2: Dyeing of the SMP (PMMA) surface with a dye paste comprising, as essential ingredients, a solvent that contains SMP (PMMA), either solely or in admixture with another dye in dissolved form, and the thermochromic pigment. The increase in total thickness of the tag as a result of treating the SMP (PMMA) surface with the dye paste may require the subsequent removal of the dye paste from the non-lasered areas (or equally from parts that cover the lasered areas) and when PMMA is used this requires the use of solvents such as alcohols, acetone or benzene. Alternatively, the dye paste can be removed for all SMPs by mechanically abrasive means. If necessary, this can also be done by laser ablation. In all cases, the end result is a tag with a QR code that is readable with a smartphone at about 23° C. against a light background, and which has distinct shape memory functionality besides the temperature-dependent colour behavior.

Figure 39E:
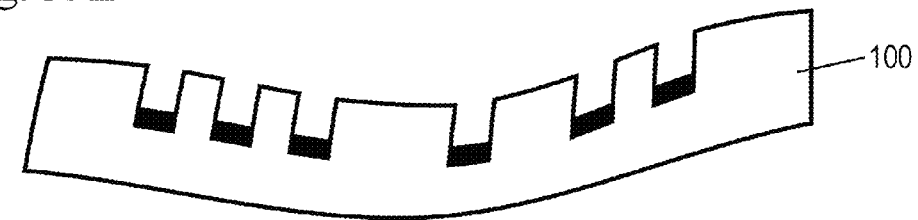

Subsequently, the item 100 provided in this way with a coloured surface profile may be subjected to thermomechanical programming, as is indicated in FIG. 39E. Alternatively, item 100 can be programmed after the surface profile has been introduced thermomechanically, and the laser-structured areas can be coloured 110 only afterwards.

Figure 44A:
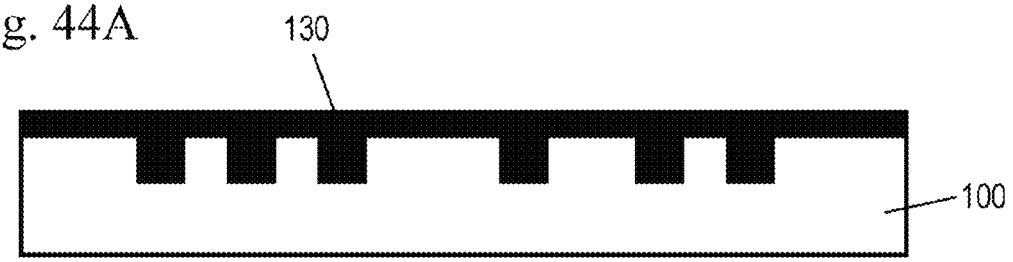
FIGS. 44 (A and B) application and partial removal of a dye paste on an SMP item that has undergone laser engraving.
Figure 44B:
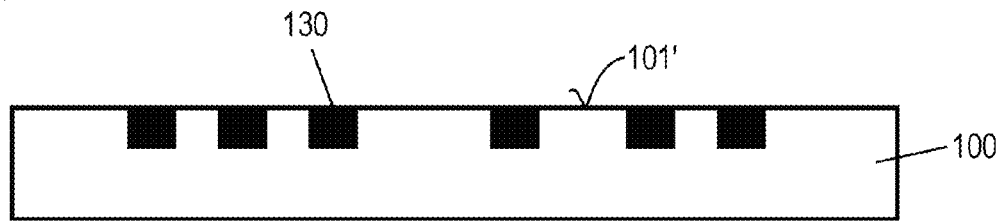

Instead of colouring with the dye solution according to FIGS. 39C and 39D, colouring can be carried out by applying a coloured paste 130 to a surface that has been structured by laser, as shown in FIGS. 44A and 44B. Dye paste 130 covers the SMP item 100 completely. After evaporation of the solvent in dye paste 130, the dried dye paste 130 is ground down mechanically for example, or etched chemically, for example as far as the surface 101, or even a bit further, so that an exposed surface 101' is formed, as shown in FIG. 44B. The depressions of the ablated surface areas 110 here remain filled with dye paste 130.

Dye paste 130 can also be applied only to the extent that it fills the depressions of the lasered areas 110 without covering the non-lasered areas. This is shown in FIG. 43. Sufficient contrast can also be achieved in this way.

Figure 41A:
FIG. 41 (A to C) an SMP item having undergone laser engraving, before and after thermomechanical programming.
Figure 41B:
Figure 41C:
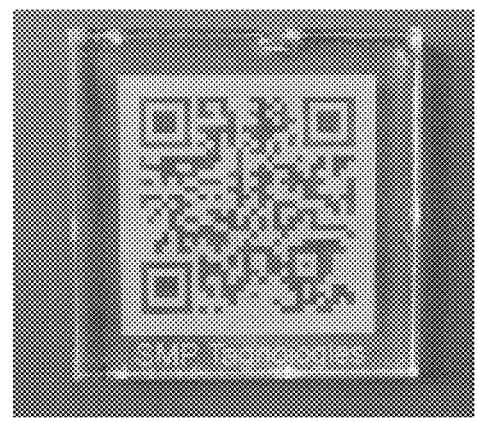

FIGS. 41 to 41C show further concrete examples of an embodiment in which, although a surface profile has been introduced in an SMP item by means of laser treatment, no staining was carried out.

FIG. 41A shows the permanent form of the Plexiglas (PMMA) SMP material furnished with a QR code. The QR code can be read with a smartphone against a dark background. The bright areas here represent the laser-treated areas.

FIG. 41B shows the temporarily fixed form, i.e., after thermomechanical programming. The QR code can no longer be read with a smartphone. For thermomechanical programming of the temporary shape, the SMP-material was heated to 200° C., stretched with a force of about 50 N and cooled to 23° C. while keeping the clamping distance constant.

FIG. 41C shows the restored form of the SMP material. The QR code is readable again against a dark background with a smartphone.

Figure 42A:
FIG. 42 (A to C) an SMP item having undergone laser engraving, before and after thermomechanical programming.
Figure 42B:
Figure 42C:
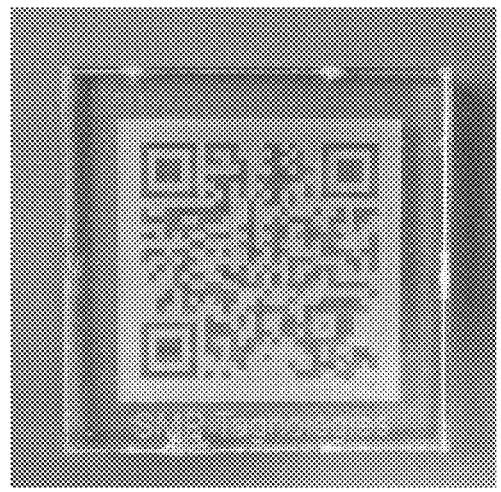

FIG. 42A-42C show further concrete examples of the embodiment in which although a surface profile has been introduced in an SMP item by means of laser treatment, no staining was carried out.

FIG. 42A shows the initial shape as in FIG. 41A.

FIG. 42B shows the temporarily fixed form, i.e. after thermomechanical programming. The QR code is now no longer readable with a smartphone. For thermomechanical programming in the temporary shape, the SMP material was heated to 200° C., pressed with a force of about 50 N and cooled to 23° C. while keeping the shape constant.

FIG. 42C shows the restored form of the SMP material. The QR code is again readable against a dark background with a smartphone.

Although specific embodiments have been presented and described herein, it is within the scope of the present invention to modify the embodiments illustrated without thereby departing from the scope of protection of the present invention. The following claims represent a first, non binding attempt to define the invention in general terms.

What is claimed is:

1. A method for marking an item with a readable graphic element, the method comprising:
   providing a surface of the item, the surface comprising a shape memory polymer (SMP);
   pretreating the surface of the item;
   colouring the surface of the item with a dye paste containing as essential components a solvent, the shape memory polymer in a dissolved form, and a thermochromic pigment, either exclusively or in a mixture with another dye, wherein the coloured SMP comprises a dyed near-surface layer in the SMP having a thickness from 25 to 250 μm;
   cleaning and drying the dyed near-surface of the item; and
   engraving the readable graphic element into the coloured surface by at least partially ablating the coloured surface of the shape memory polymer.

2. The method according to claim 1, further comprising:
   temporary removing of the legibility of the graphic element by means of thermomechanical shaping of the shape memory polymer, wherein
   the visual and/or machine readability of the graphic element is restorable by a subsequent activation of the shape memory effect (SME).

3. The method according to claim 2, wherein the thermomechanical shaping of the shape memory polymer comprises raising the temperature above the transition temperature ($T_{trans}$), followed by a lowering of the temperature to below the shape fixing temperature ($T_{fix}$).

4. The method according to claim 1, wherein the engraving is carried out chemically by etching, mechanically by material removal and/or with the aid of a laser.

5. The method according to claim 4, wherein
   the laser is selected from a $CO_2$ laser or an excimer laser.

6. The method according to claim 1, wherein
   the graphic element is selected from: a geometric figure and/or a character of Chinese, Japanese (Kanji), Korean (Hanja), Vietnamese (Chữ Hán), Indian, Cyrillic, Greek, Arabic and/or Latin script, a pictogram, an ideogram, a hieroglyph, a symbol, a sign, a chemical and/or mathematical and/or physical formula, a component diagram, a thematic map, a signature, a graphic, a logo, a photographic image, a digit, a code, a QR code, a data matrix code and/or a barcode.

7. The method according to claim 1, wherein the graphic element is selected from: a geometric figure and/or a character of Chinese, Japanese (Kanji), Korean (Hanja), Vietnamese (Chữ Hán), Indian, Cyrillic, Greek, Arabic and/or Latin script, a pictogram, an ideogram, a hieroglyph, a symbol, a sign, a chemical and/or mathematical and/or physical formula, a component diagram, a thematic map, a signature, a graphic, a logo, a photographic image, a digit, a code, a QR code, a data matrix code and/or a barcode.

8. An item comprising a shape memory polymer, wherein at least portions of one side of the shape memory polymer have been marked with a dye paste containing as essential components a solvent, the shape memory polymer in a dissolved form, and a thermochromic pigment, either exclusively or in a mixture with another dye and at least portions of the shape memory polymer have been engraved in the same place, wherein the engraving with coloured portions of the shape memory polymer in a first state of the shape memory polymer comprises visual and/or machine readability of the marking and in a second state of the shape memory polymer does not comprise visual and/or machine readability; wherein the coloured portions of shape memory polymer have a thickness from 25 to 250 μm.

9. The item according to claim 8, wherein the visual and/or machine readability of the marking is switchable by a thermomechanical shaping of the shape memory polymer.

10. The item according to claim 8, wherein said marking is present in the form of a geometric figure and/or a character of Chinese, Japanese (Kanji), Korean (Hanja), Vietnamese (Chữ Hán), Indian, Cyrillic, Greek, Arabic and/or Latin script, a pictogram, an ideogram, a hieroglyph, a symbol, a sign, a chemical and/or mathematical and/or physical formula, a component diagram, a thematic map, a signature, a graphic, a logo, a photographic image, a digit, a code, a QR code, a data matrix code and/or a barcode.

11. The item according to claim 8, wherein the shape memory polymer is selected from epoxy-based polymers with shape memory.

12. The item according to claim 8, wherein the shape memory polymer is selected from block copolymers of polystyrene and poly(1,4-butadiene).

13. The item according to claim 8, wherein the shape memory polymer is selected from: poly(ester urethanes), multiblock copolymers, block copolymers of polyethylene terephthalate and polyethylene oxide, polyurethane systems of which the hard-segment-forming phase consists of methylene diphenyl diisocyanate (MDI) or toluene-2,4-diisocyanate (TDI) and a diol or a diamine and a switching segment based on an oligoether or an oligoester.

14. The item according to claim 8, wherein the shape memory polymer is chosen from phase segregated linear block copolymers made from hard and soft segments.

15. The item according to claim 8, wherein the shape memory polymer is a chemically crosslinked, inorganic-organic hybrid material.

16. The item according to claim 8, wherein the shape memory polymer comprises composites of polymers with shape memory and an excipient, wherein the excipient is selected from: magnetic nanoparticles, ferromagnetic particles, iron oxide particles, magnetite particles, particles of the alloy $Nd_2Fe_{14}B$, NiZn particles, silicon nitride, silicon carbide, silica, zirconia, alumina, carbon fibres, carbon nanotubes, or particles having a graphene structure, a thermochromic material, rutile, zinc oxide, 9,9''-bixanthylidene, 10,10'-bis-diethylammonium-bianthronylidene or tetrachlorocuprate (II).

17. A method for marking an item comprising a shape memory polymer (SMP) having a visually readable and/or machine readable graphic element on the surface, comprising:
    providing an item with a surface of a shape memory polymer;
    introducing a surface relief into the surface of the item; and
    dyeing the surface relief with a dye paste containing as essential components a solvent, the shape memory polymer in a dissolved form, and a thermochromic pigment, either exclusively or in a mixture with another dye; wherein the surface relief comprises a dyed near-surface layer in the shape memory polymer having a thickness from 25 to 250 μm.

18. The method according to claim 1, further comprising:
    temporary removing of the legibility of the graphic element by means of thermomechanical shaping of the shape memory polymer, wherein
the visual and/or machine readability of the graphic element is restorable by a subsequent activation of the shape memory effect (SME).

19. The method according to claim 18, wherein the thermomechanical shaping of the shape memory polymer comprises raising the temperature above the transition temperature ($T_{trans}$), followed by a lowering of the temperature to below the shape fixing temperature ($T_{fix}$).

20. The method according to claim 17, wherein the step of introducing a surface relief is carried out chemically by etching, mechanically by material removal or by laser ablation.

21. The method according to claim 20, wherein the laser is selected from a $CO_2$ laser or an excimer laser.

22. The method according to claim 17, wherein the visual and/or machine readability of the marking is switchable by a thermomechanical shaping of the shape memory polymer.

23. The method according to claim 22, wherein said marking is present in the form of a geometric figure and/or a character of Chinese, Japanese (Kanji), Korean (Hanja), Vietnamese (Chũ Hán), Indian, Cyrillic, Greek, Arabic and/or Latin script, a pictogram, an ideogram, a hieroglyph, a symbol, a sign, a chemical and/or mathematical and/or physical formula, a component diagram, a thematic map, a signature, a graphic, a logo, a photographic image, a digit, a code, a QR code, a data matrix code and/or a barcode.

24. The method according to claim 17, wherein the shape memory polymer is selected from epoxy-based polymers with shape memory.

25. The method according to claim 17, wherein the shape memory polymer is selected from block copolymers of polystyrene and poly(1,4-butadiene).

26. The method according to claim 17, wherein the shape memory polymer is selected from: poly(ester urethanes), multiblock copolymers, block copolymers of polyethylene terephthalate and polyethylene oxide, polyurethane systems of which the hard-segment-forming phase consists of methylene diphenyl diisocyanate (MDI) or toluene-2,4-diisocyanate (TDI) and a diol or a diamine and a switching segment based on an oligoether or an oligoester.

27. The method according to claim 17, wherein the shape memory polymer is chosen from: block copolymers.

28. The method according to claim 17, wherein the shape memory polymer is a chemically crosslinked, inorganic-organic hybrid material.

29. The method according to claim 17, wherein the shape memory polymer comprises composites of polymers with shape memory and an excipient, wherein the excipient is selected from: magnetic nanoparticles, ferromagnetic particles, iron oxide particles, magnetite particles, particles of the alloy $Nd_2Fe_{14}B$, NiZn particles, silicon nitride, silicon carbide, silica, zirconia, alumina, carbon fibres, carbon nanotubes, or particles having a graphene structure, a thermochromic material, rutile, zinc oxide, 9,9''-bixanthylidene, 10,10'-bis-diethylammonium-bianthronylidene or tetrachlorocuprate (II).

* * * * *